US010803653B2

(12) United States Patent
Castaneda et al.

(10) Patent No.: US 10,803,653 B2
(45) Date of Patent: Oct. 13, 2020

(54) METHODS AND SYSTEMS FOR GENERATING A SURFACE DATA PROJECTION THAT ACCOUNTS FOR LEVEL OF DETAIL

(71) Applicant: Verizon Patent and Licensing Inc., Arlington, VA (US)

(72) Inventors: Oliver S. Castaneda, Rochester, NY (US); Michael Lodato, New Egypt, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/775,950

(22) Filed: Jan. 29, 2020

(65) Prior Publication Data

US 2020/0167989 A1 May 28, 2020

Related U.S. Application Data

(63) Continuation of application No. 16/421,654, filed on May 24, 2019, now Pat. No. 10,586,377, which is a
(Continued)

(51) Int. Cl.
*H04N 21/81* (2011.01)
*H04N 13/275* (2018.01)
(Continued)

(52) U.S. Cl.
CPC .............. *G06T 15/20* (2013.01); *G06T 19/20* (2013.01); *G06T 2210/22* (2013.01);
(Continued)

(58) Field of Classification Search
None
See application file for complete search history.

(56) References Cited

U.S. PATENT DOCUMENTS 5,977,978 A 11/1999 Carey et al.
6,040,836 A 3/2000 Shiitani et al.
(Continued)

FOREIGN PATENT DOCUMENTS

EP 2051533 4/2009
EP 2384001 11/2011

OTHER PUBLICATIONS

Cuervo, et al., "High-Quality Mobile Gaming Using GPU Offload", Proceedings of The 13th Annual International Conference on Mobile Systems, Applications, and Services, MOBISYS '15, Florence, Italy, May 18-22, 2015, Jan. 2015, pp. 121-135, XP055537862.
(Continued)

*Primary Examiner* — Martin Mushambo

(57) ABSTRACT

An exemplary virtual reality provider system generates a surface data projection based on surface data representative of color characteristics or depth characteristics of surfaces within a three-dimensional ("3D") space. The surface data projection is generated for a portion of the 3D space. The virtual reality provider system applies an image transform operation to the surface data projection to transform the surface data projection. Specifically, the image transform operation transforms the surface data projection to account for a level of detail of the surfaces within the 3D space with respect to a particular vantage point within the 3D space. Corresponding methods and systems are also disclosed.

20 Claims, 23 Drawing Sheets

Related U.S. Application Data continuation of application No. 15/799,731, filed on Oct. 31, 2017, now Pat. No. 10,347,037, which is a continuation-in-part of application No. 15/610,572, filed on May 31, 2017, now Pat. No. 10,311,630.

(51) Int. Cl.
*G06T 15/20* (2011.01)
*G06T 19/20* (2011.01)

(52) U.S. Cl.
CPC .. *G06T 2210/36* (2013.01); *G06T 2219/2012* (2013.01); *G06T 2219/2016* (2013.01)

(56) References Cited

U.S. PATENT DOCUMENTS

| | | |
|---|---|---|
| 6,486,908 B1 | 11/2002 | Chen et al. |
| 6,643,413 B1 | 11/2003 | Shum et al. |
| 8,134,558 B1 | 3/2012 | Mayhew |
| 8,494,215 B2 | 7/2013 | Kimchi et al. |
| 8,599,202 B1 * | 12/2013 | Legakis ............... G06T 17/20 345/423 |
| 8,675,013 B1 | 3/2014 | Romaszewicz et al. |
| 9,102,055 B1 | 8/2015 | Konolige et al. |
| 9,390,553 B2 | 7/2016 | Tokashiki et al. |
| 9,404,740 B2 | 8/2016 | Babayoff |
| 9,486,921 B1 | 11/2016 | Straszheim et al. |
| 9,569,812 B1 | 2/2017 | Kopf et al. |
| 2002/0113756 A1 | 8/2002 | Tuceryan et al. |
| 2003/0231179 A1 | 12/2003 | Suzuki |
| 2006/0109266 A1 | 5/2006 | Itkowitz et al. |
| 2006/0149516 A1 | 7/2006 | Bond et al. |
| 2007/0076920 A1 | 4/2007 | Ofek |
| 2007/0247458 A1 * | 10/2007 | Surazhsky ............ G06T 17/20 345/423 |
| 2007/0273692 A1 | 11/2007 | Woo et al. |
| 2008/0059956 A1 | 3/2008 | Su |
| 2009/0079731 A1 | 3/2009 | Fitzmaurice et al. |
| 2010/0050082 A1 | 2/2010 | Katz et al. |
| 2010/0091036 A1 | 4/2010 | Wright et al. |
| 2011/0018902 A1 | 1/2011 | Ofek |
| 2011/0063415 A1 | 3/2011 | Gefen et al. |
| 2012/0050256 A1 | 3/2012 | Thiel et al. |
| 2012/0069051 A1 | 3/2012 | Hagbi et al. |
| 2012/0117114 A1 | 5/2012 | Goranson |
| 2012/0218266 A1 | 8/2012 | Maeta et al. |
| 2013/0021338 A1 | 1/2013 | Shuster et al. |
| 2013/0083161 A1 | 4/2013 | Hsu et al. |
| 2013/0235152 A1 | 9/2013 | Hannuksela et al. |
| 2014/0002443 A1 | 1/2014 | Cunningham |
| 2014/0125701 A1 | 5/2014 | Hayakawa |
| 2015/0023602 A1 | 1/2015 | Wnuk et al. |
| 2015/0050997 A1 | 2/2015 | Suzman et al. |
| 2015/0324940 A1 | 11/2015 | Samson et al. |
| 2015/0338648 A1 | 11/2015 | Tait |
| 2015/0346812 A1 | 12/2015 | Cole et al. |
| 2016/0029017 A1 | 1/2016 | Liang et al. |
| 2016/0189426 A1 | 6/2016 | Thomas et al. |
| 2016/0320951 A1 | 11/2016 | Ernst et al. |
| 2017/0064148 A1 | 3/2017 | Muninder et al. |
| 2017/0113129 A1 | 4/2017 | Doptis et al. |
| 2017/0124772 A1 | 5/2017 | Baszucki et al. |
| 2017/0147064 A1 | 5/2017 | Yang et al. |
| 2017/0249770 A1 | 8/2017 | Mori et al. |
| 2017/0359467 A1 | 12/2017 | Norris et al. |
| 2018/0108110 A1 | 4/2018 | Cuervo et al. |
| 2018/0114264 A1 | 4/2018 | Rafii et al. |
| 2018/0146189 A1 | 5/2018 | Park |
| 2018/0210627 A1 | 7/2018 | Woo et al. |
| 2019/0028616 A1 | 1/2019 | Furukawa |

OTHER PUBLICATIONS

Lee, et al., "0utatime: Using Speculation to Enable Low-Latency Continuous Interaction for Cloud Gaming", Internet Citation, Aug. 21, 2014 {Aug. 21, 2014), pp. 1-14, XP002740655, Retrieved from the Internet: URL: http://research.microsoft.com/pubs/226843/outatime_techreport2014.pdf [retrieved on Jun. 9, 2015].

Reinert, et al., "Proxy-guided Image-based Rendering for Mobile Devices", Computer Graphics Forum, vol. 35, No. 7, Oct. 2016 (Oct. 2016), pp. 353-362, XP055537861, GB.

Shi, et al., "A real-time remote rendering system for interactive mobile graphics", ACM Transactions on Multimedia Computing, Communications, and Applications, vol. 8, No. 3s, Sep. 2012 (Sep. 2012), pp. 1-20, XP055177467.

* cited by examiner

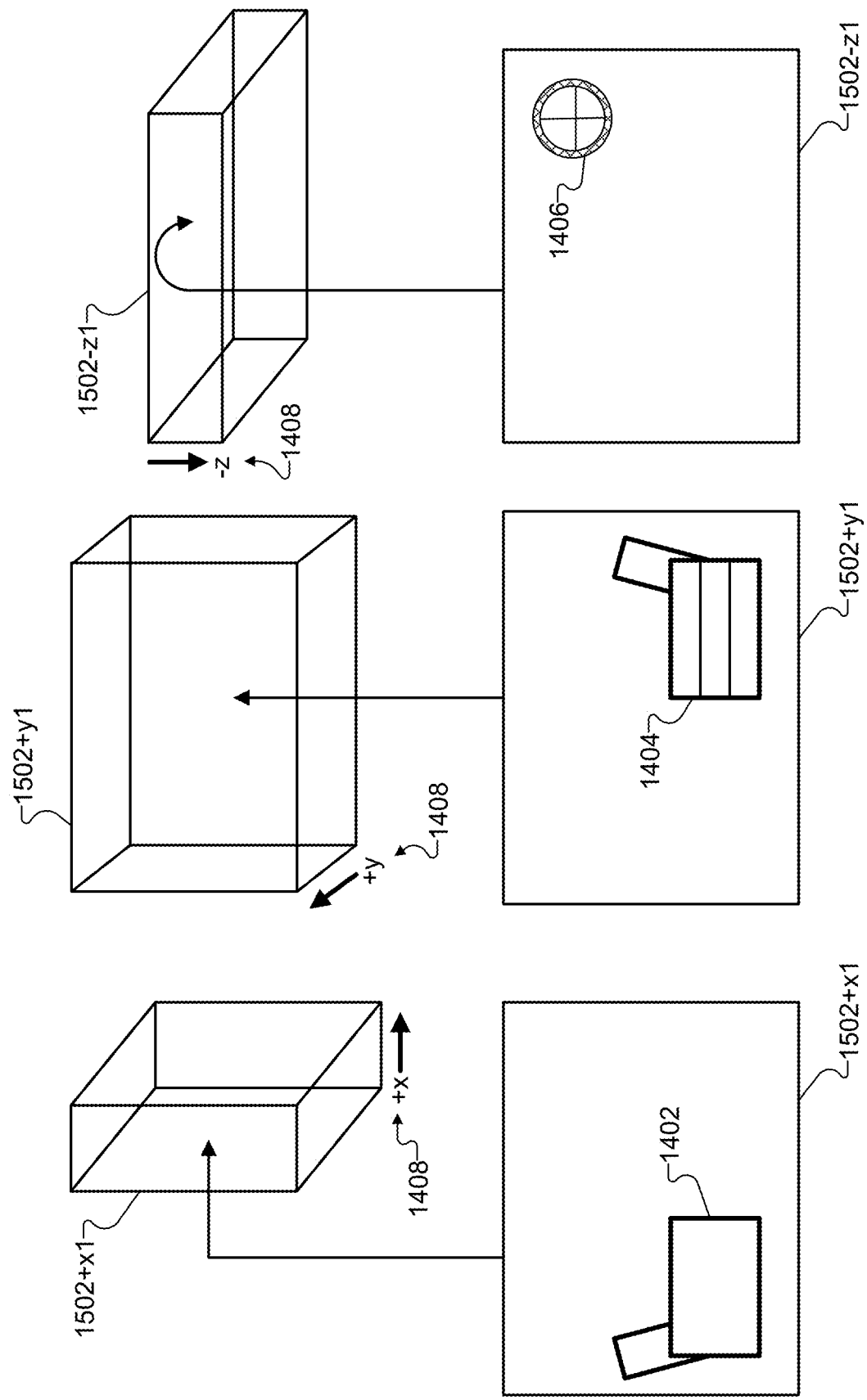

METHODS AND SYSTEMS FOR GENERATING A SURFACE DATA PROJECTION THAT ACCOUNTS FOR LEVEL OF DETAIL

RELATED APPLICATIONS

This application is a continuation of U.S. patent application Ser. No. 16/421,654, filed May 24, 2019, and entitled "Methods and Systems for Generating Virtual Reality Data that Accounts for Level of Detail," which is a continuation of U.S. patent application Ser. No. 15/799,731, filed Oct. 31, 2017 and issued as U.S. Pat. No. 10,347,037, on Jul. 9, 2019, and entitled "Methods and Systems for Generating and Providing Virtual Reality Data that Accounts for Level of Detail," which is a continuation-in-part application of U.S. patent application Ser. No. 15/610,572, filed May 31, 2017 and issued as U.S. Pat. No. 10,311,630 on Jun. 4, 2019 and entitled "Methods and Systems for Rendering Frames of a Virtual Scene from Different Vantage Points Based on a Virtual Entity Description Frame of the Virtual Scene." These applications are hereby incorporated by reference in their entirety.

BACKGROUND INFORMATION

Users may experience virtual three-dimensional ("3D") spaces (e.g., based on virtual, real-world, or mixed reality scenes) for various reasons and in connection with various types of applications. For example, users may experience virtual 3D spaces for entertainment purposes, educational purposes, long-distance communication purposes, vicarious experience/travel purposes, or in connection with various other purposes and/or applications.

Virtual reality is one example of an application where users experience virtual 3D spaces. Virtual reality media content may be used to immerse users (i.e., viewers of the virtual reality media content) into interactive virtual reality worlds that users may experience by directing their attention to any of a variety of things being presented in the immersive virtual reality world at the same time. For example, at any time during the presentation of the virtual reality media content, a user experiencing the virtual reality media content may look around the immersive virtual reality world in any direction, giving the user a sense that he or she is actually present in and experiencing the immersive virtual reality world from a particular viewpoint or vantage point within the immersive virtual reality world.

In some examples, users may desire the flexibility of being able to experience a virtual 3D space (e.g., an immersive virtual reality world) from an arbitrary virtual vantage point within the virtual 3D space. In other words, the user may wish to move around to different locations within the virtual 3D space at will to experience the virtual 3D space (e.g., to view objects presented within the virtual 3D space, etc.) from arbitrary virtual vantage points anywhere within the virtual 3D space that the user may dynamically choose. To provide the user this freedom of movement to the different locations, conventional media player devices have typically received data representative of the virtual 3D space (e.g., 3D models of objects within the 3D space and the like) prior to the time when the user experiences the virtual 3D space. For example, a conventional media player device may download and store data (e.g., 3D models, textures, etc.) associated with a virtual 3D space on a local storage facility such as a hard drive of the media player device, or may access data associated with the virtual 3D space from a local physical medium accessible to the media player device (e.g., a physical disc). Unfortunately, however, more setup may be required by a user prior to experiencing such a virtual 3D space (e.g., setup associated with downloading, installing, loading into memory, etc., data content representative of the virtual 3D space), and it may be difficult for the virtual 3D space in such examples to reflect live or real-time updates to the content due to the requirement for much of the data to be received by the media player device prior to the user experience.

Moreover, even if all the data representative of the virtual 3D space were to be transmitted to a media player device in real time, data representing individual 3D models of objects included within the virtual 3D space may allow the virtual 3D space to be rendered from arbitrary virtual vantage points within the virtual 3D space, but may not be scalable to present larger virtual 3D spaces or virtual 3D spaces including more objects without sacrificing quality. For example, if the data being transmitted to the media player device represents individually renderable 3D models for each object included within the virtual 3D space, a significant amount of additional data (e.g., approximately twice as much data) may be needed to represent a virtual 3D space with, for example, ten objects, as compared to the amount of data needed to represent a virtual 3D space with, for example, five objects. Thus, even if data representative of a virtual 3D space including models of five objects can be transmitted to a media player device in real time, this type of transmission may not be able to scale to similarly represent ten objects or one hundred objects or more within the virtual 3D space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 16A through 16C illustrate exemplary orthographic projections associated with certain surface data slices selected from the pluralities of adjacent surface data slices illustrated in FIGS. 15A through 15F according to principles described herein.

DETAILED DESCRIPTION OF PREFERRED EMBODIMENTS

Figure 1:
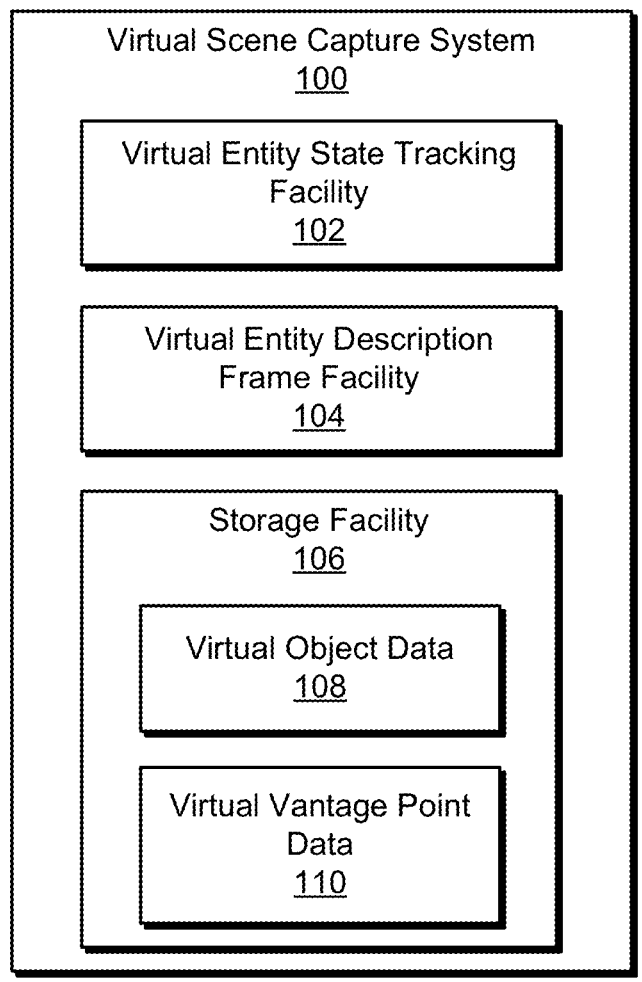
FIG. 1 illustrates an exemplary virtual scene capture system for rendering frames of a virtual scene from different vantage points based on a virtual entity description frame of the virtual scene according to principles described herein.

Methods and systems for rendering frames of a virtual scene from different vantage points based on a virtual entity description frame of the virtual scene are described herein. For example, a virtual scene capture system may maintain data representative of a plurality of virtual entities included within a virtual three-dimensional ("3D") space of a virtual scene. The plurality of virtual entities may include one or more virtual objects along with a plurality of virtual vantage points into the virtual 3D space (e.g., virtual locations, angles, viewpoints, etc., from which to view the one or more virtual objects included within the virtual 3D space). In particular, the plurality of virtual vantage points may include at least a first virtual vantage point and a second virtual vantage point different from the first virtual vantage point.

Based on the maintained data representative of the plurality of virtual entities, the virtual scene capture system may generate a virtual entity description frame representative of a state of at least one virtual entity in the plurality of virtual entities at a particular point in a temporal sequence. For example, the virtual entity description frame may be a key description frame that represents respective state information for all the virtual entities (i.e., virtual objects and virtual vantage points) included in the plurality of virtual entities, or may be an update description frame representing state information of only those virtual entities in the plurality of virtual entities that have changed since a previous key description frame was generated.

Upon generating the virtual entity description frame, the virtual scene capture system may provide the virtual entity description frame to a plurality of server-side 3D rendering engines associated with a content provider system to facilitate the 3D rendering engines in rendering frames of the virtual scene from different vantage points based on the virtual entity description frame. For instance, the virtual scene capture system may provide the virtual entity description frame to a first 3D rendering engine that is associated with the first virtual vantage point and is configured to render, based on the virtual entity description frame, a first surface data frame representative of color and depth data of surfaces of the virtual object visible from the first virtual vantage point at the particular point in the temporal sequence. Similarly, the virtual scene capture system may provide the virtual entity description frame to a second 3D rendering engine that is associated with the second virtual vantage point and is configured to render, also based on the virtual entity description frame, a second surface data frame representative of color and depth data of surfaces of the virtual object visible from the second virtual vantage point at the particular point in the temporal sequence.

The systems and methods for rendering frames of a virtual scene from different vantage points based on a virtual entity description frame of the virtual scene described herein may provide various advantages and benefits. For example, the systems and methods described herein may facilitate users in experiencing virtual 3D spaces of virtual scenes. As used herein, a "virtual 3D space" of a virtual scene may refer to a rendering (e.g., a wholly virtualized rendering) of an environment or a world (e.g., an immersive virtual reality world) that may be experienced by a user in a similar way as the user might experience the real world. For example, a user experiencing the virtual scene may be able to move about within the virtual 3D space and look at and/or otherwise interact with objects included within the virtual space. In some examples, a virtual 3D space may be wholly virtualized (e.g., computer generated) and rendered in a similar way as a real-world scene may be rendered. In other examples, a virtual 3D space may be based, at least in part, on one or more real-world objects captured from a real-world scene.

In any case, the systems and methods described herein may facilitate users in experiencing virtual 3D spaces of virtual scenes that are streamed, in their entirety, from a provider system such that data representative of the virtual 3D spaces and the virtual entities included therein do not need to be preloaded or stored on a media player device prior to the experiencing of the virtual 3D space by the user of the media player device. For example, all the data needed for a media player device to present a virtual scene may be streamed to the media player device (e.g., in real time in certain implementations) so that data representative of virtual scene content does not need to be downloaded, stored, or otherwise accessed (e.g., by way of a local physical disc) prior to the presentation of the virtual scene to the user.

Moreover, the systems and methods for rendering frames of a virtual scene from different vantage points based on a virtual entity description frame of the virtual scene described herein may facilitate providing virtual reality media content representative of the virtual scene to media player devices in such a way that the virtual reality media content may be rendered from arbitrary virtual locations and dynamically selected virtual vantage points within the virtual 3D space. Specifically, as will be described in more detail below, by rendering frames of a virtual scene from different vantage points (e.g., the virtual vantage points), the virtual scene capture system may include the frames in a data pipeline configured to allow a media player device to render, in three dimensions, a virtual 3D space from arbitrary and dynamically selectable virtual vantage points based on a plurality of two-dimensional ("2D") video streams included in the data pipeline and associated with, for example, relatively fixed vantage points (e.g., the virtual vantage points). As a result, the media player device may allow the user to experience the virtual 3D space as if moving around freely within the virtual 3D space based on 2D video streams carrying data representative of the virtual 3D space, rather than based on 3D model data representative of a variable and potentially unlimited number of 3D models associated with the virtual 3D space. For example, rather than providing data representative of 3D models of every virtual object included within the virtual 3D space, the data pipeline may provide 2D video data (e.g., color data and depth data) representative of all the virtual objects within the virtual 3D space from the virtual vantage points. As such, an unlimited number of objects may be represented in a rendering of the virtual scene without the media player device having to receive additional data or perform additional rendering work than would be required for rendering the virtual scene with only one or two objects, for example.

Additionally, by maintaining and providing all the data representative of the virtual scene to the media player devices without relying on preloaded content already stored at the media player devices, the system and methods described herein may allow virtual 3D spaces to be generated or modified (e.g., in real time) by the provider without having to modify preloaded data stored on the media player device. As a result, content creators responsible for generating a virtual scene or one or more users experiencing the virtual scene may provide commands to the virtual scene capture system to modify aspects of the virtual scene (e.g., to modify, replace, or remove virtual objects, etc.), and these modifications can be instantly reflected in the data being streamed to users such that the virtual scene is modified in real time or near real time.

Similarly, various operations that may be computationally expensive (e.g., prohibitively expensive for certain media player devices) may be performed by powerful computing resources associated with the virtual scene capture system, which may be operated by a virtual reality media provider and may be associated with much more powerful computing resources (e.g., large servers or the like) than, for example, the media player devices associated with users. For example, the virtual scene capture system may perform computationally expensive physics operations with respect to objects within a virtual scene, artificial intelligence operations with respect to the objects, and so forth. Because these operations are performed at the provider level, the media player devices operated by users may not need to be associated with particularly powerful computing resources, which conserves user device resources, provides convenience to users (e.g., in terms of portability, cooling, etc.), and enables various types of media player devices (e.g., with various form factors, various price points, etc.) to provide the experience of the virtual scene to users.

While certain examples described herein may reference a few specific articles from pluralities that may have any suitable numbers of the articles, it will be understood that the same principles described in accordance with the few specific articles may apply to one or more other articles in the pluralities, up to and including all of the articles in each respective plurality of articles. For instance, due to convenience and clarity of description, a few articles may be designated by ordinal adjectives such as "first," "second," and the like (e.g., first and second virtual vantage points, first and second 3D rendering engines, first and second surface data frames, etc.). However, as will generally be illustrated in the figures, principles described herein may apply to many or all of the articles included in a plurality of the articles, as opposed to just the first and second articles, for example. Thus, as will be described below, certain implementations may include many (i.e., more than two) 3D rendering engines rendering many surface data frames each associated with the view from one of many virtual vantage points, and so forth.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtual scene capture system 100 ("system 100") for rendering frames of a virtual scene from different vantage points based on a virtual entity description frame of the virtual scene. As shown, system 100 may include, without limitation, a virtual entity state tracking facility 102, a virtual entity description frame facility 104, and a storage facility 106 selectively and communicatively coupled to one another. It will be recognized that although facilities 102 through 106 are shown to be separate facilities in FIG. 1, facilities 102 through 106 may be combined into fewer facilities, such as into a single facility, or divided into more facilities as may serve a particular implementation. In some examples, each of facilities 102 through 106 may be distributed between multiple devices and/or multiple locations as may serve a particular implementation. Each of facilities 102 through 106 will now be described in more detail.

Virtual entity state tracking facility 102 may include one or more physical computing devices (e.g., hardware and/or software components such as processors, memories, communication interfaces, instructions stored in memory for execution by the processors, etc.) that perform various operations associated with rendering frames of a virtual scene from different vantage points based on a virtual entity description frame of the virtual scene. For example, using the one or more physical computing devices, virtual entity state tracking facility 102 may maintain data representative of a plurality of virtual entities included within a virtual 3D space of a virtual scene. Virtual entity state tracking facility 102 may maintain the data in any suitable way. For example, virtual entity state tracking facility 102 may receive, track, generate, analyze, organize, and/or otherwise process data representative of the plurality of virtual entities of the virtual scene. As will be described in more detail below, virtual entity state tracking facility 102 may also receive commands to modify the maintained data (e.g., to modify one or more of the virtual entities such as by adding, removing, replacing, moving, rotating, enlarging, or otherwise modifying the virtual entities) and may implement the commands by modifying the data being maintained. Virtual entity state tracking facility 102 may further maintain the data by interoperating with storage facility 106 to store data representative of each virtual entity in storage facility 106.

As used herein, a "virtual entity" may refer to any virtual item that may be associated with a virtual scene and/or a virtual 3D space. For example, among the virtual entities for which virtual entity state tracking facility 102 maintains data, the virtual 3D space of the virtual scene may include virtual entities such as one or more virtual objects, a plurality of virtual vantage points into the virtual 3D space (e.g., virtual capture devices positioned and angled in particular ways with respect to the virtual 3D space so as to capture the virtual 3D space from a variety of different perspectives), and/or any other virtual entities as may serve a particular implementation. In particular, as will be described and illustrated below, one exemplary virtual 3D space may include a virtual object surrounded by a plurality of virtual vantage points including a first virtual vantage point and a second virtual vantage point different from the first virtual vantage point.

Virtual entity description frame facility 104 may include one or more physical computing components (e.g., hardware and/or software components separate from those of virtual entity state tracking facility 102 or shared with virtual entity state tracking facility 102) that perform various operations associated with generating and/or providing virtual entity description frames to be used for rendering frames of the virtual scene from the plurality of vantage points including the first and second virtual vantage points. For example, using the one or more physical computing devices, virtual entity description frame facility 104 may generate (e.g., based on the data representative of the plurality of virtual entities maintained by virtual entity state tracking facility 102) a virtual entity description frame representative of a state of at least one virtual entity (e.g., and, in some examples, all of the virtual entities) in the plurality of virtual entities at a particular point in a temporal sequence (e.g., a particular moment in real time, a particular point representing a moment on a virtual timeline unrelated to real time, etc.).

As used herein, a "virtual entity description frame" may refer to a dataset (e.g., including object description data represented in a language such as Java Script Object Notation ("JSON") or the like) that describes a state of one or more virtual entities included in a virtual 3D space of a virtual scene. For example, a virtual entity description frame may include data describing each of several virtual entities included in the virtual 3D space at a particular point in a temporal sequence. For instance, the virtual entity description frame may include state data representative of a location where each virtual entity is positioned with respect to a global coordinate system associated with the virtual 3D space, angles and orientations at which each virtual entity is positioned, relative sizes of each virtual entity, one or more movement vectors for each virtual entity, colors and/or textures for various surfaces of each virtual entity, and/or any other state data that may be used to describe particular virtual entities at the particular point in the temporal sequence as may serve a particular implementation. Exemplary virtual entity description frames will be described in more detail below.

Once virtual entity description frame facility 104 has generated the virtual entity description frame, virtual entity description frame facility 104 may provide the virtual entity description frame to a plurality of server-side 3D rendering engines associated with a content provider system. As used herein, "server-side" may refer to a server side (e.g., a provider's side) of a server-client transaction such as a transaction where a content provider system provides content (e.g., virtual reality media content) to a client device used by an end user. For example, as will be described in more detail below, a virtual reality media content provider system may provide virtual reality media content to a media player device associated with a user. As such, server-side systems and components may refer to those systems and components that are associated with (e.g., included within, implemented by, interoperate with, etc.) the content provider system to provide data (e.g., virtual reality media content) to the media player device (e.g., by way of a network). In contrast, "client-side" devices may be associated with the client device (e.g., the media player device) used by the user on the other side of the network, and may include devices that facilitate the client device with receiving the data from the content provider system (e.g., the media player device and/or other computer components operated by the user on the user's side of the network).

Accordingly, 3D rendering engines may be implemented on the server side of the network (i.e., associated with system 100 and/or other elements of a content provider system) by hardware and/or software resources that may be integrated with or separate from and communicatively coupled to the hardware and/or software resources of system 100. The 3D rendering engines may be configured to render, based on a virtual entity description frame, respective surface data frames associated with particular virtual vantage points. For example, virtual entity description frame facility 104 may provide the virtual entity description frame to a first 3D rendering engine associated with the first virtual vantage point and configured to render (e.g., based on the virtual entity description frame) a first surface data frame representative of color and depth data of surfaces of a virtual object visible from the first virtual vantage point at the particular point in the temporal sequence. Additionally, virtual entity description frame facility 104 may provide the same virtual entity description frame to a second 3D rendering engine associated with the second virtual vantage point and configured to render (e.g., also based on the virtual entity description frame) a second surface data frame representative of color and depth data of surfaces of the virtual object visible from the second virtual vantage point at the particular point in the temporal sequence.

As used herein, a "surface data frame" may refer to a dataset that represents various types of data associated with surfaces of objects (e.g., virtual objects) visible within a virtual scene from a particular vantage point and at a particular point in a temporal sequence associated with the virtual scene. For example, a surface data frame may include color data (i.e., image data) as well as depth data representative of the objects as viewed from a particular vantage point with respect to the virtual scene. As such, a plurality of related surface data frames may be sequenced together to create a video-like representation (representing not only color but also depth data) of the virtual scene as the virtual scene would be viewed or experienced from the particular vantage point. In certain examples, a surface data frame may further be associated with other types of data such as audio data, metadata (e.g., metadata including information about specific objects represented in the surface data frame and/or information about vantage points associated with the virtual scene), and/or other types of data as may serve a particular implementation. Examples of surface data frames associated with different vantage points, as well as sequences of related surface data frames will be described and illustrated below.

As used herein, "color data" may broadly include any image data, video data, or the like, whether represented in color or grayscale (i.e., "black and white"), that represents how a subject (e.g., a virtual object included within a virtual 3D space of a virtual scene) may appear at a particular point in a temporal sequence or over a particular time period from the perspective of a particular vantage point. Color data is not limited to any particular format, file type, frame rate, resolution, quality level, or other characteristic that may be associated with various definitions and/or standards defining image data and/or video data in the art. Similarly, as used herein, "depth data" may include any data representative of a position of a subject in space. For example, depth data representative of a virtual object may include coordinates with respect to a global coordinate system (e.g., a global coordinate system associated with the virtual 3D space of the virtual scene) for different points on the surfaces of the virtual object.

Storage facility 106 may maintain any suitable data received, generated, managed, tracked, maintained, used, and/or transmitted by facilities 102 or 104 in a particular implementation. For example, as shown, storage facility 106 may include virtual object data 108, which may include data (e.g., state data) associated with one or more virtual objects included within a virtual 3D space of a virtual scene, as well as virtual vantage point data 110, which may include data (e.g., state data) associated with one or more virtual vantage points into the virtual 3D space. Additionally, storage facility 106 may include data associated with other types of virtual entities included within the virtual 3D space of the virtual scene, instructions (e.g., programming instructions) for performing the operations described herein, and/or any other data as may facilitate facilities 102 and 104 in performing the operations described herein. For example, storage facility 106 may further include data (e.g., object description data, color data, depth data, audio data, metadata, etc.) associated with surface data frames, virtual entity description frames, and the like. Storage facility 106 may also maintain additional or alternative data as may serve a particular implementation.

In certain examples, system 100 may be associated with various other server-side systems (e.g., virtual scene control systems, asset storage systems, video data packaging systems, 3D rendering engines, etc.) included together in various configurations within a content provider system (e.g., a virtual reality media content provider system) in order to render surface data frames of a virtual scene from different vantage points and to provide the surface data frames (e.g., as part of virtual reality media content) to be presented to a user to allow the user to experience the virtual scene.

In some implementations, it will be understood that one or more of these other server-side systems may be integrated with (e.g., included within) system 100 or otherwise closely associated with system 100 (e.g., communicatively coupled to system 100, operated by the same or related virtual reality media provider entities, etc.). For example, in a particular implementation, system 100 may include an asset storage system storing color and depth data representative of one or more virtual objects, a plurality of 3D rendering engines communicatively coupled to the asset storage system, and a virtual entity state tracking system communicatively coupled to the asset storage system and/or to the 3D rendering engines. The entity state tracking system may be configured to perform one or more of the operations described above in relation to facilities 102 through 106. In other implementations, system 100 may be implemented as a separate, standalone system that is not integrated with these other server-side systems but, rather, is communicatively coupled to the other server-side systems and/or otherwise configured to interoperate with the other server-side systems as may serve a particular implementation.

Figure 2:
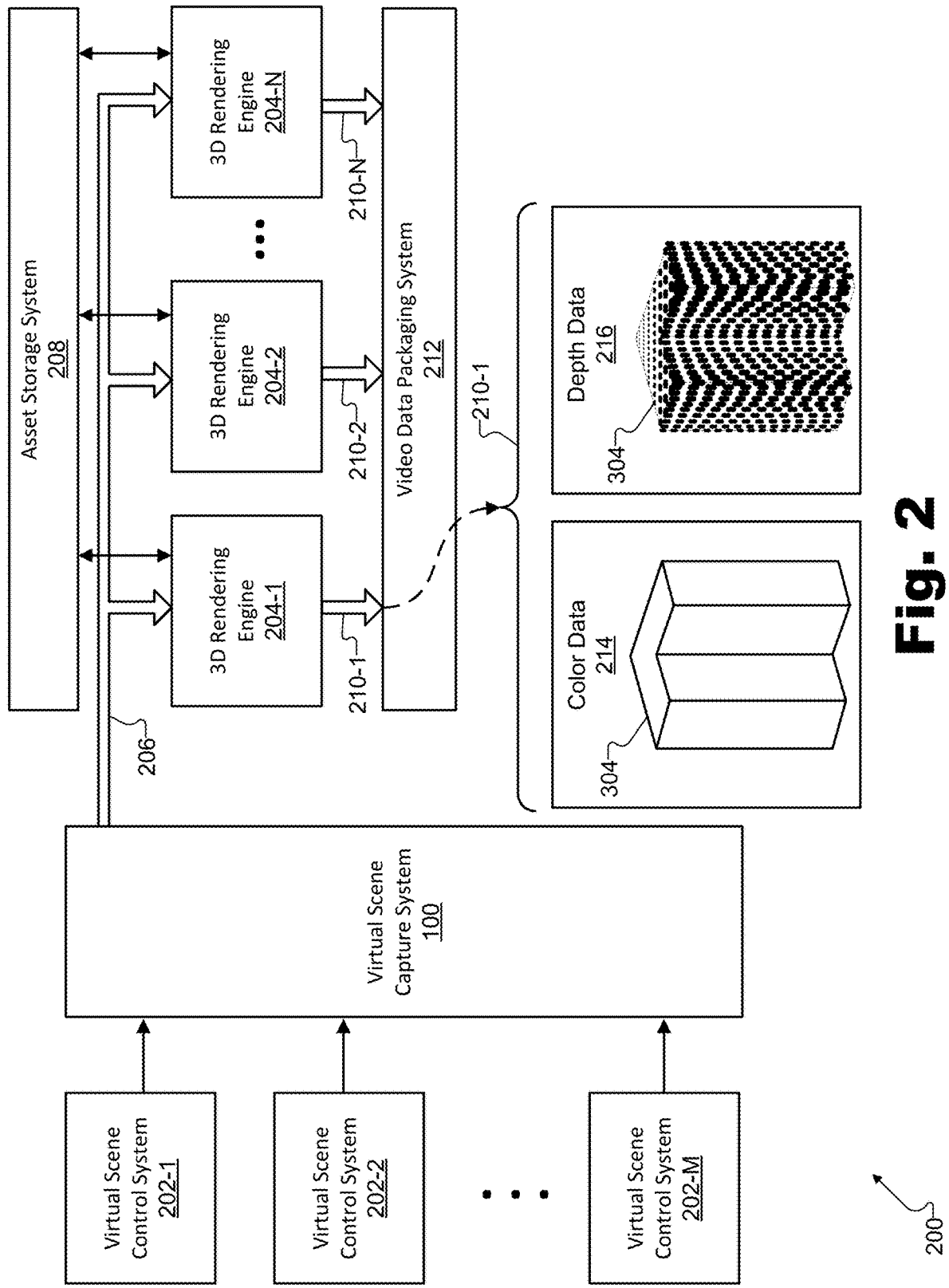
FIG. 2 illustrates an exemplary configuration in which the virtual scene capture system of FIG. 1 facilitates rendering frames of a virtual scene from different vantage points based on a virtual entity description frame of the virtual scene according to principles described herein.

By way of illustration, FIG. 2 shows an exemplary configuration 200 in which system 100 facilitates rendering frames of a virtual scene from different vantage points based on a virtual entity description frame of the virtual scene. As shown in FIG. 2, an implementation of system 100 may be communicatively coupled to a plurality of virtual scene control systems 202 (e.g., virtual scene control systems 202-1 through 202-M) as well as to a plurality of server-side 3D rendering engines 204 (e.g., 3D rendering engines 204-1 through 204-N). For example, system 100 may be communicatively coupled to virtual scene control systems 202 and/or to 3D rendering engines 204 by way of one or more networks (e.g., including any of the networks or network technologies described herein) or by way of other modes of communication as may serve a particular implementation. As shown in configuration 200, a virtual entity state tracking system that performs the operations described above in relation to facilities 102 through 106 may be implemented by system 100. As mentioned above, in other implementations, system 100 may embody both an entity tracking system configured to perform these operations and one or more of the other systems and devices illustrated in configuration 200.

System 100 may provide, via the communicative connection with 3D rendering engines 204, one or more virtual entity description frames including a virtual entity description frame 206. Based on virtual entity description frame 206 as well as data requested and received from an asset storage system 208 that is communicatively coupled with 3D rendering engines 204, 3D rendering engines 204 may each render respective surface data frames 210 (e.g., surface data frames 210-1 through 210-N) and may provide surface data frames 210 to a video data packaging system 212. System 100 has been described in detail above with respect to FIG. 1. Each of the other systems and items illustrated in configuration 200 will now be described in more detail.

Virtual scene control systems 202 may represent any computing systems configured to request and/or otherwise implement changes to one or more virtual entities included in a virtual 3D space of a virtual scene (e.g., virtual entities about which data is maintained by system 100). For example, one or more virtual scene control systems 202 (e.g., virtual scene control system 202-1) may be associated with (e.g., maintained by, operated by, etc.) a content creator responsible for originally generating the data representative of the virtual entities included within the virtual 3D space of the virtual scene. Additionally, in certain implementations, one or more other virtual scene control systems 202 (e.g., virtual scene control system 202-2) may be associated with an end user that is experiencing the virtual 3D space of the virtual scene. For example, virtual scene control system 202-2 may be implemented by a media player device currently rendering the virtual entities to allow a user of the media player device to experience and interact with the virtual entities within the virtual 3D space of the virtual scene.

Because system 100 may maintain one unified set of data representative of all the virtual entities included within the virtual 3D space (e.g., as opposed to separate sets of data representative of the virtual entities for each virtual scene control system 202), as each of virtual scene control systems 202 makes modifications to the virtual entities, those modifications may be reflected in the unified set of data. Accordingly, multiple users (i.e., different users associated with different virtual scene control systems 202) may all effect modifications to the same virtual 3D space of the same virtual scene. As a result, the modifications made by all of virtual scene control systems 202 may be reflected in virtual entity description frames output by system 100 (e.g., virtual entity description frame 206), and may, in turn, be reflected in each of the surface data frames rendered by 3D rendering engines 204 (e.g., surface data frames 210).

Figure 3:
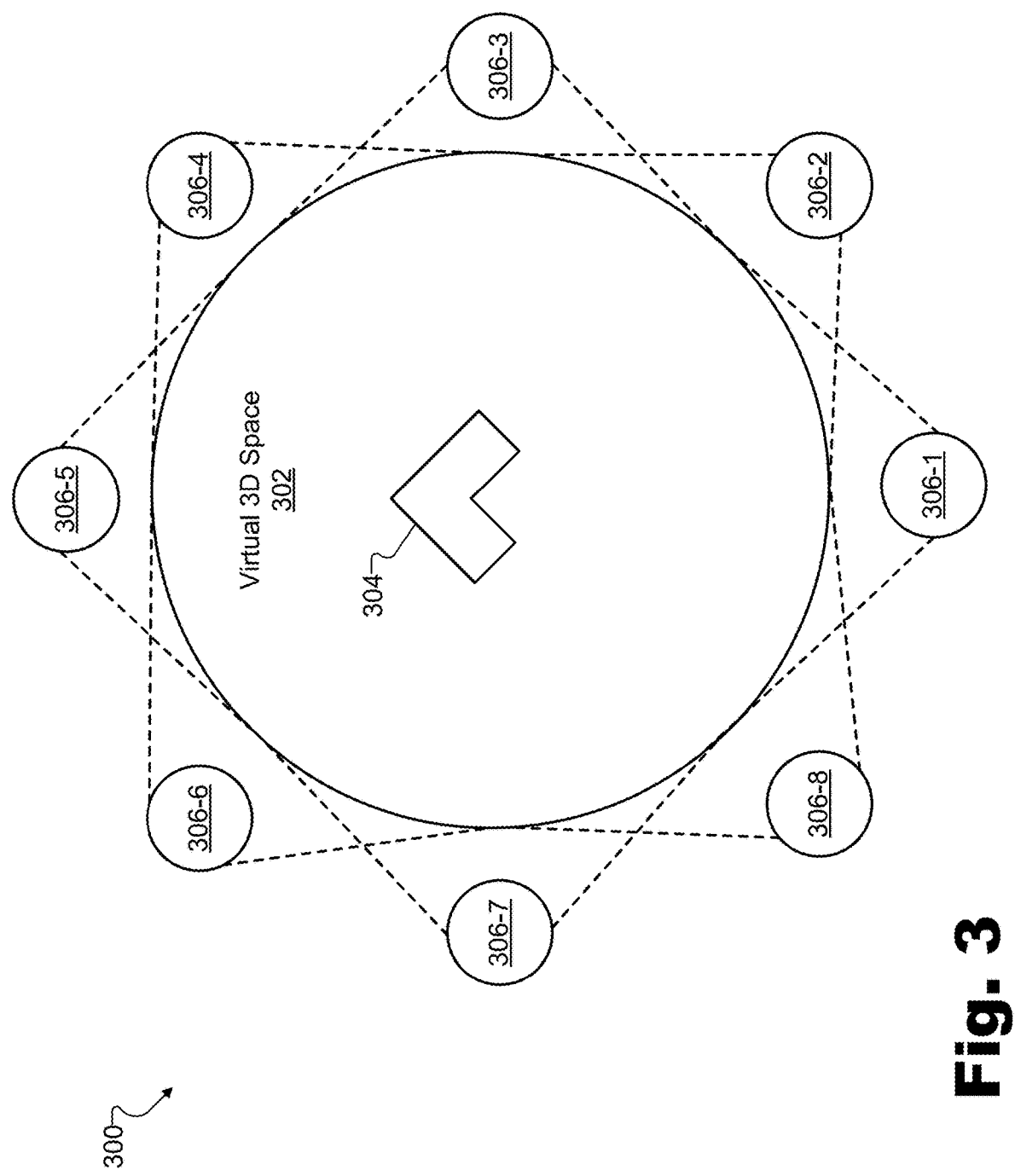
FIG. 3 illustrates an exemplary virtual scene including a plurality of virtual entities according to principles described herein.
Figure 4:
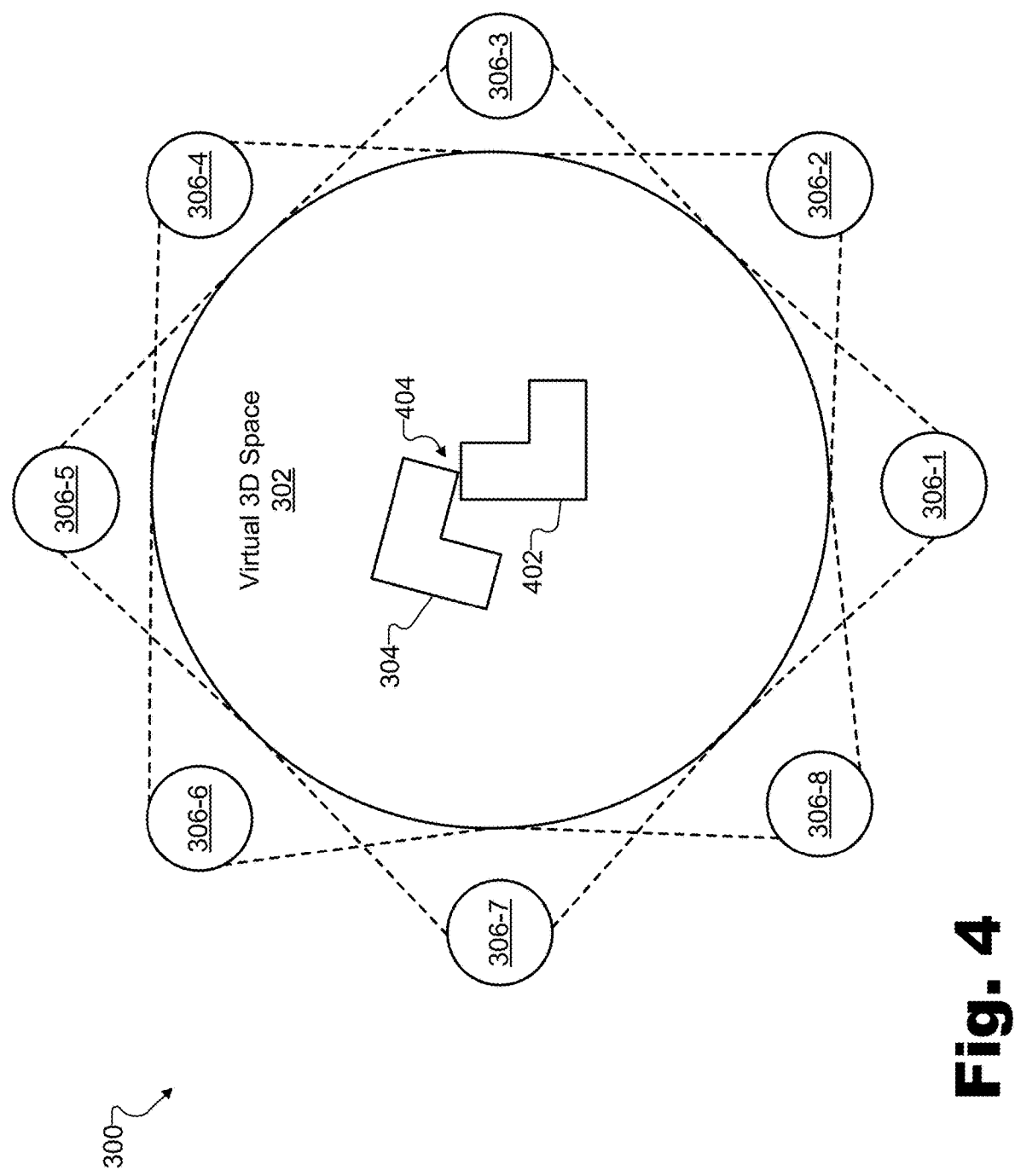
FIG. 4 illustrates exemplary modifications that may be made to the virtual scene of FIG. 3 according to principles described herein.

To illustrate how virtual scene control systems 202 may modify the virtual entities in a virtual 3D space, FIG. 3 shows an exemplary virtual scene 300 including a plurality of virtual entities, and FIG. 4 illustrates exemplary modifications that may be made to virtual scene 300. Specifically, referring first to FIG. 3, virtual scene 300 is associated with a virtual 3D space 302 that includes a virtual object 304 and is surrounded by a plurality of virtual vantage points 306 (e.g., virtual vantage points 306-1 through 306-8).

Virtual scene 300 may represent any type of scene (e.g., a real-world scene, a computer-generated scene, an event, etc.) as may serve a particular implementation. As illustrated by the circle, the virtual 3D space 302 associated with virtual scene 300 may be a specifically delineated area such as a stage, an arena, or the like. Conversely, in other examples, virtual 3D space 302 may not be so well defined or delineated. For example, virtual 3D space 302 may represent any indoor or outdoor location (e.g., based on the real world or based on an imaginary or computer-generated world), event, landscape, structure, or the like.

Virtual object 304 may represent any virtual object, whether living or inanimate, that is associated with (e.g., located within or around) virtual 3D space 302 and that is detectable (e.g., viewable, etc.) from at least one of virtual vantage points 306. For example, virtual object 304 may be based on a real-world object (e.g., an object for which a 3D model has been generated), an imaginary or computer-generated object, or the like. While virtual object 304 is drawn as a relatively simple geometric shape for the sake of clarity, it will be understood that virtual object 304 may represent various types of objects having various levels of complexity. Rather than a geometric shape, for instance, virtual object 304 could represent any animate or inanimate object or surface, such as a person or another living thing, a non-transparent solid, liquid, or gas, a less discrete object such as a wall, a ceiling, or a floor, or any other type of object described herein or as may serve a particular implementation. As shown, virtual object 304 may include various surfaces such that virtual object 304 may look different when viewed from each different virtual vantage point 306, as will be illustrated below.

Along with virtual object 304, virtual scene 300 also includes virtual vantage points 306 into virtual 3D space 302. As used herein, a virtual vantage point "into" a virtual 3D space may refer to a virtual vantage point that is positioned, angled, oriented, etc., with respect to the virtual 3D space in any suitable way. For example, a virtual vantage point into a virtual 3D space may be a virtual vantage point that is included within the virtual 3D space, is outside of the virtual 3D space with a perspective looking into the virtual 3D space, is surrounding the virtual 3D space along with other virtual vantage points, and/or is otherwise associated with the virtual 3D space in any suitable way so as to provide a view of at least some portion of the virtual 3D space.

As shown, each virtual vantage point 306 may be represented in FIG. 3 with a labeled circle disposed at a particular location with respect to virtual 3D space 302 and that has dotted lines emanating therefrom to illustrate a field of view associated with the virtual vantage point 306. The positions associated with virtual vantage points 306 may be fixed with respect to virtual 3D space 302, although, as will be described below, it may be possible for the fixed positions to be modified by one of virtual scene control systems 202. Additionally, in some examples, it will be understood that both virtual 3D space 302 and virtual vantage points 306 may be moving through virtual scene 300 together (e.g., such as a vehicular virtual 3D space like a spaceship, a hot air balloon, or the like). As shown, the fixed positions at which virtual vantage points 306 are disposed may, in some examples, surround virtual 3D space 302 along at least two dimensions associated with virtual 3D space 302 (e.g., along a plane such as the ground). In other examples, positions 306 may further surround virtual 3D space 302 along three dimensions (e.g., by including positions 306 above and below 302 as well). Even in examples where virtual vantage points 306 surround virtual 3D space 302 along only two dimensions, pluralities of virtual vantage points 306 may be "stacked" at different heights relative to the positions encircling virtual 3D space 302 shown in FIG. 3 in order to view virtual object 304 from related but slightly different perspectives.

While each of virtual vantage points 306 illustrated in FIG. 3 are angled inwardly toward virtual 3D space 302 so as to capture virtual 3D space 302 from various angles to enable virtual 3D space 302 to later be rendered from arbitrary virtual vantage points, it will be understood that, in certain examples, one or more of virtual vantage points 306 may be angled outwardly (i.e., away from virtual 3D space 302) to view virtual objects surrounding virtual 3D space 302 or the like. For instance, a 360-degree virtual vantage point may be positioned in the middle of virtual 3D space 302 (not explicitly shown) to provide data representative of virtual objects included within virtual 3D space 302 from additional perspectives and/or data representative of virtual objects outside of virtual 3D space 302.

As mentioned above, FIG. 4 illustrates exemplary modifications that may be made to virtual scene 300. Specifically, in some examples, system 100 may receive a command to modify the maintained data representative of the plurality of entities (i.e., data representative of virtual object 304, virtual vantage points 306, and/or any other virtual entities included in virtual 3D space 302), and, in response to the receiving of the command, may modify the maintained data representative of the plurality of virtual entities in accordance with the command. For example, the command may be sent (e.g., by way of a web socket or another suitable type of communication) by any of virtual scene control systems 202 using JSON code or another suitable object description code describing the modification that is to be made.

The virtual entities included within virtual scene 300 may be modified in any suitable manner, which may be determined in part by the type of the virtual entity being modified. For example, if the virtual entity being modified is a virtual object, the modifying of the maintained data representative of the plurality of virtual entities in accordance with the command may include adding an additional virtual object to the plurality of virtual entities. Additionally or alternatively, the modifying may include replacing the virtual object included within the plurality of virtual entities with an additional virtual object, removing the virtual object from the plurality of virtual entities, modifying at least one property of a virtual object included in the plurality of virtual entities, and/or otherwise modifying the virtual object with respect to other virtual entities and/or with respect to the virtual 3D space of the virtual scene.

To illustrate, FIG. 4 shows an additional virtual object 402 that is added to virtual 3D space 302 along with virtual object 304. It will be understood that in other examples, virtual object 402 could instead replace virtual object 304 (i.e., such that virtual object 304 is removed from virtual 3D space 302 while virtual object 402 is added to virtual 3D space 302). As further shown in FIG. 4, certain properties of virtual object 304 (e.g., the position and orientation of virtual object 304) may be modified. In other examples, other properties such as the size, color, texture, posture, and/or any other properties of virtual object 304 could similarly be modified.

If the virtual entity being modified is a virtual vantage point (e.g., one of virtual vantage points 306), the modifying of the maintained data representative of the plurality of virtual entities in accordance with the command may include adding an additional virtual vantage point to the plurality of virtual entities. Additionally or alternatively, the modifying may include modifying at least one of the plurality of virtual vantage points included within the plurality of virtual entities, removing at least one of the plurality of virtual vantage points from the plurality of virtual entities, or the like. For example, a field of view associated with one of virtual vantage points 306 (e.g., virtual vantage point 306-1) may be changed or turned to get a perspective on a different angle of virtual 3D space 302. In other examples, virtual vantage points 306 may be moved inward or outward (e.g., to create a zoomed in or zoomed out effect with respect to a particular virtual object within virtual 3D space 302), removed from the plurality of virtual vantage points 306, or otherwise modified. As another example, an additional virtual vantage point may be added to the plurality of virtual vantage points 306 to get another perspective on virtual objects 304 and 402 (e.g., a perspective that is not well covered by one of virtual vantage points 306-1 through 306-8).

As described above, in some examples, a virtual object such as virtual object 304 may be modified (e.g., moved and/or rotated with respect to virtual 3D space 302) based on a direct command from one of virtual scene control systems 202 to modify the virtual object. In other examples, however, a virtual object may be modified automatically (i.e., modified in the same or different ways but without being based on an explicit command from a virtual scene control system 202) based on interactions with other virtual entities included within virtual 3D space 302. More specifically, for example, the maintaining by system 100 of the data representative of the plurality of virtual entities may include applying (e.g., to the virtual objects included within the virtual 3D space of the virtual scene) at least one of a physics-based object behavior and an artificial intelligence-based (AI-based) object behavior.

For instance, a physics-based object behavior 404 is illustrated in FIG. 4. When a modification to add virtual object 402 to virtual 3D space 302 is made (e.g., by system 100), system 100 may determine that virtual objects 304 and 402 each represent solid virtual objects that cannot exist in the same virtual space. Accordingly, as illustrated by physics-based object behavior 404, locational and orientational properties of virtual object 304 may be modified in accordance with physics rules such that virtual object 402 partially displaces virtual object 304 (i.e., "bumps" virtual object 304 out of the way). Other physics-based object behaviors may mimic other rules of physics (e.g., real-world physics or imaginary physics that apply only in the virtual world) that define how objects interact with one another and with physical forces and principles (e.g., gravity, momentum, friction, buoyancy, light reflection, etc.). These physics-based object behaviors may also be applied to the maintained data representative of virtual objects included within virtual 3D space 302 by system 100. Moreover, AI-based object behaviors may also help define how virtual objects interact with one another and with the environment in which the virtual objects are placed. For example, AI-based object behaviors may be particularly applicable with virtual objects (e.g., avatars) representing living things such as people and/or animals who may use artificial intelligence to make "choices" such as where to walk within virtual 3D space 302, who to talk to and what to say, when to run from danger, and so forth.

Returning to FIG. 2, system 100 generates virtual entity description frames representative of the states of the virtual entities in the plurality of virtual entities at particular points in a temporal sequence (e.g., a real time sequence, a virtual timeline associated with time in a virtual world, etc.). For example, as shown, system 100 may generate a particular virtual entity description frame (i.e., virtual entity description frame 206), and may provide virtual entity description frame 206 to each of 3D rendering engines 204. 3D rendering engines 204 may be server-side 3D rendering engines (e.g., 3D rendering engines across a network and/or otherwise separated from client-side devices such as media player devices used by users). In some examples, 3D rendering engines 204 may be implemented by separate devices (e.g., separate servers, separate processors within a server, etc.) or by separate software processes (e.g., separate instruction threads, etc.), while in other examples, 3D rendering engines 204 may be integrated together into common hardware and/or software devices or processes as may serve a particular implementation. In some implementations, 3D rendering engines may be jointly operated with or even fully integrated into a virtual scene capture system such as system 100, while in other implementations 3D rendering engines may be operated separately (e.g., by a different entity providing cloud-based processing services or the like).

Certain virtual entity description frames provided to 3D rendering engines 204 may be key description frames that include state data representative of all the virtual entities associated with the virtual scene (i.e., virtual scene 300) at a particular point in the temporal sequence, while other virtual entity description frames may be update description frames representative of a state (e.g., at a particular point in the temporal sequence) of change of only those virtual entities associated with the virtual scene that have been modified since a previous key description frame was generated representing the state of all the virtual entities at a previous point in the temporal sequence. For example, referring to the modifications illustrated in FIG. 4, a key description frame may include state data associated with virtual objects 304 and 402, as well as state data associated with virtual vantage points 306. In contrast, an update description frame may include only state data associated with virtual objects 304 and 402 or only state data associated with changes to virtual objects 304 and 402, because, for example, virtual objects 304 and 402 may have been modified since a previous key description frame was generated. Data representative of the state of virtual vantage points 306 may not be represented in this exemplary update description frame because virtual vantage points 306 may have remained statically positioned and unchanged since the previous key description frame.

Figure 5:
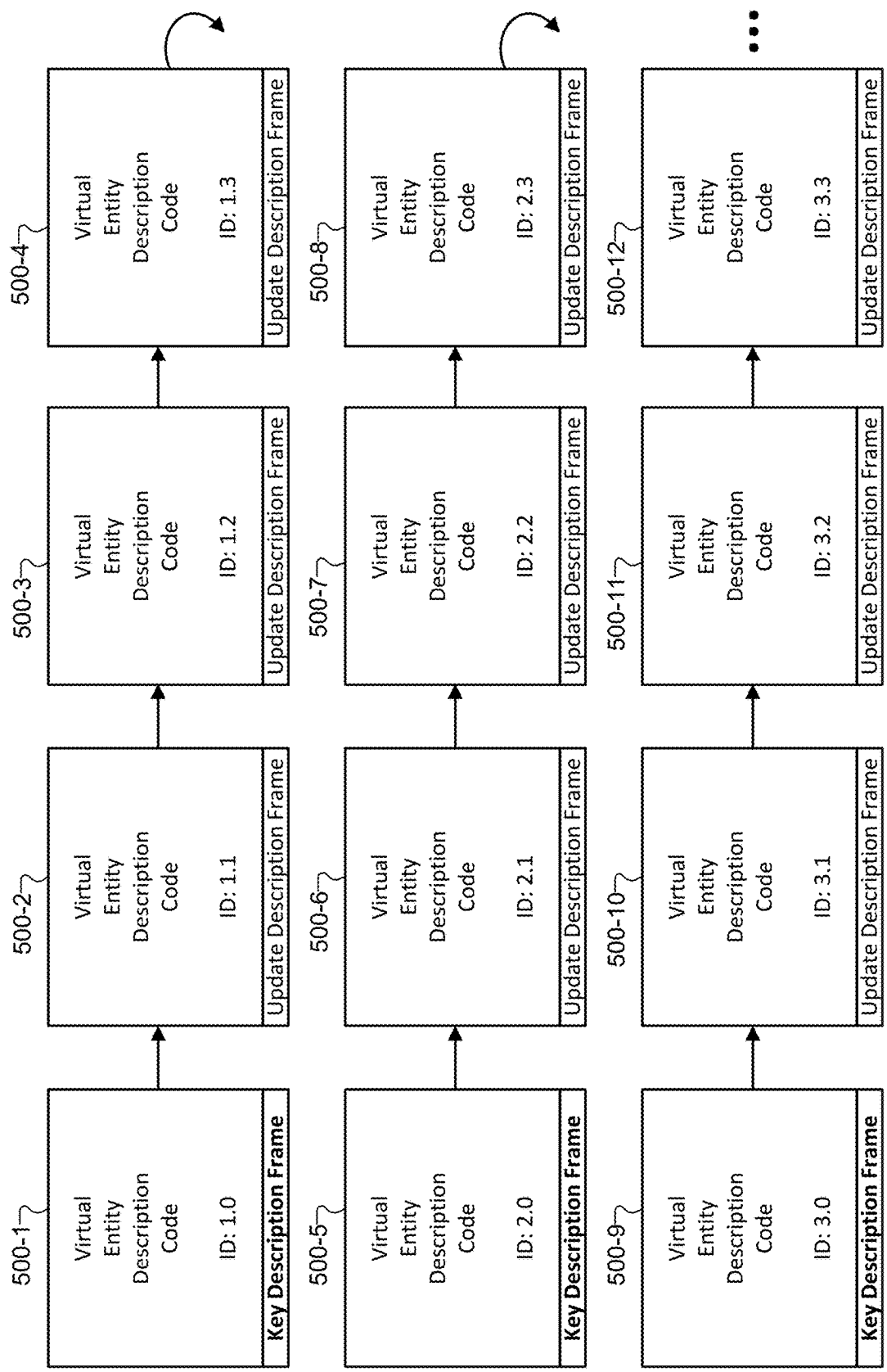
FIG. 5 illustrates exemplary virtual entity description frames that may be generated by the virtual scene capture system of FIG. 1 according to principles described herein.

FIG. 5 shows a plurality of exemplary virtual entity description frames 500 (e.g., virtual entity description frames 500-1 through 500-12) that may be generated by system 100. As indicated by arrows pointing from one virtual entity description frame 500 to another, virtual entity description frames 500 may be ordered in a temporal sequence starting with virtual entity description frame 500-1 and progressing to virtual entity description frame 500-12, after which the temporal sequence may progress to additional virtual entity description frames 500 that are not explicitly shown in FIG. 5. Along the bottom of each virtual entity description frame 500, the type of virtual entity description frame (e.g., key description frame or update description frame) is indicated. Specifically, virtual entity description frames 500-1, 500-5, and 500-9 are indicated as being key description frames, while virtual entity description frames 500-2 through 500-4, 500-6 through 500-8, and 500-10 through 500-12 are indicated as being update description frames.

Accordingly, in this example, each key description frame is followed in the temporal sequence by several (e.g., three) update description frames, which are in turn followed in the temporal sequence by another key description frame. It will be understood, however, that the arrangement of key description frames and update description frames shown in FIG. 5 is exemplary only, and that the arrangement of key and update description frames may be implemented in any way as may serve a particular implementation. For example, a virtual scene that is not particularly dynamic (i.e., is not affected by a large number of modifications to virtual entities) may be represented by relatively few key description frames followed by relatively large numbers of update description frames. Conversely, a virtual scene that is more dynamic may be represented by a larger proportion of key description frames (up to and including exclusively key description frames) and a smaller proportion of update description frames (down to and including no update description frames).

As further shown in FIG. 5, each virtual entity description frame 500 may include or be implemented by virtual entity description code (e.g., JSON code, XML code, or another type of code suitable for describing state data associated with the virtual entities maintained by system 100) and may be associated with a sequence number (e.g., an identification number or "ID") indicative of a position of the respective virtual entity description frame 500 in the temporal sequence with respect to other virtual entity description frames 500. For example, as shown, virtual entity description frame 500-1 may have a sequence number that is a whole number (i.e., "1.0") to indicate that virtual entity description frame 500-1 is a key description frame and to indicate the relative position of the frame with respect to other key description frames (e.g., "1.0" comes before "2.0"). Virtual entity description frames 500-2 through 500-4 may then each be associated with sequence numbers that begin with a 1 (i.e., to indicate that these frames are updates to key description frame 1.0) and include sub-identifiers (i.e., "0.1," "0.2," and "0.3") to indicate the relative positions of the update description frames in the temporal sequence with respect to other update description frames (e.g., "1.1" comes before "1.2"). This virtual entity description frame numbering scheme is exemplary only and any suitable frame numbering scheme may be employed as may serve a particular implementation.

Returning to FIG. 2, regardless of whether virtual entity description frame 206 is a key description frame (e.g., such as virtual entity description frames 500-1, 500-5, or 500-9) or an update description frame (e.g., such as the other virtual entity description frames 500 in FIG. 5), the sequence of virtual entity description frames including virtual entity description frame 206 may provide all the information needed by 3D rendering engines 204 to render virtual 3D space 302 of virtual scene 300 from the respective vantage points with which each 3D rendering engine 204 is associated. As such, it may not be necessary that 3D rendering engines 204 receive or process virtual entity description frames in order. Rather, 3D rendering engines 204 may render respective surface data frames 210 (e.g., which may each be generated from a single virtual entity description frame in the sequence) in any order as may be convenient or efficient for a particular 3D rendering engine 204, and the surface data frames 210 may be reordered and synchronized later (e.g., by video data packaging system 212).

In some examples, virtual entity description frame 206 may include state information representative of the virtual entities along with links to detailed information (e.g., binary data representative of virtual object geometries, textures, etc.) that is stored in asset storage system 208 and may be accessed, based on the links in virtual entity description frame 206, from asset storage system 208 by each of 3D rendering engines 204 as needed. Asset storage system 208 may be implemented by a separate device from system 100 and/or 3D rendering engines 204 (e.g., a separate server, a separate processor and storage facility within a server, etc.), by separate software processes (e.g., separate instruction threads, etc.), or may be integrated together into common hardware and/or software devices or processes with system 100 and/or 3D rendering engines 204 as may serve a particular implementation. In some implementations, asset storage system 208 may be jointly operated with or fully integrated into a virtual scene capture system such as system 100 and/or into a system that also includes 3D rendering engines 204, while in other implementations asset storage system 208 may be operated separately (e.g., by a different entity providing cloud-based processing services or the like).

In any case, between data included within virtual entity description frame 206 and data accessed from asset storage system 208 using links provided within virtual entity description frame 206, 3D rendering engines 204 may be receive access to all the information necessary to render surface data frames 210 representing virtual 3D space 302 from respective virtual vantage points without having to rely on information maintained locally by 3D rendering engines 204.

Each 3D rendering engine 204 may be associated with one of the virtual vantage points represented in the plurality of virtual entities maintained by system 100. For example, 3D rendering engines 204-1 through 204-8 (of which only 3D rendering engines 204-1 and 204-2 are explicitly shown in FIG. 2) may be associated with virtual vantage points 306-1 through 306-8 (illustrated in FIG. 3), respectively. As such, each 3D rendering engine 204 may render a respective surface data frame 210 as seen from the perspective (i.e., the position, angle, field of view, etc.) of the virtual vantage point 306 with which the particular 3D rendering engine 204 is associated. Moreover, as described above, each surface data frame 210 may include not only color data (i.e., image data) representative of the appearance of virtual objects from a respective virtual vantage point, but may also include depth data.

To illustrate, FIG. 2 shows images representative of surface data frame 210-1, which may be a surface data frame rendered by 3D rendering engine 204-1, the 3D rendering engine associated with virtual vantage point 306-1 (see FIG. 3). As shown, surface data frame 210-1 may include color data 214, which may represent a view of virtual 3D space 302 (including color data from the surfaces of virtual object 304) visible from virtual vantage point 306-1. While color data 214 is illustrated as an image in FIG. 2, it will be understood that color data 214 may be captured, encoded, formatted, transmitted, and represented in any suitable form. For example, color data may be digital data that is formatted according to a standard video encoding protocol, a standard image format, or the like. Color data 214 may represent a color image (e.g., similar to a color photograph) of the virtual objects included within virtual 3D space 302 as viewed from virtual vantage point 306-1. Additionally or alternatively, color data 214 may be a grayscale image representative of the virtual objects (e.g., similar to a black and white photograph).

Additionally, surface data frame 210-1 may include depth data 216, which may represent another view of virtual 3D space 302 that includes depth data for the surfaces of virtual object 304 from a point in space associated with virtual vantage point 306-1. Like color data 214, depth data 216 may depict virtual object 304 within virtual 3D space 302 from the perspective of virtual vantage point 306-1. However, rather than representing the visible appearance of virtual object 304 (i.e., representing in color or grayscale how light interacts with the surfaces of virtual object 304), depth data 216 may represent the depth (i.e., the distance or position) of each point on the surface of virtual object 304 (e.g., as well as other objects within virtual 3D space 302) relative to the virtual position of virtual vantage point 306-1. As with color data 214, depth data 216 may be captured, encoded, formatted, transmitted, and represented in any suitable form. For example, as shown, depth data 216 may be represented by grayscale image data (e.g., six or eight bits for each pixel represented within depth data 216). However, rather than representing how visible light reflects from the surfaces of virtual object 304 (i.e., as represented in color data 214), the grayscale image of depth data 216 may represent, for each pixel in the image, how far away the point represented by that pixel is from virtual vantage point 306-1. For example, points that are closer to virtual vantage point 306-1 may be represented with values that represent darker shades of gray (e.g., binary values closer to 0b111111 in the case of a six-bit implementation where 0b111111 represents black). Conversely, points that are farther away from virtual vantage point 306-1 may be represented with values that represent lighter shades of gray (e.g., binary values closer to 0b000000 in the case of the six-bit implementation where 0b000000 represents white).

Respective sets of surface data frames 210 may be generated by 3D rendering engines 204 such that each virtual entity description frame provided by system 100 (e.g., including virtual entity description frame 206) is associated with a respective set of surface data frames (e.g., a set that includes surface data frames 210-1 through 210-N) representing renderings of virtual 3D space 302 of virtual scene 300 from different virtual vantage points into virtual 3D space 302. As shown in FIG. 2, each surface data frame 210 in the respective sets of surface data frames may then be provided to video data packaging system 212, which may organize, synchronize, encode, compress, combine, and/or otherwise process the surface data frames to generate respective color video data streams and depth video data streams associated with each virtual vantage point 306.

Figure 6:
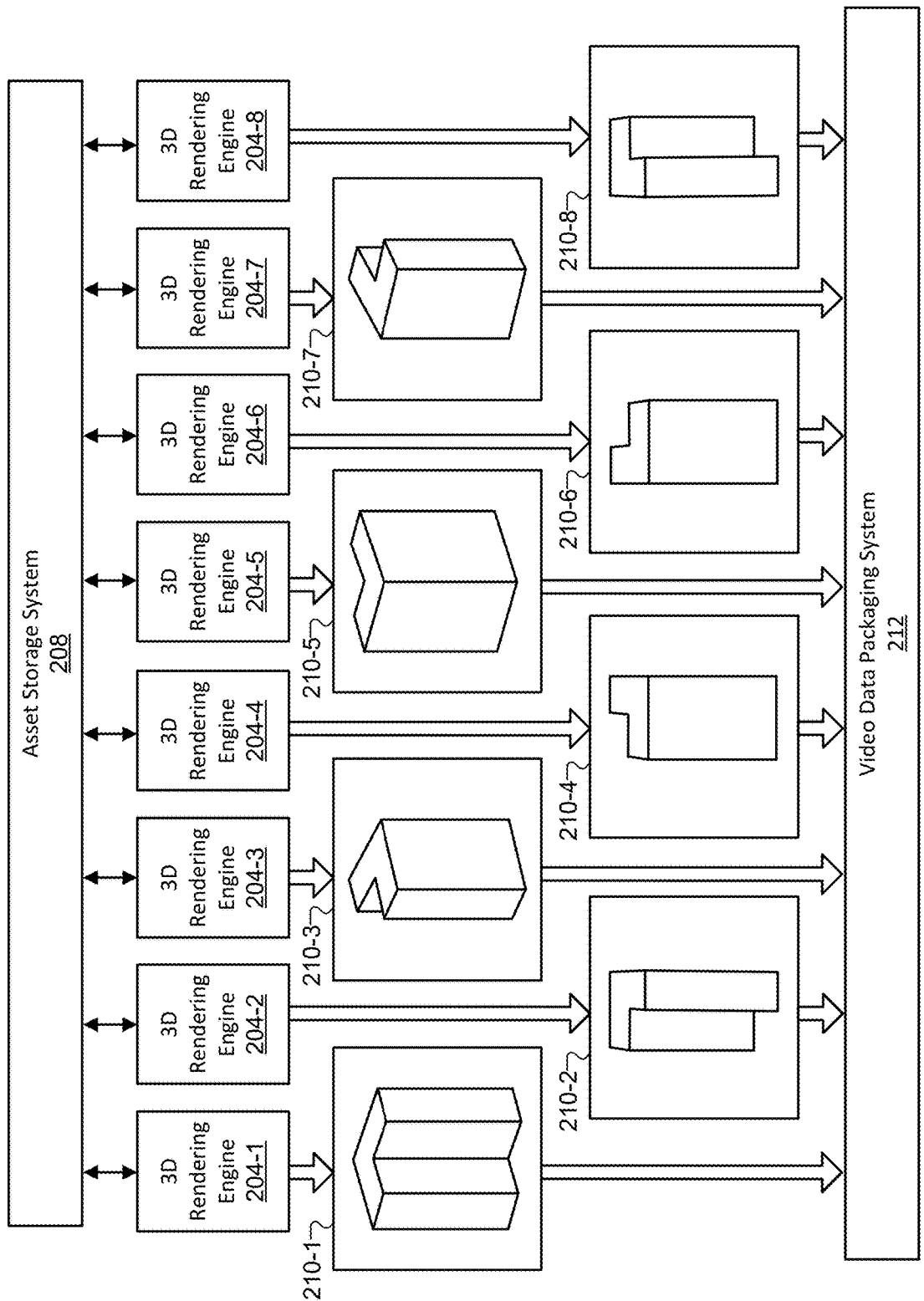
FIG. 6 illustrates exemplary three-dimensional ("3D") rendering engines that render surface data frames representative of color and depth data of surfaces of virtual objects visible from different vantage points based on an exemplary virtual entity description frame according to principles described herein.

To illustrate, FIG. 6 shows a more detailed view of certain components of configuration 200. Specifically, FIG. 6 illustrates eight 3D rendering engines 204 (i.e., 3D rendering engines 204-1 through 204-8) that render a complete set of surface data frames 210 (i.e., surface data frames 210-1 through 210-8). Surface data frames 210-1 through 210-8 may be representative of color and depth data of surfaces of virtual objects included within a virtual 3D space (e.g., virtual object 304 within virtual 3D space 302) as the surfaces would appear from different vantage points with respect to the virtual 3D space (e.g., virtual vantage points 306-1 through 306-8, respectively). It will be understood that, while surface data frames may each be represented in FIG. 6 by an image analogous to the color data image illustrated in FIG. 2 (i.e., the image illustrating color data 214), each surface data frame 210 may also include data representative of depth data, which may be represented by an image analogous to the depth data image illustrated in FIG. 2 (i.e., the image illustrating depth data 216).

3D rendering engines 204 may respectively generate surface data frames 210 from the associated virtual vantage points 306 based on virtual entity description frame 206, as well as based on data accessed from asset storage system 208, as described above. For example, the maintained data representative of the plurality of virtual entities associated with virtual scene 300 may include a link to color and depth data representative of virtual object 304 that is stored in asset storage system 208. As such, virtual entity description frame 206 (which may have been generated by system 100 and provided to 3D rendering engines 204 as described above) may be generated to include the link to the color and depth data representative of virtual object 304 stored in asset storage system 208. Each of 3D rendering engines 204 may be configured to render their respective surface data frames 210 from their respective virtual vantage points 306 by performing operations including receiving virtual entity description frame 206 from system 100, and accessing the color and depth data representative of virtual object 304 stored in asset storage system 208 from asset storage system 208 using the link included within virtual entity description frame 206. With both the data included within virtual entity description frame 206 and the color and depth data accessed from asset storage system 208, 3D rendering engines 204 may render surface data frames 210 to provide views of virtual 3D space 302 (e.g., including virtual object 304) from vantage points surrounding virtual 3D space 302, as shown.

Each surface data frame 210 may be included within a separate sequence of surface data frames representative of color and depth data of the surfaces of virtual object 304 visible from the respective virtual vantage point 306 during the temporal sequence. For example, surface data frame 210-1 may be included within a first sequence of surface data frames representative of color and depth data of the surfaces of virtual object 304 visible from virtual vantage point 306-1 during the temporal sequence, surface data frame 210-2 may be included within a second sequence of surface data frames representative of color and depth data of the surfaces of virtual object 304 visible from virtual vantage point 306-2 during the temporal sequence, and so forth. In other words, once surface data frames 210 have been rendered, each 3D rendering engine 204 may continue to render other surface data frames in different respective sequences of surface data frames. For example, 3D rendering engines 204 may receive additional virtual entity description frames after virtual entity description frame 206 (e.g., such as the sequence of virtual entity description frames 500 illustrated in FIG. 5), and may generate further surface data frames based upon the additional virtual entity description frames.

Figure 7:
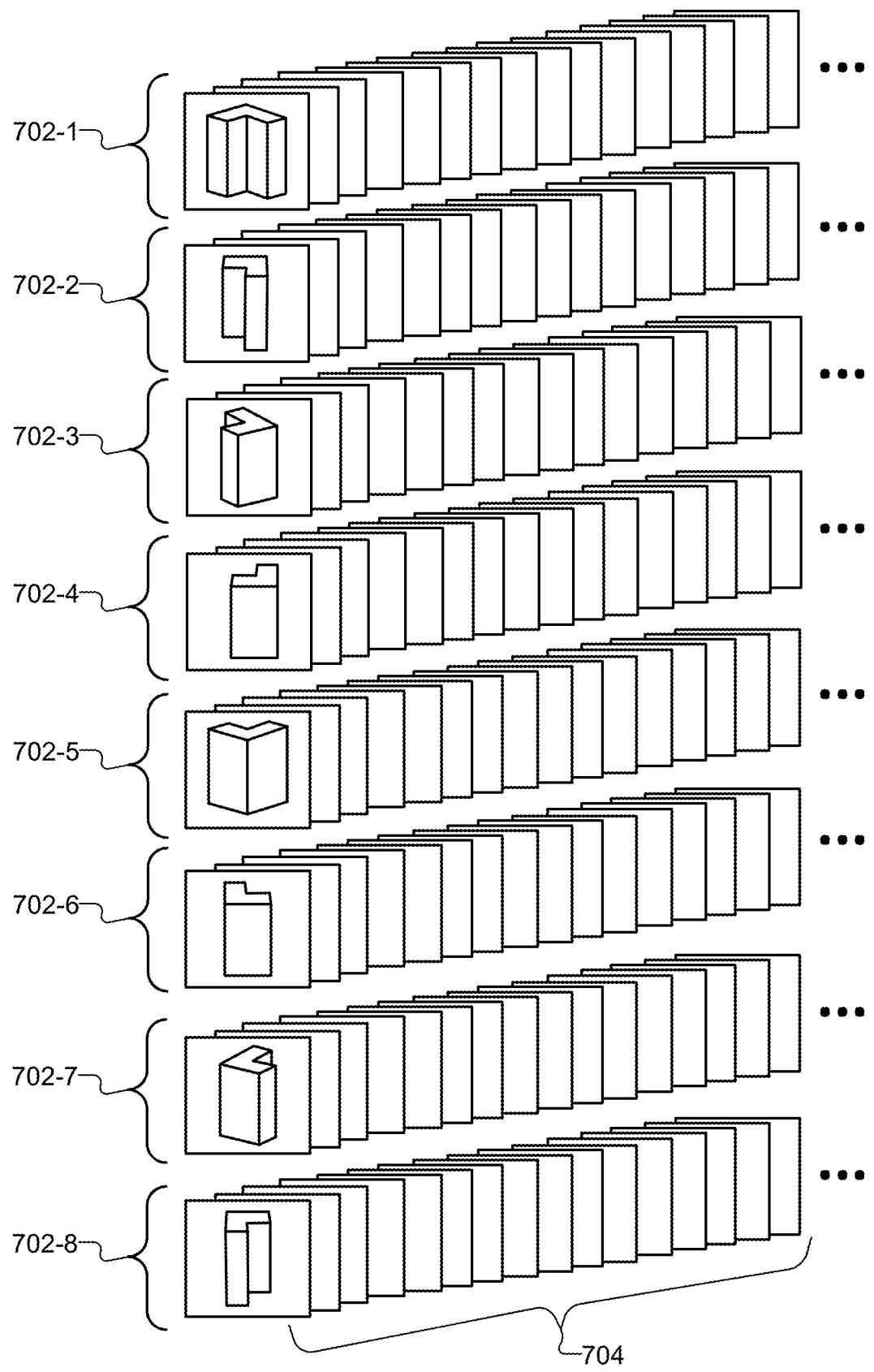
FIG. 7 illustrates a plurality of exemplary frame sequences of surface data frames representative of color and depth data of surfaces of an exemplary virtual object visible from different vantage points according to principles described herein.

To illustrate, FIG. 7 shows a plurality of exemplary frame sequences 702 (e.g., frame sequences 702-1 through 702-8) of surface data frames representative of color and depth data of surfaces of virtual object 304 visible from vantage points 306-1 through 306-8, respectively. For example, the first surface data frames in each frame sequence 702 (i.e., the surface data frames that are uncovered so that different views of object 304 are visible in FIG. 7) may correspond to surface data frames 210 illustrated in FIG. 6. Accordingly, frame sequences 702-1 through 702-8 may be associated, respectively, with 3D rendering engines 204-1 through 204-8 and, thus, with virtual vantage points 306-1 through 306-8. For example, frame sequence 702-1 may represent both the color and the depth of virtual objects included within virtual 3D space 302 as viewed from virtual vantage point 306-1 during a particular temporal sequence 704 (e.g., a particular period of real time, a particular virtual timeline associated with an immersive virtual reality world, etc.). Similarly, frame sequence 702-2 may represent the color and depth of virtual objects included within virtual 3D space 302 as viewed from virtual vantage point 306-2 during temporal sequence 704, and so forth for frame sequences 702-3 through 702-8.

As described and illustrated above, each of the surface data frames generated by 3D rendering engines 204 and included in frame sequences 702 may be transmitted or otherwise passed into video data packaging system 212, which may be communicatively coupled to 3D rendering engines 204. Based on each of the different frame sequences 702 of surface data frames, video data packaging system 212 may generate one or more transport streams to transmit a color video data stream and a depth video data stream for each of virtual vantage points 306. For example, video data packaging system 212 may generate a single transport stream that contains individual color video data streams and depth video data streams associated with each frame sequence 702 (i.e., associated with each 3D rendering engine 204 and virtual vantage point 306), or video data packaging system 212 may generate different transports streams for the color video data stream and depth video data stream associated with each frame sequence 702.

Once a transport stream is generated, video data packaging system 212 may provide the transport stream for streaming to a client-side media player device associated with a user. For example, video data packaging system 212 may stream (e.g., transmit by way of a network) the transport stream to the media player device itself, or may include the transport stream in a data pipeline in which the transport stream will be further processed and streamed to the media player device by another system (e.g., after being processed and/or repackaged by other devices, processes, and/or systems associated with the pipeline).

As mentioned above, in some examples, system 100 and/or other systems (e.g., other server-side systems) and devices described herein for rendering frames of a virtual scene from different vantage points based on a virtual entity description frame may be used to generate virtual reality media content to be experienced by users. For example, in addition to the operations described above, a virtual reality media content provider system (e.g., within which system 100, video data packaging system 212, and/or other devices and systems described herein may be included or with which these systems may otherwise be associated) may further generate and provide virtual reality media content based on the transport stream that video data packaging system 212 generates and provides. The virtual reality media content may be representative of a virtual scene and may be presentable to the user so as to be experienced from a dynamically selectable virtual vantage point corresponding to an arbitrary virtual location with respect to the virtual scene. For example, the dynamically selectable virtual vantage point may be selected by the user of the media player device while the user is experiencing the virtual scene using the media player device. Moreover, the virtual reality media content may be provided (e.g., by the virtual reality media content provider system that includes or is otherwise associated with system 100) to the media player device to allow the user to experience the virtual scene from the dynamically selectable virtual vantage point corresponding to the arbitrary virtual location within the virtual scene.

Figure 8:
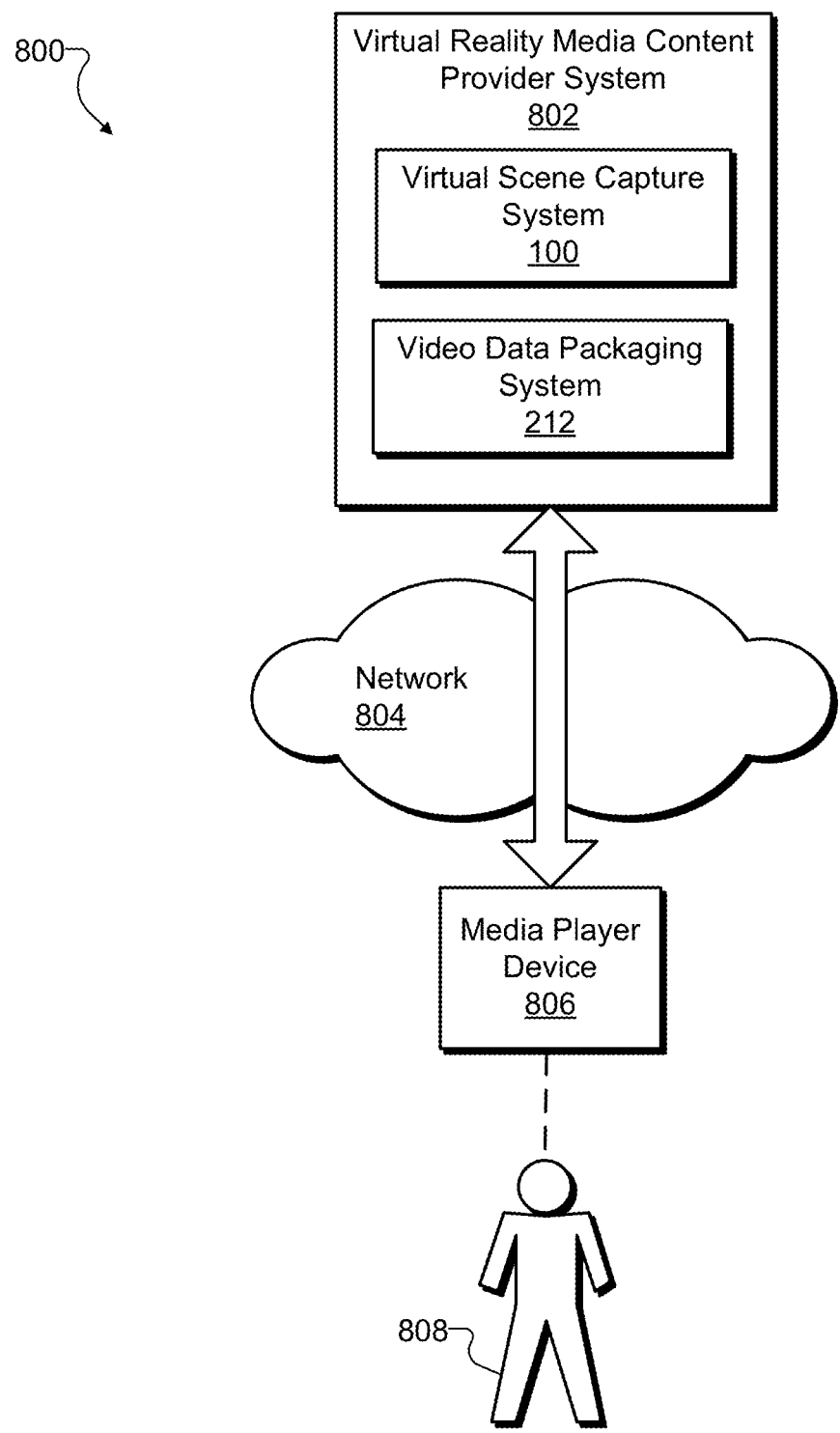
FIG. 8 illustrates an exemplary configuration in which an exemplary virtual reality media content provider system generates virtual reality media content that is provided by way of a network to an exemplary client-side media player device used by a user to experience a virtual scene according to principles described herein.

To illustrate, FIG. 8 shows an exemplary configuration 800 in which an exemplary virtual reality media content provider system 802 ("provider system 802") that includes system 100 and video data packaging system 212 generates virtual reality media content that is provided by way of a network 804 to an exemplary client-side media player device 806 ("media player device 806") used by a user 808 to experience a virtual scene.

After one or more transport streams have been generated based on frame sequences 702 as described above, provider system 802 may further encode, package, encrypt, or otherwise process the one or more transport streams to form virtual reality media content that media player device 806 may be configured to render. For example, the virtual reality media content may include or be representative of a plurality of 2D video data streams (e.g., 2D video data streams associated with color data and with depth data for each virtual vantage point 306) that may be rendered by media player device 806 so as to present a view of virtual scene 300 from any arbitrary virtual vantage point within virtual scene 300 (e.g., including virtual vantage points other than virtual vantage points 306 that may be of interest to user 808), as will be described below. Additionally or alternatively, the virtual reality media content may include data representative of one or more volumetric models (e.g., 3D or 4D models) of virtual objects included within virtual scene 300 that also may be rendered so as to be viewable from arbitrary virtual vantage points. The virtual reality media content may then be distributed by way of network 804 to one or more media player devices such as media player device 806 associated with user 808. For example, provider system 802 may provide the virtual reality media content to media player device 806 so that user 808 may experience virtual scene 300 virtually using media player device 806.

In some examples, it may be undesirable for user 808 to be limited to one or more discrete positions within an immersive virtual reality world represented by the virtual reality media content (e.g., representative of virtual scene 300). As such, provider system 802 may provide sufficient data within the virtual reality media content representative of virtual scene 300 to allow virtual scene 300 to be rendered not only from virtual vantage points 306, but from any dynamically selectable virtual vantage point corresponding to an arbitrary virtual location within virtual scene 300 (e.g. within or around virtual 3D space 302). For example, the dynamically selectable virtual vantage point may be selected by user 808 while user 808 is experiencing virtual scene 300 using media player device 806.

As used herein, an "arbitrary virtual location" may refer to any virtual point in space associated with a virtual scene (e.g., within or around a virtual 3D space of the virtual scene). For example, arbitrary virtual locations are not limited to fixed positions surrounding the virtual scene (e.g., fixed positions associated with virtual vantage points 306), but also include all the positions between the positions associated with virtual vantage points 306 and positions inside of virtual 3D space 302. Moreover, arbitrary virtual locations may be associated with arbitrary virtual vantage points not limited to aligning with any of virtual vantage points 306. In some examples, such arbitrary virtual locations may correspond to the most desirable virtual vantage points within virtual scene 300. For instance, if virtual scene 300 includes a basketball game, user 808 may dynamically select virtual vantage points from which to experience the game that are in any arbitrary virtual location on the basketball court. For example, the user may dynamically select his or her virtual vantage points to follow the basketball up and down the basketball court and experience the basketball game as if standing on the basketball court in the middle of the action of the game. In other words, for example, while virtual vantage points 306 may be positioned at fixed positions surrounding the basketball court, user 808 may dynamically select arbitrary virtual vantage points from which to experience the game that are associated with any arbitrary position on the basketball court.

Network 804 may include a provider-specific wired or wireless network (e.g., a cable or satellite carrier network or a mobile telephone network), the Internet, a wide area network, a content delivery network, or any other suitable network. Data may flow between provider system 802 and media player device 806 (as well as other media player devices not explicitly shown) using any communication technologies, devices, media, and protocols as may serve a particular implementation.

Media player device 806 may be used by user 808 to access and experience virtual reality media content received from provider system 802. For example, media player device 806 may be configured to generate (e.g., based on the color video data stream and the depth video data stream for each of the virtual vantage points included within the transport stream, which may be 2D video data streams) a 3D representation of virtual 3D space 302 of virtual scene 300 to be experienced by user 808 from an arbitrary virtual vantage point (e.g., a dynamically selectable virtual vantage point selected by the user and corresponding to an arbitrary virtual location within virtual 3D space 302). To this end, media player device 806 may include or be implemented by any device capable of presenting a field of view of an immersive virtual reality world (e.g., an immersive virtual reality world representative of virtual scene 300) and detecting user input from user 808 to dynamically update the immersive virtual reality world presented within the field of view as user 808 experiences the immersive virtual reality world.

Figure 9:
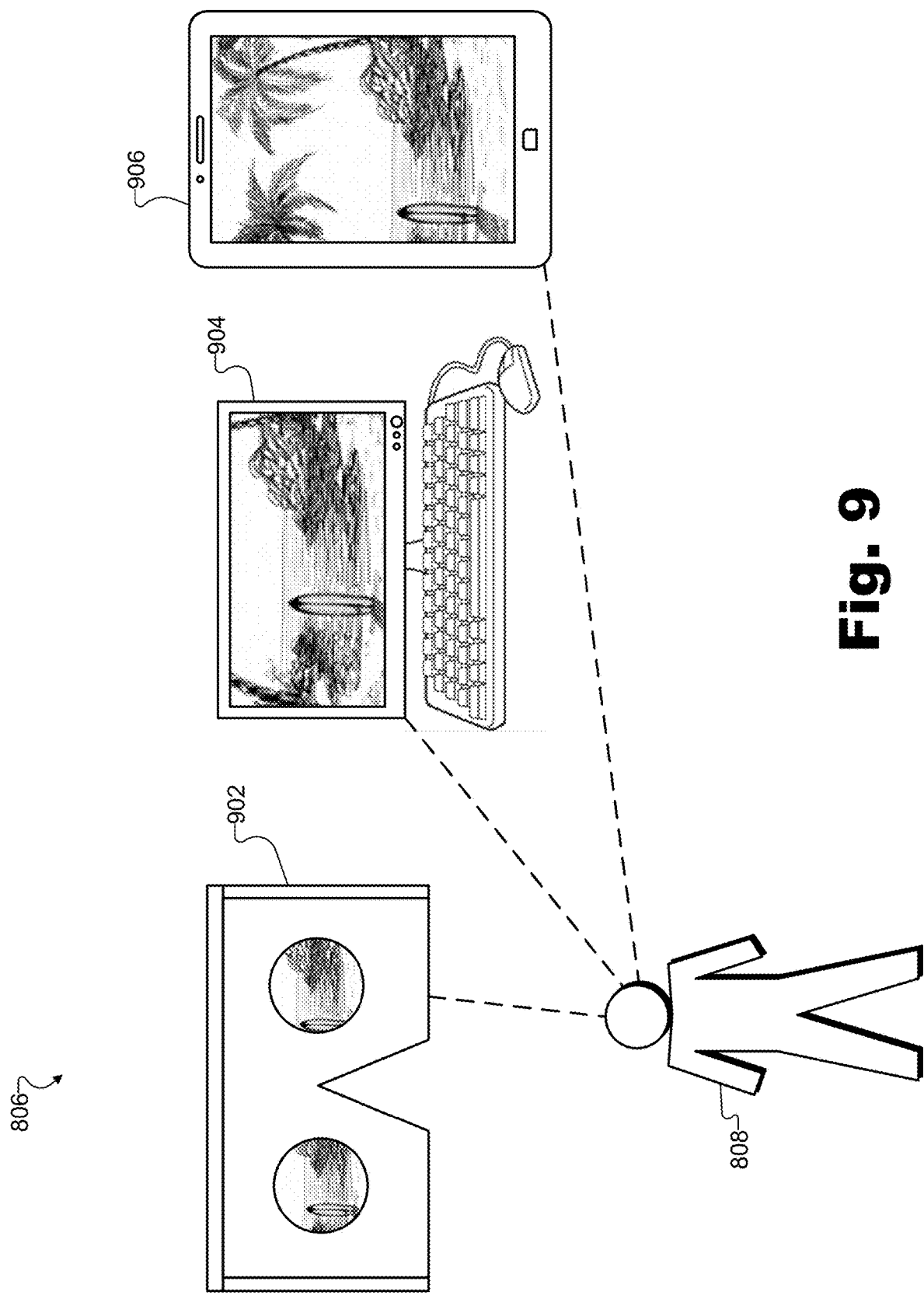
FIG. 9 illustrates various exemplary types of media player devices that may be used by a user to experience virtual reality media content according to principles described herein.

For example, FIG. 9 shows various exemplary types of media player devices 806 that may be used by user 808 to experience virtual reality media content. Specifically, as shown, media player device 806 may take one of several different form factors such as a head-mounted virtual reality device 902 (e.g., a virtual reality gaming device) that includes a head-mounted display screen, a personal computer device 904 (e.g., a desktop computer, laptop computer, etc.), a mobile or wireless device 906 (e.g., a smartphone, a tablet device, etc., possibly mounted to the head of user 808 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 808.

Figure 10:
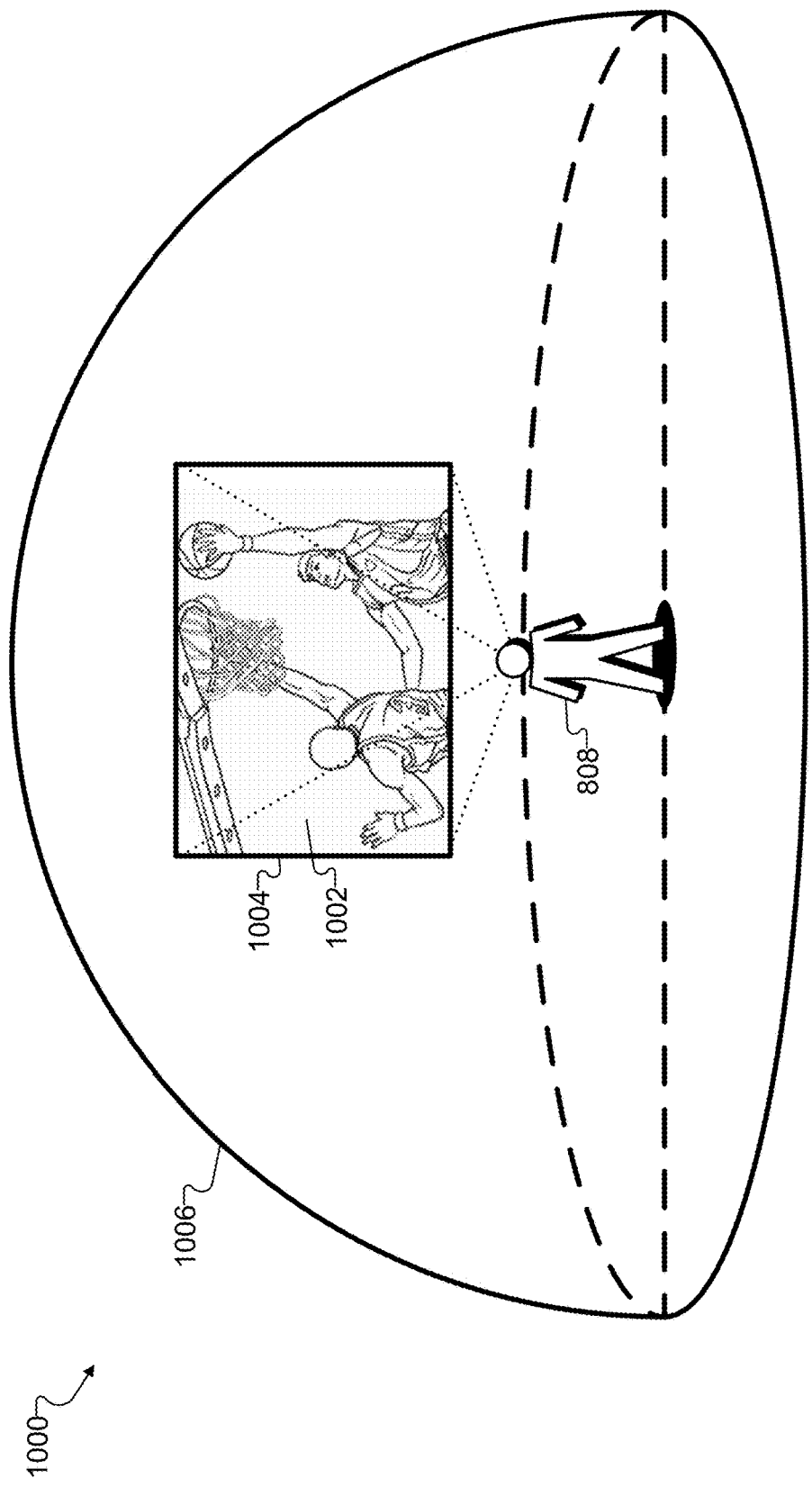
FIG. 10 illustrates an exemplary virtual reality experience in which a user is presented with exemplary virtual reality media content representative of a virtual scene as experienced from a dynamically selectable virtual vantage point corresponding to an exemplary arbitrary virtual location with respect to the virtual scene according to principles described herein.

FIG. 10 illustrates an exemplary virtual reality experience 1000 in which user 808 is presented with exemplary virtual reality media content representative of a virtual scene as experienced from a dynamically selectable virtual vantage point corresponding to an exemplary arbitrary virtual location with respect to the virtual scene. Specifically, virtual reality media content 1002 is presented within a field of view 1004 that shows a virtual scene from a virtual vantage point corresponding to an arbitrary virtual location right underneath a basketball standard within the virtual 3D space of the virtual scene where a shot is being made. An immersive virtual reality world 1006 based on the virtual scene may be available for the viewer to experience by providing user input (e.g., head movements, keyboard input, etc.) to look around and/or to move around (i.e., dynamically select a virtual vantage point from which to experience) immersive virtual reality world 1006.

For example, field of view 1004 may provide a window through which user 808 may easily and naturally look around immersive virtual reality world 1006. Field of view 1004 may be presented by media player device 806 (e.g., on a display screen of media player device 806) and may include video depicting objects surrounding the user within immersive virtual reality world 1006. Additionally, field of view 1004 may dynamically change in response to user input provided by user 808 as user 808 experiences immersive virtual reality world 1006. For example, media player device 806 may detect user input (e.g., moving or turning the display screen upon which field of view 1004 is presented). In response, field of view 1004 may display different objects and/or objects seen from a different virtual vantage point or virtual location in place of the objects seen from the previous virtual vantage point or virtual location.

In FIG. 10, immersive virtual reality world 1006 is illustrated as a semi-sphere, indicating that user 808 may look in any direction within immersive virtual reality world 1006 that is substantially forward, backward, left, right, and/or up from the virtual vantage point of the location under the basketball standard that user 808 has currently selected. In other examples, immersive virtual reality world 1006 may include an entire 360° by 180° sphere such that user 808 may also look down. Additionally, user 808 may move around to other locations within immersive virtual reality world 1006 (i.e., dynamically selecting different dynamically selectable virtual vantage points within the virtual 3D space). For example, user 808 may select a virtual vantage point at half court, a virtual vantage point from the free-throw line facing the basketball standard, a virtual vantage point suspended above the basketball standard, or the like.

Figure 11:
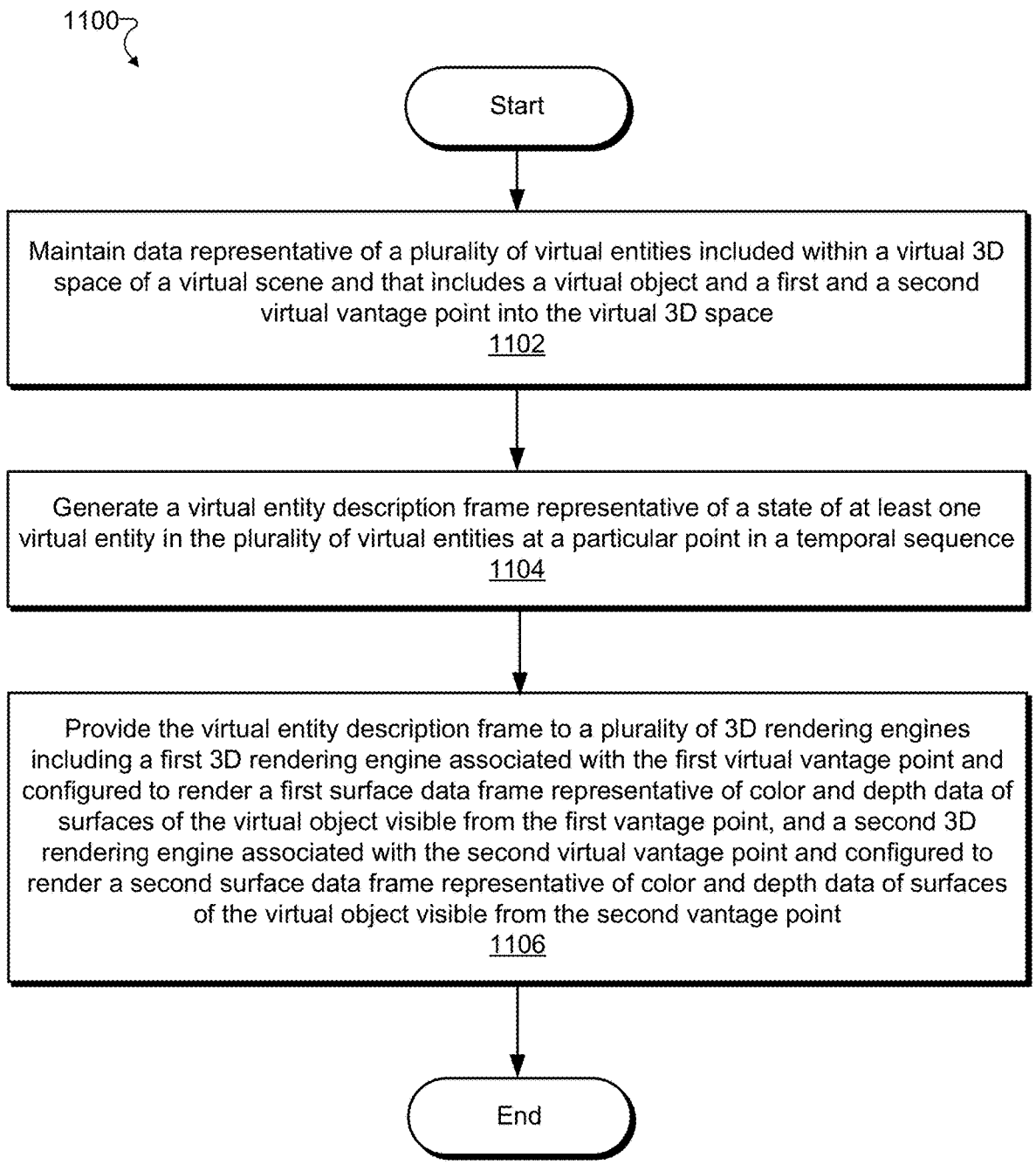
FIG. 11 illustrates an exemplary method for rendering frames of a virtual scene from different vantage points based on a virtual entity description frame of the virtual scene according to principles described herein.

FIG. 11 illustrates an exemplary method 1100 for rendering frames of a virtual scene from different vantage points based on a virtual entity description frame of the virtual scene. While FIG. 11 illustrates exemplary operations according to one embodiment, other embodiments may omit, add to, reorder, and/or modify any of the operations shown in FIG. 11. One or more of the operations shown in FIG. 11 may be performed by system 100 and/or by any implementation thereof.

In operation 1102, a virtual scene capture system may maintain data representative of a plurality of virtual entities included within a virtual 3D space of a virtual scene. The plurality of virtual entities may include a virtual object and a plurality of virtual vantage points into the virtual 3D space. Specifically, for example, the plurality of virtual vantage points may include a first virtual vantage point and a second virtual vantage point different from the first virtual vantage point. Operation 1102 may be performed in any of the ways described herein.

In operation 1104, the virtual scene capture system may generate a virtual entity description frame representative of a state of at least one virtual entity in the plurality of virtual entities at a particular point in a temporal sequence. For example, the virtual scene capture system may generate the virtual entity description frame based on the maintained data representative of the plurality of virtual entities. Operation 1104 may be performed in any of the ways described herein.

In operation 1106, the virtual scene capture system may provide the virtual entity description frame generated in operation 1104 to a plurality of server-side 3D rendering engines associated with a content provider system. For example, the virtual scene capture system may provide the virtual entity description frame to a first 3D rendering engine associated with the first virtual vantage point and configured to render, based on the virtual entity description frame, a first surface data frame representative of color and depth data of surfaces of the virtual object visible from the first virtual vantage point at the particular point in the temporal sequence. Moreover, the virtual scene capture system may provide the virtual entity description frame to a second 3D rendering engine associated with the second virtual vantage point and configured to render, based on the virtual entity description frame, a second surface data frame representative of color and depth data of surfaces of the virtual object visible from the second virtual vantage point at the particular point in the temporal sequence. Operation 1106 may be performed in any of the ways described herein.

Various methods and systems have been described above for rendering frames of a virtual scene from different vantage points (e.g., virtual vantage points) based on virtual entity description frames of the virtual scene. For example, as described above, system 100 may work in conjunction with other systems such as virtual scene control systems 202, 3D rendering engines 204, asset storage system 208, and so forth, to maintain data representative of virtual entities included within a virtual 3D space of a virtual scene, generate virtual entity description frames representative of the state of the virtual entities, and provide the virtual entity description frames to 3D rendering engines to render surface data frames representative of color and depth data.

Methods and systems for generating and providing virtual reality data that accounts for level of detail will now be described. As will be described and otherwise made apparent below, methods and systems described below for generating and providing virtual reality data that accounts for level of detail may be associated with methods and systems described above in various ways. In some examples, as will be made apparent below, methods and systems for generating and providing virtual reality data that accounts for level of detail may not be associated with methods and systems for rendering frames of a virtual scene from different vantage points based on virtual entity description frames, but rather may stand alone, or be implemented separately from such methods and systems.

As used herein, virtual reality data may "account for level of detail" when different parts of a virtual 3D space are represented at different levels of quality or detail such as by using different pixel resolutions (e.g., different resolutions per unit distance such as different pixels per meter, etc.), different numbers of bits to represent color or depth, or the like. In certain examples, methods and systems described herein may generate virtual reality data at select levels of detail based on the amount of detail that a user may be expected to appreciate (e.g., notice, distinguish, enjoy, etc.) when experiencing virtual reality content rendered based on the virtual reality data. For example, a particular instance of virtual reality data may account for level of detail with respect to a particular vantage point if the instance of virtual reality data distinguishes between detail that will and will not be appreciable from the particular vantage point. Specifically, the virtual reality data may include a relatively large amount of data associated with a high level of detail (e.g., high pixel resolution per unit distance, high numbers of bits to represent rich colors and subtle differences in depth, etc.) related to surfaces near the particular vantage point that a user experiencing the virtual 3D space from a location at or near the particular vantage point may be able to fully appreciate. At the same time, the virtual reality data may include a smaller amount of data associated with a lower level of detail related to surfaces that are relatively remote from the particular vantage point, and that the user may not be able to fully appreciate. In addition or as an alternative to accounting for level of detail, methods and systems described below provide other benefits (e.g., related to efficiency, experience quality, etc.), as will be described and made apparent below.

Methods and systems described below may leverage particular coordinate systems, techniques, methodologies, etc., in order to generate and provide virtual reality data that accounts for level of detail with respect to particular vantage points of users experiencing the virtual reality data. In one implementation, for example, a virtual reality provider system may access surface data (e.g., included within or linked to by one or more surface data frames) representative of a virtual 3D space of a virtual scene. As with other surface data (e.g., surface data frames) described herein, the accessed surface data may include both color and depth data for surfaces included within the virtual 3D space. Based on the accessed surface data, the virtual reality provider system may orthographically project (e.g., render, construct, generate, reproject, etc.) a respective plurality of adjacent surface data slices of the virtual 3D space along each of three orthogonal axes in a coordinate system associated with the virtual 3D space. For instance, as will be described and illustrated in more detail below, the virtual reality provider system may orthographically project respective pluralities of adjacent surface data slices (e.g., color data slices and depth data slices) along each of a positive direction of an x-axis of the coordinate system, a negative direction of the x-axis of the coordinate system, and positive and negative directions of both the y-axis of the coordinate system and the z-axis of the coordinate system. Exemplary surface data slices will be described and illustrated in more detail below.

Using the orthographically projected surface data slices, the virtual reality provider system may generate virtual reality data that represents the virtual 3D space and accounts for level of detail of the surfaces included within the virtual 3D space with respect to a particular vantage point (e.g., a particular location within the virtual 3D space from which the user may experience the virtual 3D space). For example, the virtual reality provider system may account for level of detail by representing, within the generated virtual reality data, certain surfaces (e.g., surfaces near the particular vantage point) at a higher quality and/or level of detail represented by a relatively large amount of data while representing other surfaces (e.g., surfaces more distant from the particular vantage point) at a lower quality and/or level of detail represented by a relatively small amount of data. To account for level of detail in this way, the virtual reality provider system may, as part of the generating of the virtual reality data, apply one or more image transform operations (e.g., including cropping image transform operations, downsampling image transform operations, layering image transform operations, etc.) to one or more surface data slices in the respective pluralities of adjacent surface data slices orthographically projected along the three orthogonal axes. Various such image transform operations that may be performed to account for level of detail in virtual reality data will be described in more detail below.

After the virtual reality data representing the virtual 3D space has been generated, or while the virtual reality data is being generated (e.g., in real-time), the virtual reality provider system may provide the virtual reality data to a media player device associated with the particular vantage point (e.g., a media player device that is presenting the virtual 3D space from a perspective at or near the particular vantage point). For instance, the virtual reality provider system may provide the virtual reality data to the media player device for processing by the media player device to present (e.g., to a user of the media player device) virtual reality content that is based on the virtual 3D space and is tailored to the particular vantage point. For example, the virtual reality content may be tailored to the particular vantage point by including high quality (e.g., high resolution per unit distance) representations of objects for which the user may be able to appreciate a large amount of detail (e.g., objects near the particular vantage point) and including low quality (e.g., low resolution per unit distance) representations of objects for which the user may not be able to appreciate significant detail (e.g., objects relatively distant from the particular vantage point).

Various benefits may arise from methods and systems described herein for generating and providing virtual reality data that accounts for level of detail. For example, by orthographically projecting respective pluralities of adjacent surface data slices of the virtual 3D space along each of the three orthogonal axes of the coordinate system, a virtual reality provider system may systematically reduce or limit the amount of virtual reality data that is communicated to media player devices without degrading a perceived quality for users. For instance, image transform operations may be applied independently to each surface data slice to decrease the amount of data used to represent each surface data slice in accordance with, for example, how near each surface data slice is to a particular vantage point or how much detail may be appreciated within each surface data slice from the perspective of the particular vantage point. Thus, methods and systems described herein for generating and providing virtual reality data that accounts for level of detail may significantly decrease the amount of virtual reality data that is transmitted to media player devices, and may correspondingly decrease the amount of network bandwidth used to communicate such data.

This decrease in bandwidth usage and data transmission may benefit virtual reality media providers, network providers, and users of media player devices receiving the virtual reality data. For example, network congestion may be reduced, data transmission times on the network may be shortened, power usage and cost of operating the network may decrease, battery life of media player devices may be increased, loading and buffering wait times may be reduced or eliminated for virtual reality data downloads, and so forth.

Moreover, the more efficient virtual reality data communication provided by methods and systems described herein may not correspond to any appreciable decrease in quality experienced by users. This is because the only detail that may be removed or reduced from the virtual reality content is detail that users experiencing the virtual 3D space would not be able to fully appreciate from their current vantage point anyway. As the users virtually move around from place to place within the virtual 3D space (i.e., move from being located at or near one vantage point to another), different instances of virtual reality data that are each representative of the virtual 3D space but are tailored to different vantage points within the virtual 3D space may be dynamically provided to the users' media player devices such that appreciable detail is always available to be presented to the users but bandwidth is not wasted communicating detail that the users may not be able to appreciate.

Along with decreasing bandwidth usage while maintaining a perceived quality level for users, methods and systems for generating and providing virtual reality data that accounts for level of detail described herein may, in some respects, increase the quality of virtual reality experiences presented to users. For example, because a set number of bits (e.g., 8 bits in certain examples) may be dedicated to representing the depth of surfaces, depth data describing an entire virtual 3D space may have relatively low depth resolution per unit distance. However, by using the same number of bits to represent the depth of surfaces in only a particular slice of the virtual 3D space (as opposed to the entire virtual 3D space), a higher depth resolution per unit distance may be achieved that may correspond to an increase in perceived quality to users.

Additionally, it will be understood that methods and systems described herein may significantly conserve processing resources by reducing an amount of redundant 3D rendering that is performed. 2D image processing is generally less resource-intensive than 3D scene rendering because 2D image manipulation involves less computation than 3D rendering. Accordingly, by shifting detail customization work to image processors and away from 3D renderers, systems and methods described herein may provide virtual reality data at higher levels of performance (e.g., efficiency, accuracy, responsiveness, quality, etc.). Various additional and/or alternative benefits that may be provided by methods and systems for generating and providing virtual reality data that accounts for level of detail will be made apparent in the description below.

Figure 12:
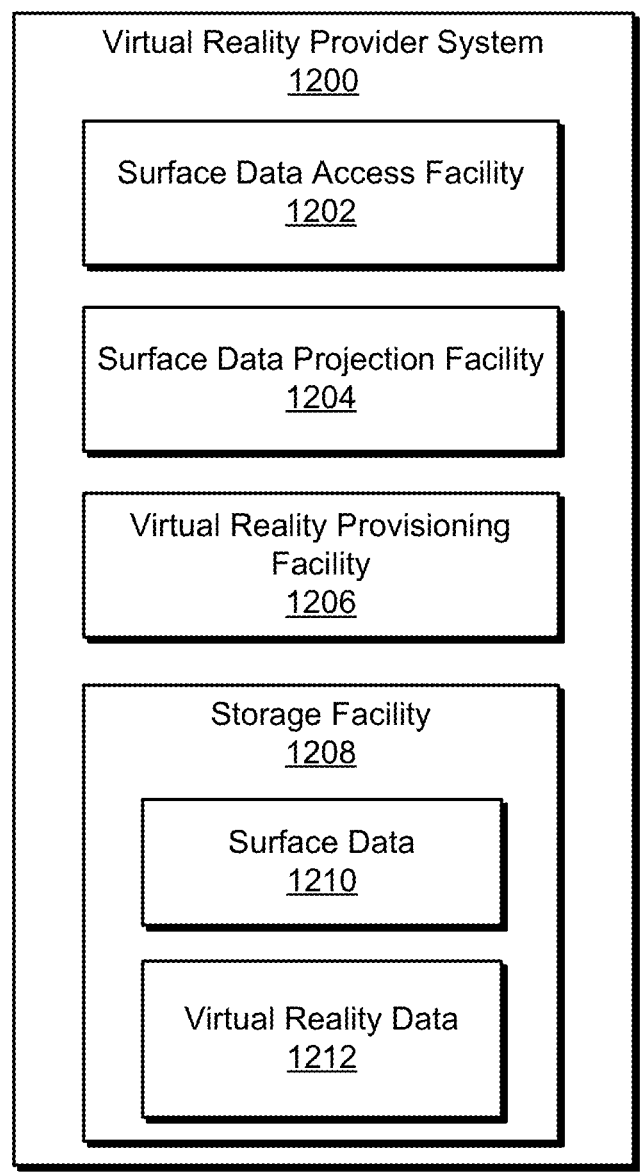
FIG. 12 illustrates an exemplary virtual reality provider system for generating and providing virtual reality data that accounts for level of detail according to principles described herein.

FIG. 12 illustrates an exemplary virtual reality provider system 1200 ("system 1200") for generating and providing virtual reality data that accounts for level of detail. In some examples, system 1200 may be associated with system 100, described above. For instance, system 1200 may be an exemplary implementation of system 100, system 100 may be an exemplary implementation of system 1200, one of systems 100 and 1200 may include the other system (e.g., as a subsystem), systems 100 and 1200 may interoperate with one another as separate systems, systems 100 and 1200 may both be implemented within another system, or systems 100 and 1200 may have another suitable association with one another. In other examples, systems 100 and 1200 may be separate systems that each operate independently of the other. Regardless, systems 100 and 1200 may have various characteristics in common, and it will be understood that exemplary implementations, configurations, definitions, and other disclosure provided above in relation to system 100 (and/or implementations thereof) may similarly apply to system 1200 (and implementations thereof), as will be described below.

System 1200 includes a plurality of facilities that interoperate to generate and provide virtual reality data that accounts for level of detail. Specifically, as shown in FIG. 12, system 1200 may include, without limitation, a surface data access facility 1202, a surface data projection facility 1204, a virtual reality provisioning facility 1206, and a storage facility 1208 selectively and communicatively coupled to one another. It will be recognized that although facilities 1202 through 1208 are shown to be separate facilities in FIG. 12, facilities 1202 through 1208 may be combined into fewer facilities, such as into a single facility, or divided into more facilities as may serve a particular implementation. In some examples, each of facilities 1202 through 1208 may be distributed between multiple devices (e.g., multiple servers or sets of servers communicatively coupled by way of networks) and/or multiple locations as may serve a particular implementation. Each of facilities 1202 through 1208 will now be described in more detail.

Surface data access facility 1202 may include one or more physical computing devices that may perform various operations. For example, surface data access facility 1202 may perform operations associated with accessing surface data representative of a virtual 3D space of a virtual scene. The surface data accessed by surface data access facility 1202 may include color and depth data for surfaces included within the virtual 3D space. For instance, the surface data accessed by surface data access facility 1202 may be (or may be similar to) the color and depth data described above in relation to surface data frames and surface data frame sequences.

Surface data access facility 1202 may access the surface data in any suitable manner. For example, surface data access facility 1202 may access the surface data by capturing color, depth, and/or other data (e.g., audio data, metadata, etc.) for a real-world scene directly using one or more capture devices included within system 1200, or may receive (e.g., request and download) such data from another system that has captured the data using such capture devices. In the same or other examples, surface data access facility 1202 may access surface data that is based on a real-world scene or on a computer-generated scene by receiving such data from an asset storage system (e.g., asset storage system 208) based on a virtual entity description frame such as one of frames 500. In other implementations, surface data access facility 1202 may otherwise access any suitable surface data by any suitable methodology described herein or as may serve a particular implementation.

Surface data projection facility 1204 may include one or more physical computing components (e.g., hardware and/or software components separate from or shared with those of surface data access facility 1202) that perform various operations associated with orthographically projecting respective pluralities of adjacent surface data slices of the virtual 3D space based on the surface data accessed by surface data access facility 1202. For example, surface data projection facility 1204 may orthographically project respective pluralities of adjacent surface data slices along each of three orthogonal axes (e.g., including an x-axis, a y-axis, and a z-axis) in a coordinate system associated with the virtual 3D space.

As used herein, an "orthographic projection" refers to a rendering or other projection of color data and/or depth data in which 3D surfaces of 3D objects are projected onto a two-dimensional projection plane by means of a parallel projection in which projection lines are all orthogonal to the projection plane. Thus, an orthographic projection may contrast with other renderings described herein (e.g., perspective renderings of virtual 3D space 302 performed by 3D rendering engines 204 from perspectives of virtual vantage points 306). Specifically, while perspective renderings may depict objects as the objects actually appear from a particular perspective by using projection lines that all originate and extend from a certain point (e.g., a particular vantage point) to the surfaces of objects, orthographic projections may depict objects differently than the objects actually appear from any given point in space by using parallel projection lines all orthogonal to a projection plane, rather than extending from a common point.

Orthographic projections may be beneficial in various implementations for a variety of reasons. For example, as compared to perspective projections, orthographic projections may have reduced overlap and, thus, reduced data redundancy. Additionally, orthographic projections may facilitate a uniform segmentation of a virtual 3D space into rectangular cells, whereas frustum bounds associated with perspective projections may make perspective projections more complicated and/or difficult to align. Additionally, fewer orthographic projections may be used to uniformly sample a rectangular volume as compared to a number of perspective projections used to uniformly sample the same volume. Exemplary perspective renderings of objects have been illustrated above (see, for example, depictions in surface data frames 210 in FIG. 6). Exemplary orthographic projections will be illustrated and described in more detail below.

Virtual reality provisioning facility 1206 may include one or more physical computing components (e.g., hardware and/or software components separate from or shared with those of surface data access facility 1202 and/or surface data projection facility 1204) that perform various operations associated with generating virtual reality data that represents the virtual 3D space and accounts for level of detail of the surfaces included within the virtual 3D space with respect to a particular vantage point. For example, as will be described in more detail below, the generating of the virtual reality data by virtual reality provisioning facility 1206 may include applying one or more image transform operations to one or more surface data slices in the respective pluralities of adjacent surface data slices orthographically projected by surface data projection facility 1204.

Moreover, virtual reality provisioning facility 1206 may also provide, to a media player device associated with the particular vantage point, the virtual reality data that represents the virtual 3D space. The virtual reality data may be provided for processing by the media player device to present (e.g., to a user of the media player device) virtual reality content that is based on the virtual 3D space and is tailored to the particular vantage point. For example, as mentioned above, the virtual reality content may be tailored to the particular vantage point by having, for example, relatively high-quality depictions (e.g., represented by relatively large amounts of data) of surfaces near the particular vantage point in the virtual 3D space and relatively low-quality depictions (e.g., represented by relatively small amounts of data) of surfaces remote from the particular vantage point in the virtual 3D space.

Storage facility 1208 may maintain any suitable data received, generated, managed, tracked, maintained, used, and/or transmitted by facilities 1202 through 1206 in a particular implementation. For example, as shown, storage facility 1208 may include surface data 1210, which may include color and/or depth data (e.g., included in surface data frames, surface data frame sequences, and/or in any other format) representative of one or more virtual 3D spaces of one or more virtual scenes (e.g., virtual scenes based on real-world scenes, computer-generated scenes, a mixture of both, etc.). Storage facility 1208 may further include virtual reality data 1212, which may include one or more instances of virtual reality data configured to provide virtual reality content associated with one or more different vantage points. For instance, for a particular virtual 3D space of a particular virtual scene, virtual reality data 1212 may include a plurality of different instances of virtual reality data that are associated with different vantage points at different locations within the virtual 3D space. Storage facility 1208 may also maintain additional or alternative data as may serve a particular implementation.

Figure 13:
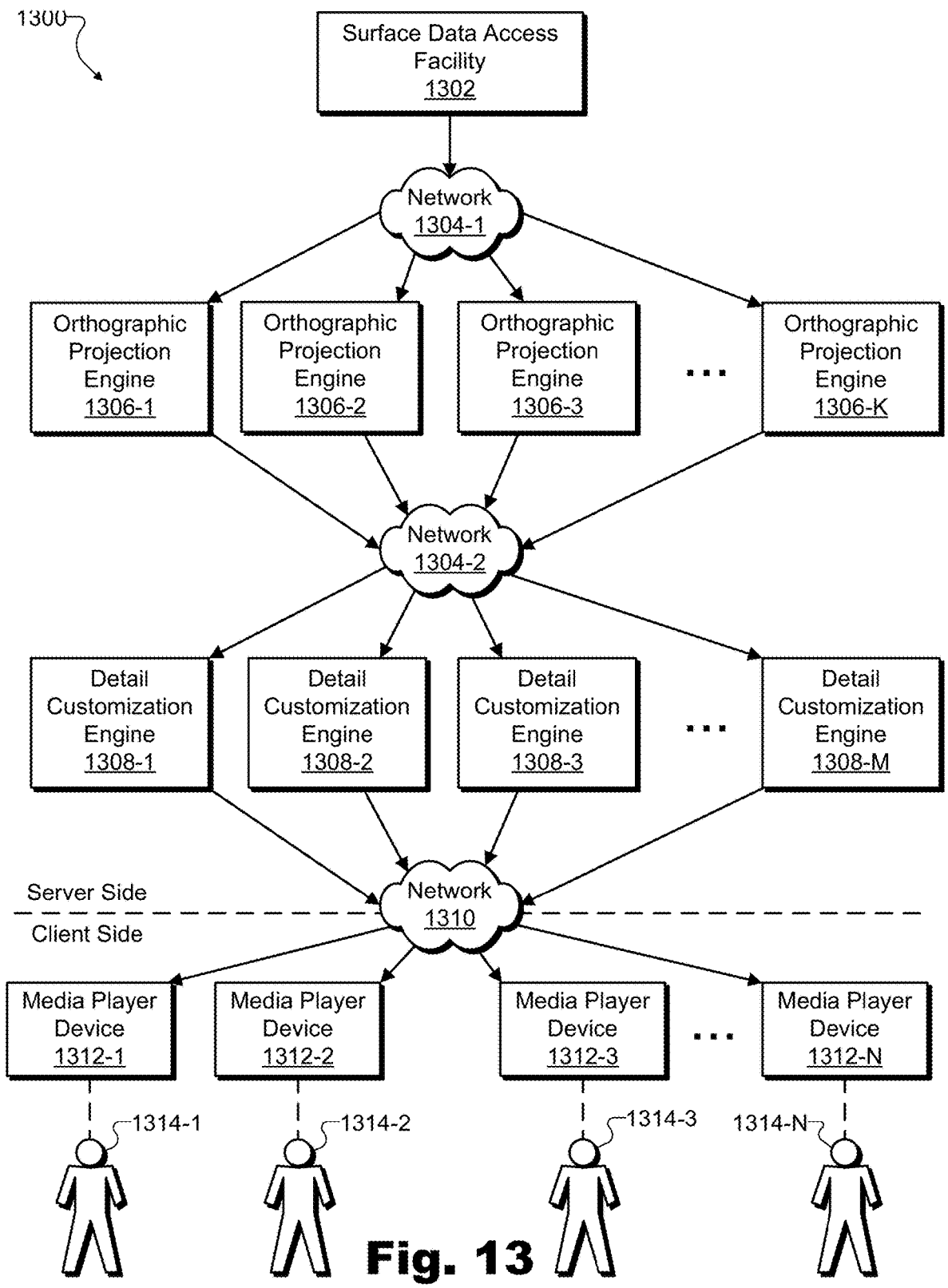
FIG. 13 illustrates an exemplary configuration in which an exemplary implementation of the virtual reality provider system of FIG. 12 generates and provides virtual reality data accounting for level of detail to exemplary media player devices according to principles described herein.

FIG. 13 illustrates an exemplary configuration 1300 in which an exemplary implementation of system 1200 generates and provides virtual reality data accounting for level of detail for exemplary media player devices. Specifically, as shown, configuration 1300 illustrates various server-side components, some or all of which may implement system 1200, as well as client-side media player devices associated with respective users. The server-side components include a surface data access facility 1302, at least one network 1304 (e.g., networks 1304-1 and 1304-2), a plurality of orthographic projection engines 1306 (e.g., orthographic projection engines 1306-1 through 1306-K), and a plurality of detail customization engines 1308 (e.g., detail customization engines 1308-1 through 1308-M). Another network 1310 is shown to separate the server-side components of configuration 1300 (e.g., the implementation of system 1200) from a plurality of client-side media player devices 1312 (e.g., media player devices 1312-1 through 1312-N). Each of media player devices 1312 is associated with a respective user 1314 (e.g., users 1314-1 through 1314-N). Each of the entities in configuration 1300 will now be described.

Surface data access facility 1302 may include or be implemented by one or more computing systems and may be configured to perform the same or similar operations as surface data access facility 1202, described above. For example, surface data access facility 1302 may access surface data by capturing real-world surface data (e.g., color and/or depth data representative of surfaces of real-world objects in a real-world scene) using capture devices that are included within or otherwise controlled by or accessed by surface data access facility 1302. In certain implementations, surface data access facility 1302 may access data from an implementation of system 100 (not explicitly shown) that, as described above, may maintain virtual entities (e.g., in accordance with physics-based object behaviors, AI-based object behaviors, commands from one or more virtual scene control systems to modify maintained data, etc.) and generate virtual entity description frames representative of a state of the virtual entities. Accordingly, based on such virtual entity description frames, surface data access facility 1302 may access surface data from a database such as asset storage system 208 based on links to the surface data included in the virtual entity description frames. In the same or other examples, surface data access facility 1302 may receive, capture, load, and/or otherwise access surface data in any of the ways described herein or as may serve a particular implementation.

Networks 1304 and 1310 may be implemented by or include any of the types of networks or network technologies described herein. For example, networks 1304 and 1310 may be part of or may include provider-specific wired or wireless networks (e.g., a cable or satellite carrier network or a mobile telephone network), the Internet, wide area networks, content delivery networks, or any other suitable networks. As such, data may flow over networks 1304 and/or 1310 using any communication technologies, devices, media, and protocols as may serve a particular implementation. In certain examples, networks 1304 (i.e., networks 1304-1 and 1304-2) may be local and/or private networks exclusively managed and/or used by a virtual reality media provider or the like, while network 1310 may include one or more public networks (e.g., a public carrier network, the Internet, etc.) to allow data to be transmitted from server-side systems to client-side media player devices. While networks 1304-1, 1304-2 and 1310 are each illustrated as separate networks, it will be understood that some or all of these networks may be implemented as a single network, or that subcomponents of the networks may be common among two or more of the networks.

In some configurations, one or more of networks 1304 or 1310 may be omitted (e.g., replaced by direct connections, non-network interface connections, etc.). For example, in a configuration where surface data access facility 1302 is implemented on the same computing resources as orthographic projection engines 1306, network 1304-1 may be omitted as surface data access facility 1302 may be integrated with orthographic projection engines 1306 and/or may communicate accessed surface data to orthographic projection engines 1306 directly (e.g., without using a network). Similarly, in the same or other examples, some or all of orthographic projection engines 1306 and detail customization engines 1308 may be implemented on common computing resources, reducing or eliminating the use of network 1304-2 for communicating data representative of surface data slices. In still other examples, networks 1304 and/or 1310 may be divided into more networks than shown in configuration 1300 if that should serve a particular implementation.

Collectively, orthographic projection engines 1306 may implement or be included within surface data projection facility 1204 described above. As such, orthographic projection engines 1306 may be configured to perform the same or similar operations described above in relation to surface data projection facility 1204. In order to generate all the orthographic projections of the different pluralities of adjacent surface data slices of the virtual 3D space, in certain examples, a different individual orthographic projection engine 1306 may be used to generate each orthographic projection of each data slice in each plurality of data slices. For example, different orthographic projection engines 1306 may be used to generate the color data slice and the depth data slice of each surface data slice, or orthographic projection engines 1306 may each individually generate entire surface data slices including color and depth data slices. For instance, in some implementations, one orthographic projection engine 1306 (e.g., orthographic projection engine 1306-1) may generate a first color data slice along an x-axis of a coordinate system associated with the virtual 3D space, another orthographic projection engine 1306 (e.g., orthographic projection engine 1306-2) may generate a first depth data slice along the x-axis of the coordinate system (e.g., corresponding to the first color data slice), and so forth for all of the color data slices and depth data slices in all of the respective pluralities of adjacent surface data slices of the virtual 3D space along the orthogonal axes in the coordinate system associated with the virtual 3D space. In other implementations, one orthographic projection engine 1306 (e.g., orthographic projection engine 1306-1) may generate a first surface data slice along the x-axis of a coordinate system associated with the virtual 3D space (e.g., including both a color data slice and a depth data slice), another orthographic projection engine 1306 (e.g., orthographic projection engine 1306-2) may generate a second surface data slice along the x-axis of the coordinate system, and so forth for all of the surface data slices in all of the respective pluralities of adjacent surface data slices of the virtual 3D space along the orthogonal axes in the coordinate system associated with the virtual 3D space.

In certain implementations, each orthographic projection engine 1306 may be implemented using separate, independent computing resources (e.g., implemented on separate server computers, on separate processors of a single computer, etc.). In other examples, one or more of orthographic projection engines 1306 may be combined so as to run on common (e.g., shared) computing resources. For instance, multiple orthographic projection engines 1306 (e.g., up to and including all of orthographic projection engines 1306) may operate on a same server computer, on a same processor, or the like. In these examples, orthographic projection engines 1306 sharing computer hardware resources may be configured to run as separate processes or threads in software. As shown, an integer, K, of orthographic projection engines 1306 may be utilized to orthographically project all of the pluralities of surface data slices used in a particular implementation.

In some examples, orthographic projection engines 1306 may implement or be implemented by 3D rendering engines 204 described above. In contrast, in implementations of system 1200 that are not closely related with system 100, orthographic projection engines 1306 at least may be analogous to 3D rendering engines 204 in the sense that both 3D rendering engines 204 and orthographic projection engines 1306 are configured to operate to generate (e.g., render, project, etc.) respective renderings or projections of certain portions of a virtual 3D space from different perspectives or projection planes within the virtual 3D space. However, whereas 3D rendering engines 204 may each be configured to render perspective depictions of the virtual 3D space (e.g., renderings as the space may appear from a particular virtual vantage point within the virtual 3D space), orthographic projection engines 1306 may orthographically project pluralities of adjacent surface data slices (e.g., orthographic projections from particular projection planes), as will be described and illustrated in more detail below.

Each of orthographic projection engines 1306 may transmit, by way of network 1304-2, a particular data slice (e.g., color data slice, depth data slice, full surface data slice, etc.) that the orthographic projection engine 1306 is responsible for orthographically projecting to each of detail customization engines 1308. Accordingly, in some examples, detail customization engines 1308-1 through 1308-M may receive or otherwise gain access to every surface data slice generated by all of the orthographic projection engines 1306-1 through 1306-K (e.g., all of the surface data slices in all of the respective pluralities of adjacent surface data slices of the virtual 3D space along each of the three orthogonal axes in the coordinate system). In other examples, detail customization engines 1308 may be in communication with orthographic projection engines 1306 (e.g., by way of network 1304-2) to dynamically communicate to orthographic projection engines 1306 which surface data slices the detail customization engines 1308 are currently using to prepare virtual reality datasets for each particular vantage point. As such, further efficiency in system 1200 may be achieved as detail customization engines 1308 may not receive or process surface data slices not actually being used to generate virtual reality data for a particular vantage point, and as certain orthographic projection engines 1306 may abstain (e.g., at least temporarily) from generating their assigned orthographic projections (e.g., in cases where the assigned orthographic projections are not currently being used by any detail customization engines 1308).

Collectively, detail customization engines 1308 may be analogous to video data packaging system 212 in that detail customization engines 1308 may receive projections or renderings of surface data and process, package, transmit, and/or otherwise perform operations to generate and distribute virtual reality data to media player devices. More particularly, the plurality of detail customization engines 1308 may implement virtual reality provisioning facility 1204 described above to generate and provide different instances of virtual reality data that account for level of detail of surfaces included within the virtual 3D space with respect to different vantage points (e.g., different vantage points associated with different media player devices 1312).

As with orthographic projection engines 1306, detail customization engines 1308 may be implemented on independent computing resources or shared computing resources. In some examples, each detail customization engine 1308 may be associated with a different respective vantage point within the virtual 3D space of the virtual scene. As such, each detail customization engine 1308 may be configured to: 1) access the respective pluralities of adjacent surface data slices generated by orthographic projection engines 1306; 2) generate a respective instance of virtual reality data that represents the virtual 3D space and accounts for level of detail of the surfaces included within the virtual 3D space with respect to the respective vantage point with which each detail customization engine 1308 is associated (e.g., including by applying one or more image transform operations to one or more of the accessed surface data slices); and 3) provide the respective instance of virtual reality data to any of media player devices 1312 that may be associated with the respective vantage point for processing by the media player devices 1312 to present (e.g., to a respective user 1314) virtual reality content that is based on the virtual 3D space and is tailored to the respective vantage point.

In some examples, detail customization engines 1308 may concurrently perform these operations (e.g., including the providing of the respective instances of virtual reality data for processing by the different media player devices 1312). Accordingly, media player devices 1312 may be able to concurrently request and receive, from appropriate detail customization engines 1308, appropriate instances of virtual reality data associated with particular vantage points that respective users 1314 dynamically select as they experience different parts of the virtual 3D space of the virtual scene. Various image transform operations that may be performed by detail customization engines 1308 to generate virtual reality data that accounts for level of detail with respect to different vantage points will be described and illustrated in more detail below.

Media player devices 1312 may be implemented by any suitable systems or devices such as any of the media player devices described herein that are configured to receive virtual reality data (e.g., from one or more of detail customization engines 1308 by way of network 1310) and to render the virtual reality data to present virtual reality content to respective users 1314. At any given point in time, each media player device 1312 may be associated with a particular vantage point for which at least one of detail customization engines 1308 is generating virtual reality data (e.g., virtual reality data that accounts for level of detail with respect to that particular vantage point). However, at the given point in time, different media player devices 1312 may be associated with different particular vantage points and, as such, may be receiving different instances of virtual reality data from different detail customization engine 1308. Moreover, as users 1314 experience the virtual 3D space of the virtual scene and move about in the virtual 3D space, respective media player devices 1312 may switch from being associated with certain vantage points to being associated with other vantage points. Accordingly, a particular media player device 1312 may switch from receiving one instance of virtual reality data from one detail customization engine 1308 to receiving another instance of virtual reality data from another detail customization engine 1308.

To clearly illustrate how system 1200 may generate and provide virtual reality data that accounts for level of detail in a configuration such as configuration 1300, various aspects of the methods and systems for generating and providing virtual reality data that accounts for level of detail described above will now be illustrated and described in more detail.

Figure 14:
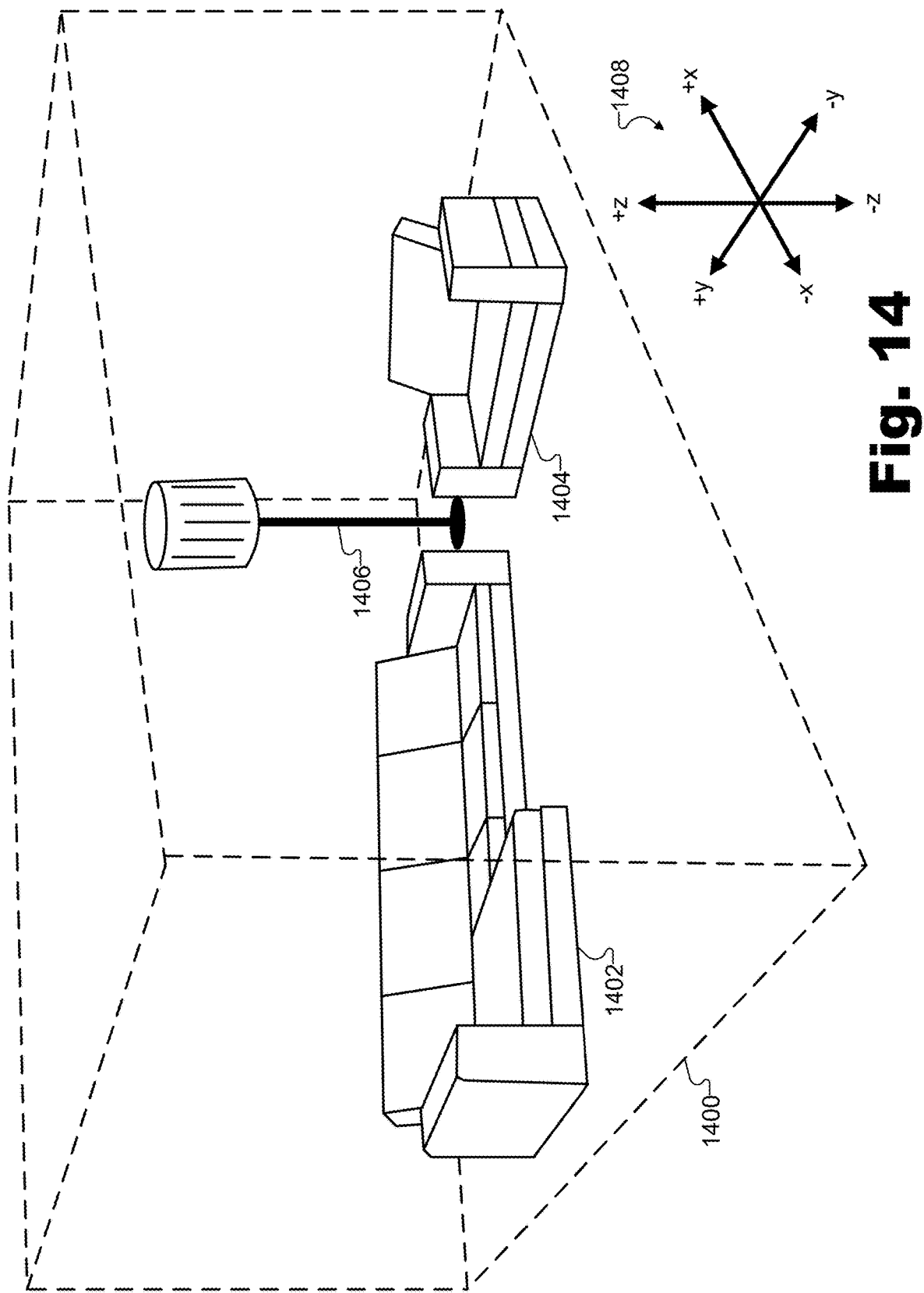
FIG. 14 illustrates an exemplary virtual 3D space of a virtual scene based upon which the virtual reality provider system of FIG. 12 may generate and provide virtual reality data that accounts for level of detail according to principles described herein.

FIG. 14 illustrates an exemplary virtual 3D space 1400 of a virtual scene based upon which system 1200 may generate and provide virtual reality data that accounts for level of detail according to principles described herein. As shown, virtual 3D space 1400 includes various exemplary objects such as a sofa object 1402, a chair object 1404, and a lamp object 1406 in a living room setting. While the living room setting of virtual 3D space 1400 may be relatively small and may include a relatively small number of objects, it will be understood that other examples of virtual 3D spaces may include any type of space or scene that may be presented for users to experience in virtual reality and, as such, may be larger or smaller than virtual 3D space 1400, may contain more or fewer objects than virtual 3D space 1400, and so forth. In some examples, a particular virtual scene (e.g., a scene representative of a building or a large area, etc.) may include a plurality of different virtual 3D spaces (e.g., rooms of the building, different sections of the large area, etc.).

As described above, as used herein, virtual 3D spaces and virtual scenes may be "virtual" in the sense that a user may experience them in a virtual manner (e.g., using virtual reality technology such as a virtual reality media player device) rather than experiencing them in real life (e.g., without use of such virtual reality technology). However, while virtual 3D spaces of virtual scenes such as virtual 3D space 1400 may be experienced virtually, it will be understood that objects within the virtual 3D spaces and the virtual 3D spaces themselves may be generated in any suitable manner to be based on real-world, virtualized (e.g., computer-generated), and/or other types of objects and/or scenery.

For example, virtual 3D scene 1400 may be a virtual representation of a real-world scene and at least some of the color and depth data included in the surface data from which virtual 3D space 1400 is generated may be captured by a plurality of capture devices disposed at different positions with respect to the real-world scene. In other words, the living room setting depicted in virtual 3D space 1400, as well as objects 1402 through 1406, may exist in the real world, and virtual 3D space 1400 may be generated based on data captured by one or more capture devices disposed in the real-world living room setting to capture surface data representative of the real-world objects.

In other examples, at least some of the color and depth data included in the surface data from which virtual 3D space 1400 is generated may be 3D model data representative of a computer-generated virtual object. For example, certain aspects of virtual 3D space 1400 (e.g., one or more of objects 1402 through 1406) or the entirety of virtual 3D space 1400 may be virtualized (e.g., computer-generated) based on 3D models rather than based on real-world objects and/or scenery. Virtual scenes that include both camera-captured real-world objects and/or scenery along with virtualized objects and/or scenery may be referred to as mixed reality virtual scenes.

In examples where virtual 3D space 1400 is based on real-world objects and/or scenery, system 1200 may be configured to access the surface data representative of a real-world scene (e.g., surface data captured by a plurality of capture devices disposed around the real-world scene) and process the data in accordance with methods and systems described herein in real time. As used herein, operations may be performed in "real time" when they are performed immediately and without undue delay such that, for example, data processing operations associated with an ongoing event (e.g., a real-world sporting event, concert, etc.) are performed while the event is still ongoing (e.g., rather than after the fact) even if there is some amount of delay such as a few seconds or minutes. In some examples, these types of real-time operations may allow virtual reality users to experience a real-world event live or at approximately the same time as people attending the event are experiencing it.

As further illustrated in FIG. 14, virtual 3D space 1400 may be associated with a coordinate system 1408. Coordinate system 1408 may be any suitable type of coordinate system, such as a cartesian coordinate system, a polar coordinate system, or the like. In the example of FIG. 14, coordinate system 1408 is illustrated as a cartesian coordinate system that includes an x-axis stretching in a +x and a −x direction, a y-axis stretching in a +y and a −y direction, and a z-axis stretching in a +z and a −z direction. As shown, each of the coordinate axes x, y, and z are orthogonal to one another in 3D space.

As described above, respective pluralities of adjacent surface data slices of virtual 3D spaces such as virtual 3D space 1400 may be generated along each of three orthogonal axes in a coordinate system such as the x, y, and z axes of coordinate system 1408. To illustrate, FIGS. 15A through 15F show exemplary pluralities of adjacent surface data slices of virtual 3D space 1400. While all three axes of coordinate system 1408 are not explicitly shown in FIGS. 15A through 15F, it will be understood that each of FIGS. 15A through 15F are depicted using a common orientation so that coordinate system 1408 remains consistently oriented in each of the figures. As shown, relevant information related to coordinate system 1408 (e.g., relevant indications of coordinate axis directions for +x, −x, +y, −y, +z, or −z directions) are indicated in each of FIGS. 15A through 15F.

As used herein, a "data slice" may refer to an orthographic projection of color data, depth data, or a combination of both color and depth data for surfaces within a particular sub-volume (e.g., a relatively thin, "slice"-shaped rectangular prism or another suitably shaped sub-volume) of the entire volume of a virtual 3D space. Such orthographic projections of the sub-volume may be referred to herein as "color data slices" when they include color data, as "depth data slices" when they include depth data, and as "surface data slices" when they include both color and depth data. Thus, in certain examples, a surface data slice may include or refer to (e.g., as an abstraction for simplicity of description) both a color data slice and a depth data slice. For instance, it will be understood that the surface data slices in FIGS. 15A through 15F may each actually represent both a color data slice and a depth data slice, so that these figures could alternatively be drawn to include twice as many slices (i.e., color and depth data slices for each direction of each axis in coordinate system 1408).

The surface data slices illustrated in FIGS. 15A through 15F will collectively be referred to herein as surface data slices 1502, but it is noted that each surface data slice may be individually referred to by a numbering notation that will now be described. As shown, each surface data slice 1502 is labeled with a "1502" as well as with a sign (i.e., a "+" or a "−") followed by an axis designation (i.e., "x", "y", or "z" in these examples), followed by an index number (i.e., "1", "2", or "3" in these examples). Based on the sign, axis designation, and index number, each surface data slice may be uniquely identified as being projected in a direction (indicated by the sign) along an axis (indicated by the axis designation) as a particular index (indicated by the index number) of other slices in a plurality of slices being projected in the same direction along the same axis.

For example, a surface data slice 1502+x1 refers to a first surface data slice in a plurality of surface data slices in the positive ("+") direction along the x-axis. Similarly, a surface data slice 1502+x2 refers to a second surface data slice in the same plurality of surface data slices as surface data slice 1502+x1. As another example, a surface data slice 1502−x1 refers to a first surface data slice in a plurality of surface data slices that are also along the x-axis but are projected in the negative ("−") direction.

Figure 15A:
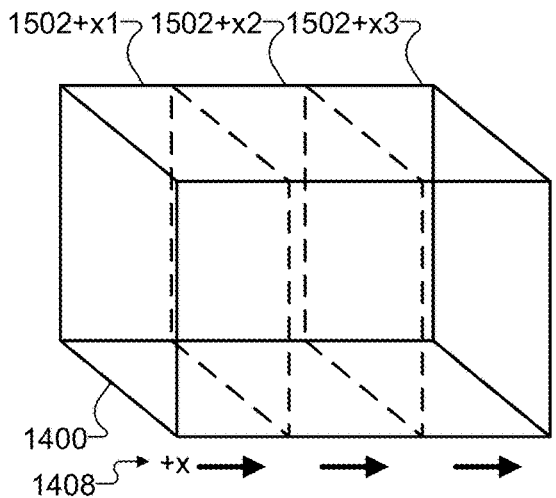
FIGS. 15A through 15F illustrate exemplary pluralities of adjacent surface data slices of the virtual 3D space of FIG. 14 according to principles described herein.

Accordingly, as shown in FIG. 15A, the orthographically projected pluralities of adjacent surface data slices 1502 of virtual 3D space 1400 may include a plurality of adjacent surface data slices 1502+x (e.g., surface data slices 1502+x1 through 1502+x3) orthographically projected in a positive direction along the x-axis of coordinate system 1408.

Figure 15B:
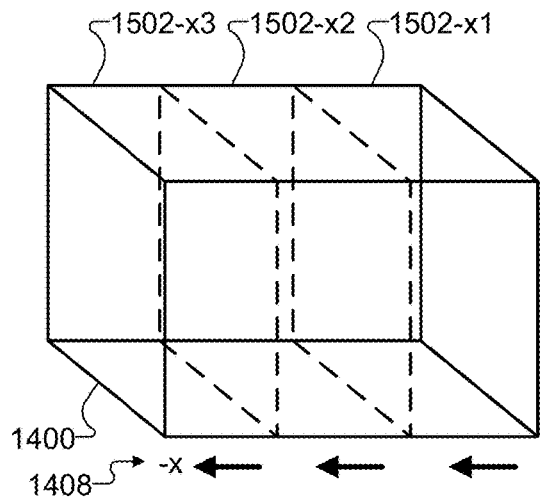

Similarly, as shown in FIG. 15B, the orthographically projected pluralities of adjacent surface data slices 1502 of virtual 3D space 1400 may include a plurality of adjacent surface data slices 1502−x (e.g., surface data slices 1502−x1 through 1502−x3) orthographically projected in a negative direction along the x-axis of coordinate system 1408.

Figure 15C:
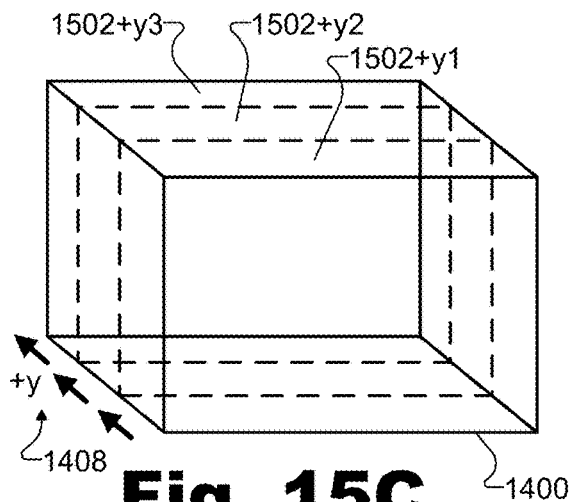

As shown in FIG. 15C, the orthographically projected pluralities of adjacent surface data slices 1502 of virtual 3D space 1400 may include a plurality of adjacent surface data slices 1502+y (e.g., surface data slices 1502+y1 through 1502+y3) orthographically projected in a positive direction along the y-axis of coordinate system 1408.

Figure 15D:
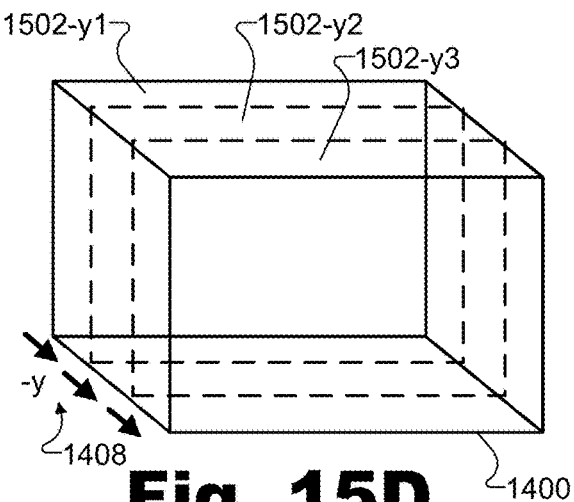

Similarly, as shown in FIG. 15D, the orthographically projected pluralities of adjacent surface data slices 1502 of virtual 3D space 1400 may include a plurality of adjacent surface data slices 1502−y (e.g., surface data slices 1502−y1 through 1502−y3) orthographically projected in a negative direction along the y-axis of coordinate system 1408.

Figure 15E:
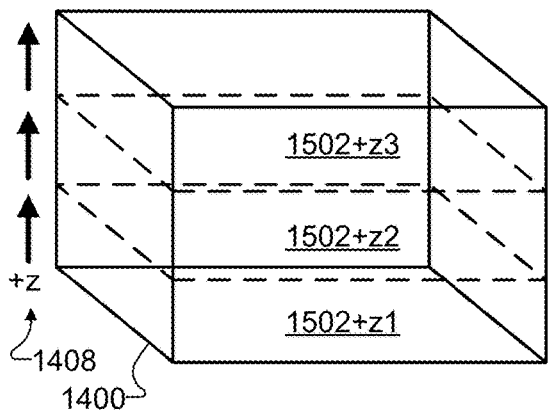

As shown in FIG. 15E, the orthographically projected pluralities of adjacent surface data slices 1502 of virtual 3D space 1400 may include a plurality of adjacent surface data slices 1502+z (e.g., surface data slices 1502+z1 through 1502+z3) orthographically projected in a positive direction along the z-axis of coordinate system 1408.

Figure 15F:
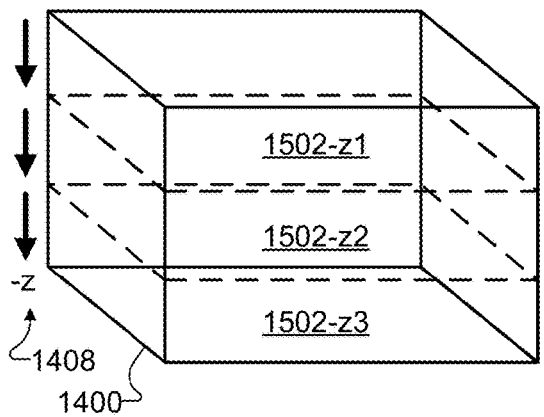

Similarly, as shown in FIG. 15F, the orthographically projected pluralities of adjacent surface data slices 1502 of virtual 3D space 1400 may include a plurality of adjacent surface data slices 1502−z (e.g., surface data slices 1502−z1 through 1502−z3) orthographically projected in a negative direction along the z-axis of coordinate system 1408.

In the example of FIGS. 15A through 15F, each plurality of surface data slices 1502 is shown to include three surface data slices 1502, which, as explained above, may represent three respective color data slices and three respective depth data slices (not explicitly drawn or differentiated in FIGS. 15A through 15F). However, it will be understood that a given virtual 3D space may be sliced in any way and/or into any number of surface data slices as may serve a particular implementation. For instance, in some implementations, a different number of data slices (i.e., other than three) may be included in each plurality of surface data slices. Additionally, different numbers of data slices may be included in different pluralities (e.g., there may be more or fewer data slices along an x-axis than along a y-axis of the coordinate system, for example).

Certain advantages may arise when a relatively large number of relatively thin surface data slices are used for a particular plurality of surface data slices (e.g., in a particular direction along a particular axis). For example, system 1200 may have more flexibility when processing larger numbers of thinner surface data slices to generate virtual reality data by applying different image transform operations to different surface data slices. As such, virtual reality data may be more closely tailored to particular vantage points and high detail of both pixel and depth resolution per unit distance may be achieved to provide a high-quality experience to a particular user 1314. However, less data may be used to represent relatively few and/or relatively thick surface data slices. Accordingly, an optimum number of surface data slices may be determined for each virtual 3D space according to various design goals and/or technical limitations of each particular implementation.

As such determinations are made as to how a particular virtual 3D space is to be sliced and how many slices are to be made in a particular direction along a particular axis, it will be understood that any suitable number of surface data slices (e.g., including numbers other than three) may be included in each plurality of surface data slices. Moreover, it will be understood that certain numbers of surface data slices may be inherently beneficial for certain data structures that may be employed in particular implementations. For example, if each plurality of surface data slices in each of FIGS. 15A through 15F were to use a number of surface data slices 1502 that is a power of two (e.g., two slices per plurality, four slices per plurality, eight slices per plurality, sixteen slices per plurality, or the like, rather than three slices per plurality), octree-type data structures could conveniently be used to store, organize, analyze, facilitate selection of and/or otherwise process surface data slices 1502 with respect to coordinate system 1408.

While FIGS. 15A through 15F illustrate which sub-volume of virtual 3D space 1400 is associated with each surface data slice 1502, as well as which direction along which axis each surface data slice 1502 is orthographically projected, FIGS. 15A through 15F do not explicitly show the color or depth orthographic projections for each surface data slice 1502. As such, FIGS. 16A through 16C illustrate exemplary orthographic projection views (shown below in FIGS. 16A through 16C) corresponding to sub-volume views (shown above in FIGS. 16A through 16C) for a few particular surface data slices 1502.

Specifically, FIG. 16A illustrates an orthographic projection view for surface data slice 1502+x1, FIG. 16B illustrates an orthographic projection view for surface data slice 1502+y1, and FIG. 16C illustrates an orthographic projection view for surface data slice 1502−z1. Each of the orthographic projection views for the surface data slices 1502 shown in FIGS. 16A through 16C may depict, for example, a color orthographic projection or a depth orthographic projection for the respective surface data slice 1502 as viewed from an orthographic perspective indicated by a respective arrow extending from the orthographic projection view to the sub-volume view of the surface data slice 1502.

As shown in FIG. 16A, the orthographic projection view of surface data slice 1502+x1 includes an orthographic projection of one end of sofa object 1402 that is included in surface data slice 1502+x1. It will be understood that if any other objects were to be included within surface data slice 1502+x1, those objects would also be included within the orthographic projection. Additionally, it will be understood that the orthographic projection view of surface data slice 1502+x1 illustrated may represent only color data or depth data, and that a corresponding orthographic projection corresponding to the other type of data may also be associated with (e.g., included as a part of) surface data slice 1502+x1.

Similarly, as shown in FIG. 16B, the orthographic projection view of surface data slice 1502+y1 includes an orthographic projection of one end of chair object 1404 that is included in surface data slice 1502+y1, while, as shown in FIG. 16C, the orthographic projection view of surface data slice 1502−z1 includes an orthographic projection of the top of lamp object 1406 that is included in surface data slice 1502−z1. It will be understood that if any other objects were to be included, respectively, within surface data slices 1502+y1 and/or 1502−z1, those objects would also be included within the respective orthographic projection. Additionally, it will be understood that the respective orthographic projection views of surface data slices 1502+y1 and 1502−z1 illustrated may represent only color data or depth data, and that respective orthographic projections corresponding to the other type of data may also be associated with (e.g., included as a part of) surface data slices 1502+y1 and/or 1502−z1.

While not explicitly illustrated in the exemplary orthographic projection views of FIGS. 16A through 16C, it will be understood that certain surface data slices 1502 may slice through objects. For example, while surface data slice 1502+x1 may include an end of sofa object 1402 for which surface data is available, surface data slice 1502+x2 may slice through sofa object 1402. The surface data (e.g., color data or depth data) for an object that is sliced into by a surface data slice 1502 may be represented or depicted within an orthographic projection in any manner as may serve a particular implementation. For instance, in some implementations, the surface data may be omitted from the orthographic projection so that the object being sliced through is ignored or treated as being invisible for the surface data slice that cuts through it. In other implementations, the surface data may be included in the orthographic projection, but may appear to be reversed (e.g., inside out) since surfaces of the object are essentially being projected from the inside of the object rather than from the outside.

In still other implementations, the surface data may be replaced by a null value such as a value for black, white, or another constant color or depth value. These implementations may also provide or facilitate further efficiency optimizations as a result of empty or null sections of surface data slices being identified and culled out such that data processing will only be performed on pixels having actual data (i.e., rather than null values) and less data in output virtual reality datasets is wasted on null value data. Consequently, in addition to surface data slices being cropped or dropped based on their proximity from the particular vantage point, these implementations may allow surface data slices to be cropped, dropped, or otherwise reduced entirely based on the data (or lack thereof) that they contain. For dynamic scenes, such changes may occur during runtime such that adjustments to particular image transform operations and/or to a slice ordering within a slice atlas data structure (described in more detail below) may be made during runtime.

In certain implementations, a combination of any or all of these ways of processing the surface data or other suitable ways of processing the surface data for sliced-through objects may be employed as may serve a particular implementation.

Once system 1200 (e.g., orthographic projection engines 1306 implemented as part of surface data projection facility 1204) has generated each surface data slice 1502 in the pluralities of adjacent surface data slices 1502 of virtual 3D space 1400 along the orthogonal axes in coordinate system 1408, the surface data slices 1502 may be communicated for use in generating virtual reality data (e.g., by each detail customization engine 1308). For example, as described above, the data included in each surface data slice 1502 may be transmitted or otherwise communicated from one entity to another (e.g., from orthographic projection engines 1306 to each of detail customization engines 1308). For example, surface data slices 1502 may be communicated from one computer or system of computers to another (e.g., by way of a network such as network 1304-2), communicated from one software program or process running on a computer to another, communicated from one location in computer memory to another, or communicated in any other suitable way between two suitable entities as may serve a particular implementation.

In certain implementations, system 1200 may package surface data slices 1502 together into a single data structure for transmission to one or more other entities. For example, based on the output of each orthographic projection engine 1306, system 1200 may arrange each surface data slice 1502 in the pluralities of adjacent surface data slices to form a slice atlas data structure representative of surface data slices 1502 in the pluralities of adjacent surface data slices. Specifically, for example, contemporaneous frames (i.e., frames representative of virtual 3D space 1400 at the same or a similar moment in time) from surface data slices 1502 may be arranged onto a single "mega-frame" of the slice atlas data structure. Consequently, the generating of the virtual reality data (e.g., by detail customization engines 1308) may be performed using the slice atlas data structure representative of surface data slices 1502 in the pluralities of adjacent surface data slices.

Figure 17:
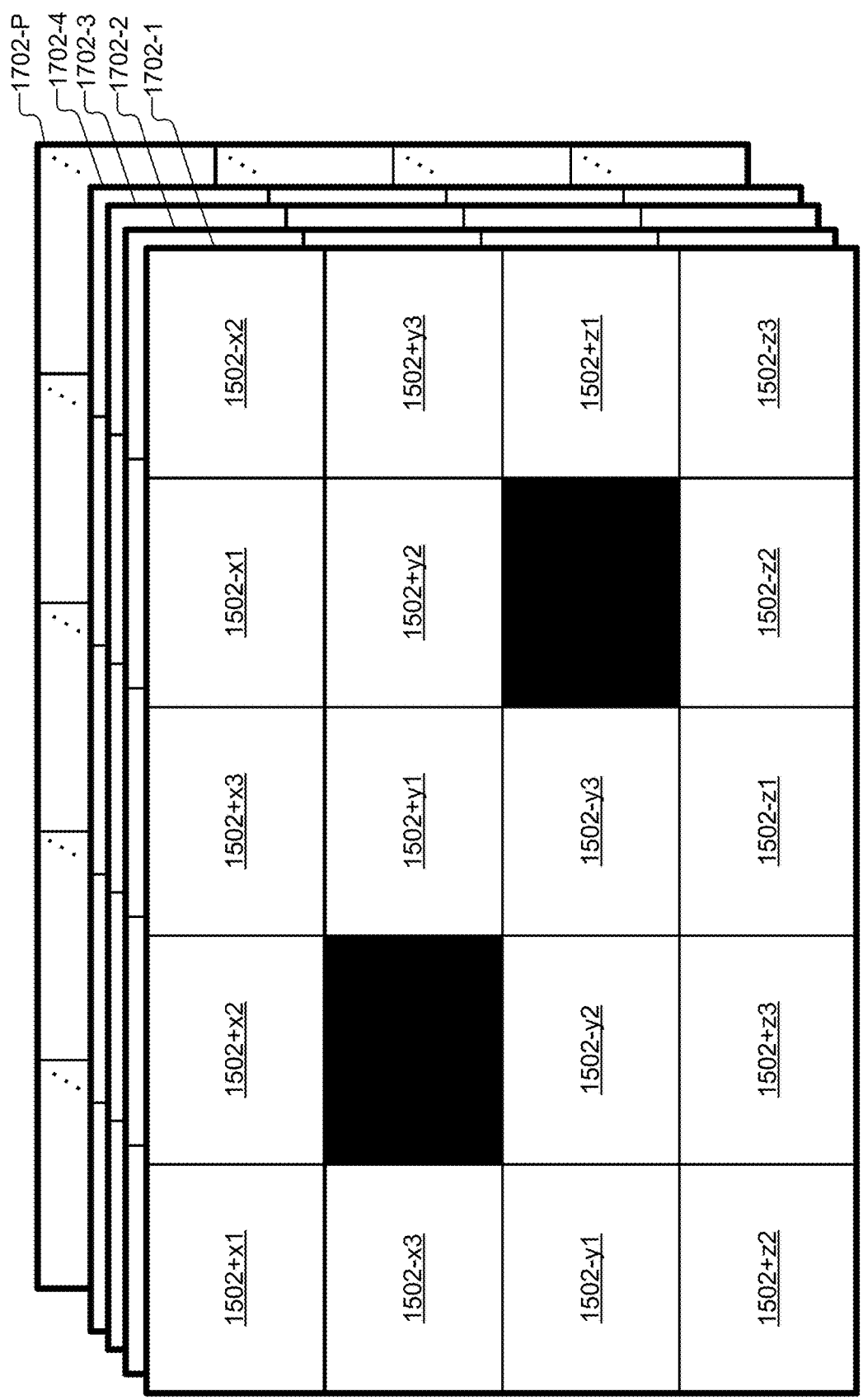
FIG. 17 illustrates an exemplary slice atlas data structure formed by an arrangement of surface data slices in the pluralities of adjacent surface data slices illustrated in FIGS. 15A through 15F according to principles described herein.

FIG. 17 illustrates an exemplary slice atlas data structure 1700 formed by an arrangement of surface data slices 1502 in the pluralities of adjacent surface data slices 1502. For example, as shown in FIG. 17, slice atlas data structure 1700 includes a plurality of frames 1702 (e.g., frames 1702-1 through 1702-P, where P is an integer of how many frames are included in a particular sequence) that each include an arrangement of contemporaneous frames of surface data slices 1502. Frames 1702 may also be referred to herein as "mega-frames" to distinguish the mega-frames from the individual frames of each surface data slice 1502.

Formatting and/or arranging surface data slices 1502 for transmission or communication to other entities using slice atlas data structure 1700 may be beneficial at least because each frame 1702 may include all of the orthographic projection information that a particular detail customization engine 1308 may use to generate a single frame of virtual reality data. Accordingly, in certain examples, a data packaging engine not explicitly shown in FIG. 13 may receive output surface data slices from each orthographic projection engine 1306 and may package the surface data slices to form mega-frames of a slice atlas data structure such as slice atlas data structure 1700 for transmission to one or more of detail customization engines 1308. However, it will be understood that, in other examples, such packaging may not be performed and each surface data slice may be communicated to a respective detail customization engine 1308 in any other suitable way.

Slice atlas data structure 1700 illustrates an arrangement that includes each of the eighteen surface data slices 1502 illustrated in FIGS. 15A through 15F. Since eighteen equally-sized surface data slices 1502 are packed together onto a 5×4 mega-frame grid, two spots within the grid are not used to hold any particular surface data slice 1502. As shown, these unused spots within the grid may hold a null-value (e.g., black pixels) or may otherwise be used to hold data (e.g., meta-data) associated with the surface data slices 1502 included within slice atlas data structure 1700. It will be understood that surface data slices 1502 may be packed together in any order and/or in any arrangement as may serve a particular implementation. For example, in certain implementations, different surface data slices 1502 may be different sizes and thus may be packed together in other arrangements that may be efficient or convenient for these particular implementations.

It will be understood that one slice atlas data structure 1700 may be used for color orthographic projections of surface data slices 1502, while a separate slice atlas data structure 1700 may be used for depth orthographic projections of surface data slices 1502. Alternatively, in other examples, an implementation of slice atlas data structure 1700 may be used that includes both color and depth orthographic projections of surface data slices 1502 on a single slice atlas data structure. For instance, such an implementation of slice atlas data structure 1700 may be approximately twice the size of the implementation illustrated in FIG. 17 to hold at least thirty-six surface data slices (i.e., eighteen color data slices and eighteen depth data slices).

In order to indicate to a receiving entity (e.g., an entity that will receive slice atlas data structure 1700 when it is communicated) what data is included within slice atlas data structure 1700, slice atlas data structure 1700 may include metadata descriptive of the surface data slices 1502 arranged in slice atlas data structure 1700. As such, the generating of virtual reality data by the receiving entity (e.g., a particular detail customization engine 1308) may be performed using slice atlas data structure 1700 in accordance with the metadata. For example, metadata included within or otherwise associated with slice atlas data structure 1700 may indicate, for each surface data slice 1502 included within each frame 1702, camera transform information, a slice direction indicator, a coordinate axis indicator, an index indicator, mega-frame coordinates demarcating boundaries of the surface data slice 1502 within the frame 1702, and/or any other metadata as may serve a particular implementation.

As mentioned above, it may be desirable to tailor different instances of virtual reality data representative of the same virtual 3D space with different levels of detail based on different vantage points associated with the different instances of virtual reality data. For example, virtual reality data to be used by a media player device presenting the virtual 3D space from the perspective of a vantage point in one location in the virtual 3D space may include different details about different objects than virtual reality data to be used by another media player device presenting the virtual 3D space from the perspective of a vantage point in a different location at the other side of the virtual 3D space.

Figure 18:
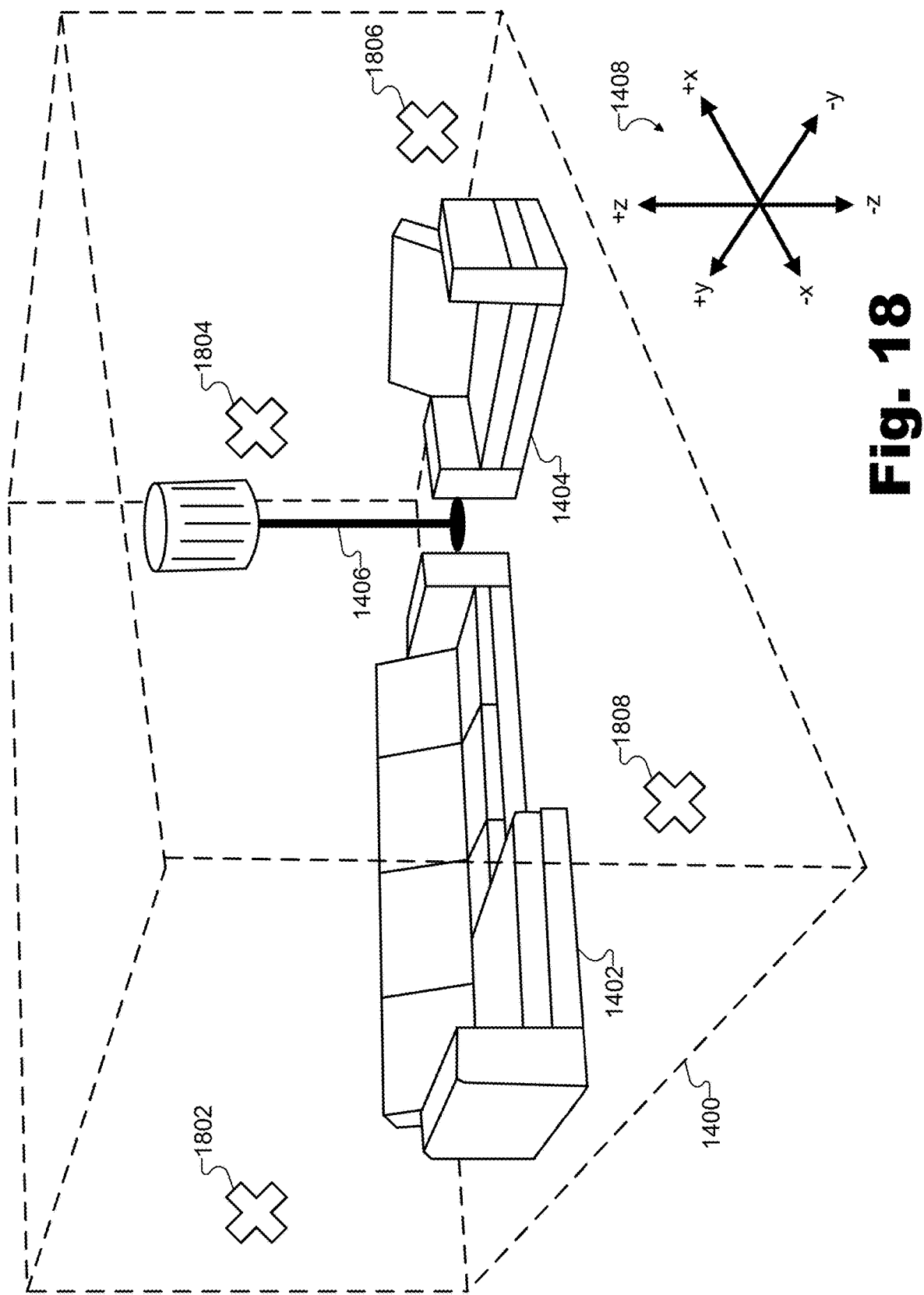
FIG. 18 illustrates a plurality of exemplary vantage points disposed at different locations within the virtual 3D space of FIG. 14 according to principles described herein.

To illustrate, FIG. 18 shows a plurality of exemplary vantage points disposed at different locations within virtual 3D space 1400. Specifically, a vantage point 1802 may be disposed near one corner of virtual 3D space 1400 near one end of sofa object 1402 but relatively far from, for example, chair object 1404 and lamp object 1406. As such, it may be desirable for virtual reality data used to present virtual 3D space 1400 from the perspective of vantage point 1802 to include significant detail descriptive of sofa object 1402, while less detail may be included for chair object 1404 and/or lamp 1406 because, from vantage point 1802, that detail may be less appreciable to a user.

Conversely, as further shown, a vantage point 1804 may be disposed near another corner of virtual 3D space 1400 near the other end of sofa object 1402 and also near one end of chair object 1404 and lamp object 1406. As such, it may be desirable for virtual reality data used to present virtual 3D space 1400 from the perspective of vantage point 1804 to include more detail descriptive of chair object 1404 and lamp object 1406 than was included in the virtual reality data used to present the virtual 3D space from the perspective of vantage point 1802. However, while a significant amount of detail may be appreciable of the end of sofa object 1402 nearer to vantage point 1804, less detail may be appreciable from vantage point 1804 of the other end of sofa object 1402 and, as such, some of the detail included in the virtual reality data associated with vantage point 1802 may be omitted from virtual reality data associated with vantage point 1804.

Other vantage points 1806 and 1808 illustrate other specific locations within virtual 3D space 1400 for which still other combinations of levels of detail for different objects may be appropriate. For example, a relatively high level of detail for chair object 1404 and relatively low levels of detail for lamp object 1406 and/or sofa object 1402 may be appropriate for vantage point 1806, while relatively low levels of detail for all of the objects in virtual 3D space 1400 may be appropriate for the perspective of vantage point 1808, which is not particularly nearby any of the objects.

In certain implementations, vantage points such as vantage points 1802 through 1808 may be arbitrarily and/or dynamically positioned at particular locations of interest, at locations from which users indicate they would like to experience the virtual 3D space, and/or at other suitable locations selected in any manner as may serve a particular implementation. In other implementations, however, vantage points may be distributed evenly and/or in accordance with a regular pattern in order to divide up the virtual 3D space in a consistent and regular fashion.

Figure 19:
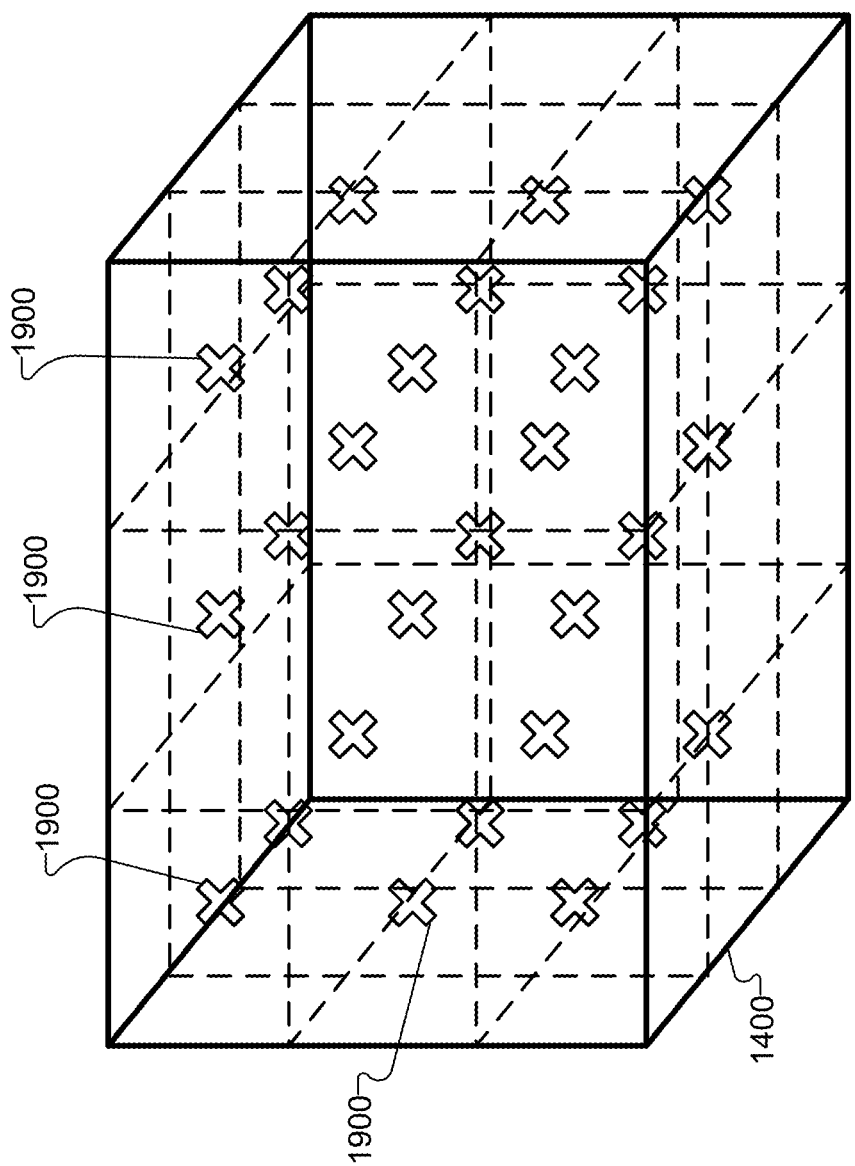
FIG. 19 illustrates another plurality of exemplary vantage points disposed at different locations within the virtual 3D space of FIG. 14 according to principles described herein.

To illustrate an example, FIG. 19 shows a plurality of exemplary vantage points 1900 disposed at different locations within virtual 3D space 1400. Specifically, in contrast to the example of FIG. 18 where a few vantage points were placed at arbitrary locations within virtual 3D space 1400, vantage points 1900 (i.e., each illustrated by 'X' symbols, some of which are explicitly designated as vantage points 1900 but all of which are to be considered vantage points 1900) in FIG. 19 are placed at locations in accordance with a regular pattern (e.g., a grid-like pattern) so that each surface data slice includes a three-by-three grid of nine vantage points 1900. As such, vantage points 1900 are evenly distributed throughout virtual 3D space 1400 in an organized manner.

By evenly distributing the twenty-seven vantage points 1900 throughout virtual 3D space 1400 as shown in FIG. 19, virtual 3D space 1400 may effectively be divided into a set of twenty-seven distinct sub-volumes. As such, in this particular example, twenty-seven different detail customization engines 1308 may be used to generate twenty-seven different instances of virtual reality data accounting for level of detail of surfaces included within virtual 3D space 1400 in different ways for the twenty-seven different vantage points 1900. Media player devices 1312 may thus be given a choice of up to twenty-seven different versions of the virtual reality data and may select whichever instance of the virtual reality data is most appropriate at a particular time (e.g., based on a current vantage point that the respective user 1314 desires). In other examples, other numbers and distributions of vantage points 1900 within virtual 3D space 1400 may be used.

As mentioned above, the number of slices into which virtual 3D space 1400 is divided may make certain data structures (e.g., octrees, etc.) convenient to use. For a similar reason, certain data structures may be convenient for use with certain distribution patterns of vantage points 1900. For example, if the pattern of vantage points 1900 is a cubic grid with a power of two on each side (e.g., a 2×2×2 grid, a 4×4×4 grid, an 8×8×8 grid, etc.), an octree data structure may be used to efficiently organize data associated with each vantage point 1900.

For example, a recursive octree-based algorithm may be used to determine which instance of virtual reality data to send to a particular media player device associated with a particular vantage point. Specifically, an octree cell may be recursively split if the vantage point with which the media player device is associated is inside the cell. At each layer of recursion, if the vantage point is associated with a single virtual reality data instance (the base case of the recursive algorithm), that virtual reality data instance may be provided to the media player device. Otherwise, the octree cell may continue to be split (e.g., into its eight child nodes, each of which is associated with at least one of its own virtual reality data instances) until reaching the base case where the single virtual reality data instance may be provided.

In other examples, more flexible methodologies, including non-octree-based algorithms and/or algorithms similarly based on other types of data structures, may be used instead of octree-based algorithms. For example, when a particular virtual 3D space is first configured, a manual or automated process (e.g., a script or the like) may be used to generate a data structure that each detail customization engine may read in to use as a "recipe" for generating virtual reality data associated with a particular vantage point. The process may loop over each coordinate axis and handle each surface data slice in accordance with the proximity of the particular vantage point to each surface data slice or any other suitable factor. Based on this proximity, for instance, the process may prescribe certain image transform operations that are to be performed for each surface data slice, and may perform other suitable operations as may serve a particular implementation (e.g., slice packing operations to arrange the data slices into a slice atlas data structure or the like).

As has been described, detail customization engines 1308 may apply one or more image transform operations to one or more surface data slices 1502 in order to generate virtual reality data that represents the virtual 3D space and accounts for level of detail of surfaces within the virtual 3D space with respect to a particular vantage point such as one of vantage points 1900. Such image transform operations may include any suitable operations that may affect what data is to be included, with respect to a particular surface data slice, within an instance of virtual reality data. For instance, in some examples, an image transform operation may include removing a particular surface data slice from being included within the virtual reality data associated with the particular vantage point, or may include adding the particular surface data slice to the virtual reality data without modifying the particular surface data slice. In other examples, an image transform operation applied to the particular surface data slice may include a cropping image transform operation, a down-sampling image transform operation, a layering image transform operation, and/or any other suitable image transform operation as may serve a particular implementation.

Figure 20A:
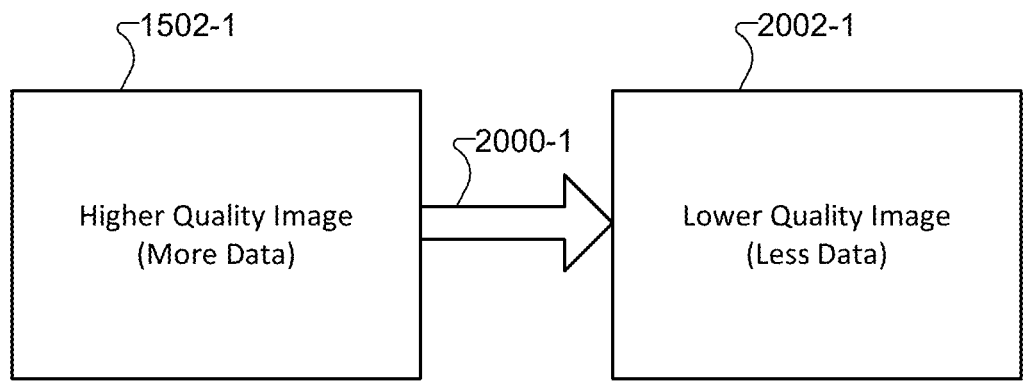
FIGS. 20A through 20C illustrate exemplary image transform operations that may be performed on the surface data slices of the virtual 3D space that are included in the pluralities of adjacent surface data slices illustrated in FIGS. 15A through 15F according to principles described herein.
Figure 20B:
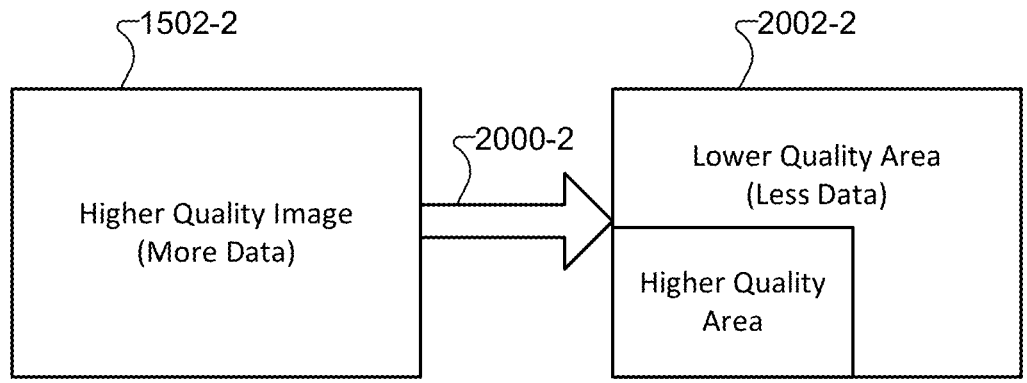
Figure 20C:
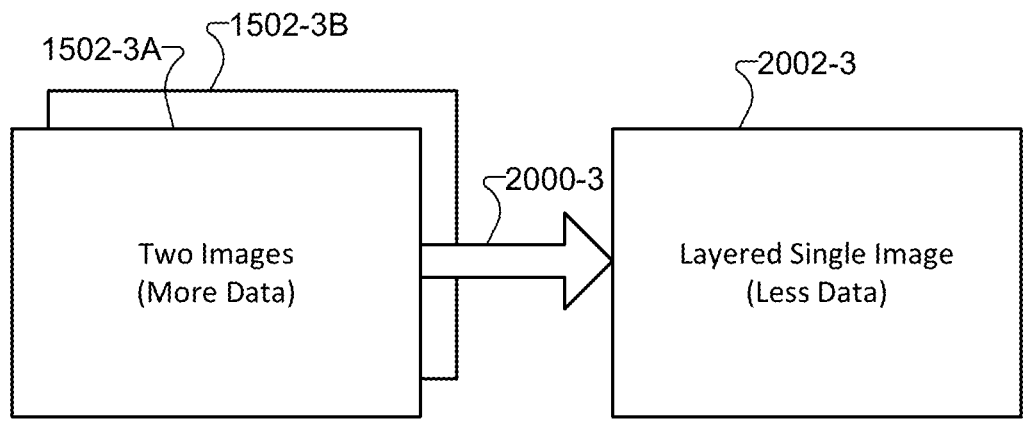

To illustrate, FIGS. 20A through 20C illustrate exemplary image transform operations 2000 (e.g., image transform operations 2000-1 through 2000-3) that may be performed on surface data slices 1502 of virtual 3D space 1400. Each image transform operation 2000 will now be described.

FIG. 20A illustrates a down-sampling image transform operation 2000-1 in which a quality level of a surface data slice 1502-1 (which may represent any of surface data slices 1502 described above) is reduced so that a surface data slice 2002-1 is represented using less data than an amount of data used to represent surface data slice 1502-1 at an original quality level. Down-sampling image transform operation 2000-1 may be performed in any suitable way to remove certain detail from surface data slice 2002-1 to thereby reduce the amount of data used to represent surface data slice 2002-1 as compared to representing surface data slice 1502-1. For example, various aspects of quality or detail may be reduced including pixel resolution per unit distance, frame rate, color palette, depth resolution per unit distance, and/or any other aspect of quality or detail as may serve a particular implementation.

FIG. 20B illustrates a cropping image transform operation 2000-2 in which two areas of surface data slice 1502-2 (which may represent any of surface data slices 1502 described above) are differentiated so as to be processed separately in a surface data slice 2002-2. Specifically, as shown, surface data slice 2002-2 includes a "higher quality area" in the bottom left corner that retains that high quality of 1502-2, while the rest of surface data slice 2002-2 (e.g., the area that has been cropped out) has been down-sampled to a lower quality that is represented using less data. For example, the lower quality area may be down-sampled or processed in any of the ways described herein, such as in one of the ways that surface data slice 2002-1 is down-sampled.

FIG. 20C illustrates a layering image transform operation 2000-3 in which a surface data slice 1502-3A (which may represent any of surface data slices 1502 described above) is combined with another surface data slice 1502-3B (which also may represent any of surface data slices 1502 described above that is separate from surface data slice 1502-3A) such that surface data slices 1502-3A and 1502-3B are represented in a combined surface data slice 2002-3 that is represented using less data than an amount of data used to represent surface data slices 1502-3A and 1502-3B separately. For example, two or more adjacent surface data slices 1502 that are relatively distant from a vantage point for which virtual reality data is being generated may be combined if they contain few details appreciable from the vantage point, contain similar details as one another as far as may be appreciated from the perspective of the vantage point, or the like.

Image transform operations such as illustrated by image transform operations 2000 and/or other suitable image transform operations may be applied to surface data slices in any way and in any combination so as to generate virtual reality data that accounts for level of detail with respect to a particular vantage point. For example, system 1200 (e.g., a particular detail customization engine 1308 generating virtual reality data that accounts for level of detail with respect to the particular vantage point) may generate the virtual reality data by determining a target level of detail for a particular surface data slice based on a proximity of the particular surface data slice to the particular vantage point. Based on the target level of detail, system 1200 may determine that the surface data slice is to be transformed to account for level of detail with respect to the particular vantage point. Then, based on the determination that the surface data slice is to be transformed to account for level of detail with respect to the particular vantage point, system 1200 may select the image transform operation to be applied from a plurality of available image transform operations (e.g., including image transform operations such as image transform operations 2000 or other image transform operations described herein).

Figure 21:
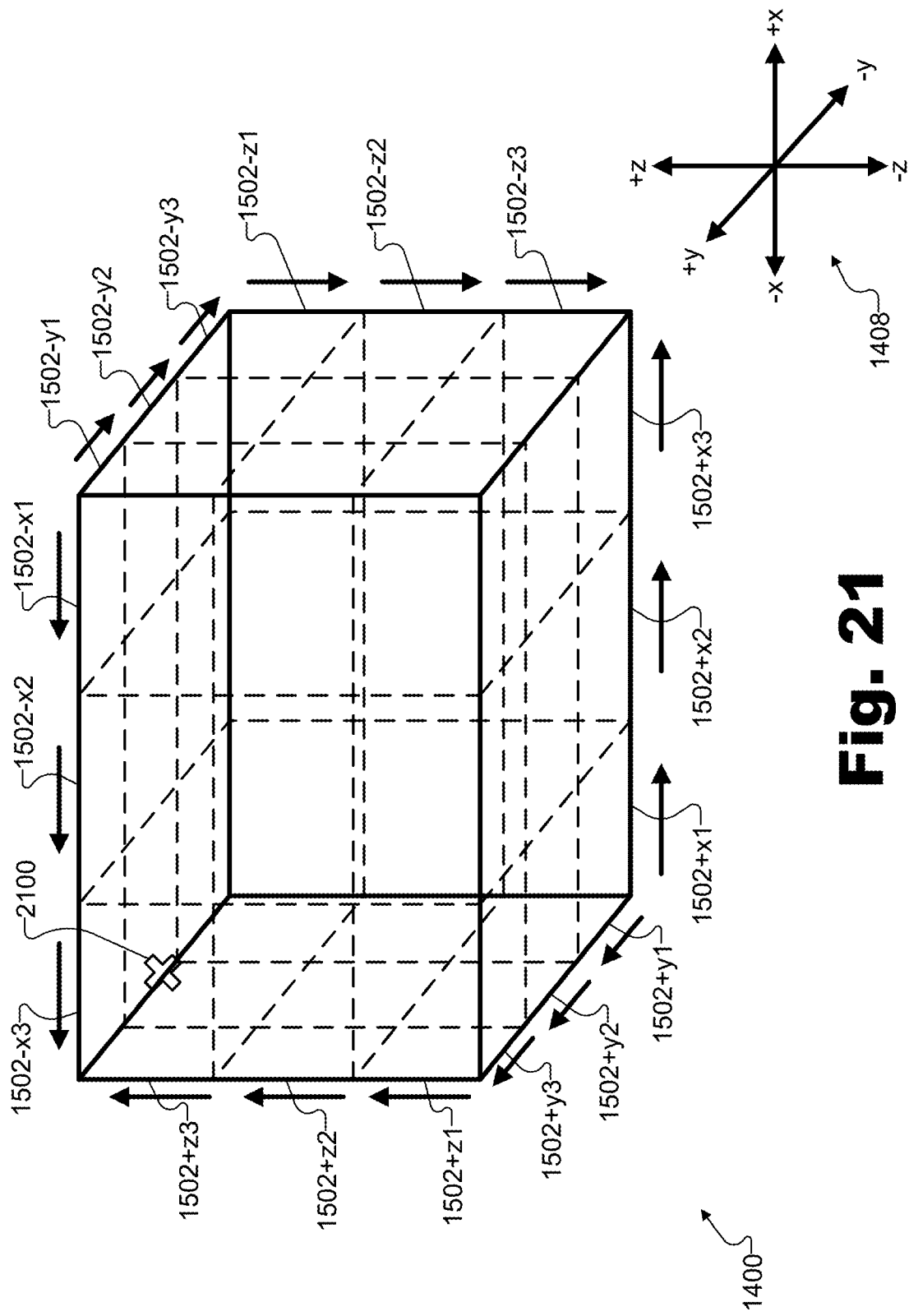
FIG. 21 illustrates how an exemplary instance of virtual reality data may be generated to represent the virtual 3D space of FIG. 14 and to account for level of detail of surfaces included within the virtual 3D space of FIG. 14 with respect to a particular vantage point according to principles described herein.

To illustrate a specific example, FIG. 21 shows how an exemplary instance of virtual reality data may be generated to represent virtual 3D space 1400 and to account for level of detail of surfaces included within virtual 3D space 1400 with respect to a particular vantage point 2100. In FIG. 21, each of surface data slices 1502 (i.e., pluralities of surface data slices 1502+x, 1502−x, 1502+y, 1502−y, 1502+z, and 1502−z) are illustrated and labeled around the edges of virtual 3D space 1400 with respect to coordinate system 1408.

As shown, vantage point 2100 is located in a corner of virtual 3D space 1400 that is included within surface data slices 1502+x1, 1502−x3, 1502+y3, 1502−y1, 1502+z3, and 1502−z1. As such, in order to provide as much detail as possible for surfaces near vantage point 2100, each of these surface data slices may be included without a reduction in detail within the virtual reality data instance associated with vantage point 2100. Alternatively, a cropping image transform operation may be applied to one or more of these surface data slices in order to include, within the virtual reality data, a relatively large level of detail for a portion of the surface data slice near vantage point 2100 and a smaller level of detail for areas further away from vantage point 2100.

Immediately adjacent to the surface data slices in which vantage point 2100 is located are surface data slices 1502+x2, 1502−x2, 1502+y2, 1502−y2, 1502+z2, and 1502−z2. Because much of the detail included within these surface data slices may be appreciable from vantage point 2100, each of these surface data slices may be included within the virtual reality data after applying, for example, a relatively minor down-sampling image transform operation to reduce the amount of data used to represent these surface data slices. In some examples, only part of these surface data slice may be down-sampled (e.g., using a combination of a cropping image transform operation and a down-sampling image transform operation), or these surface data slices may be layered together with one or more of the other surface data slices that are even more distant from vantage point 2100, as described below.

More remote from vantage point 2100 (e.g., not adjacent to the surface data slices in which vantage point 2100 is located) are surface data slices 1502+x3, 1502−x1, 1502+y1, 1502−y3, 1502+z1, and 1502−z3. Because much of the detail included within these surface data slices may not be appreciable from vantage point 2100, each of these surface data slices may be included within the virtual reality data after applying, for example, a relatively significant down-sampling image transform operation to reduce the amount of data used to represent these surface data slices. In some examples, only part of these surface data slice may be down-sampled (e.g., using a combination of a cropping image transform operation and a down-sampling image transform operation), or one or more of these surface data slices may be omitted from the virtual reality data altogether. As mentioned above, these surface data slices may also, in some implementations, be layered together with one or more of the other surface data slices that are adjacent to vantage point 2100 using layering image transform operations. For example, while different details may be appreciable from vantage point 2100 in surface data slices 1502+x2 and 1502+x3 such that it may be appropriate to keep these surface data slice separate, details included within surface data slices 1502−x1 and 1502−x2 may not be appreciably different from one another from vantage point 2100, thus making a layering image transform operation of these two surface data slices appropriate.

While various image transform operations have been described above for specific surface data slices 1502 with respect to vantage point 2100, it will be understood that these image transform operations are exemplary only, and that any suitable image transform operations may be applied to any surface data slices 1502 as may serve a particular implementation. Additionally, it will be understood that, while the focus of the example shown in FIG. 21 was on discrete image transform operations being applied to particular surface data slices 1502, any combination of image transform operations may be applied to one or more surface data slices 1502 as may serve a particular implementation.

Figure 22:
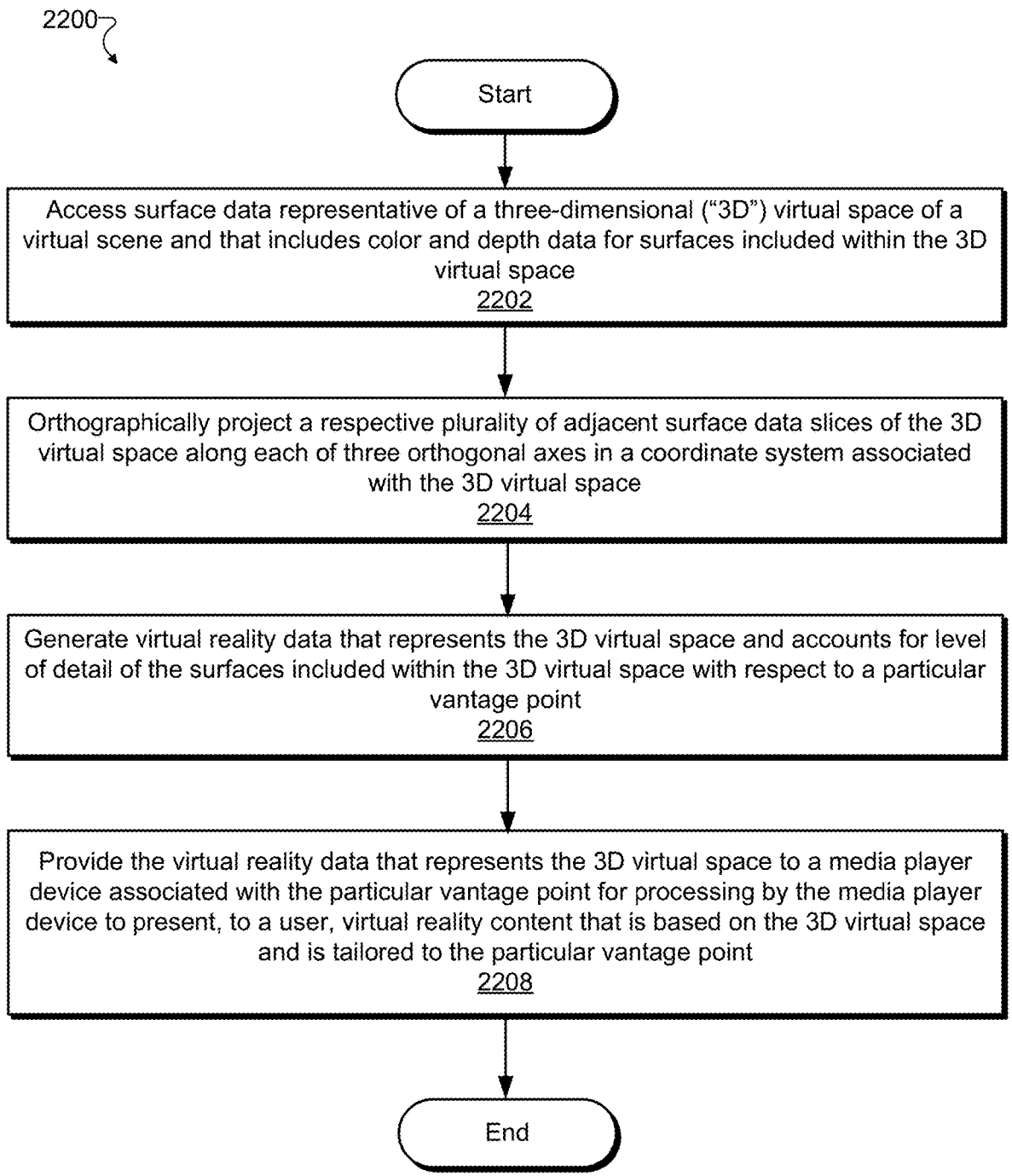
FIG. 22 illustrates an exemplary method for generating and providing virtual reality data that accounts for level of detail according to principles described herein.

FIG. 22 illustrates an exemplary method for generating and providing virtual reality data that accounts for level of detail. While FIG. 22 illustrates exemplary operations according to one embodiment, other embodiments may omit, add to, reorder, and/or modify any of the operations shown in FIG. 22. One or more of the operations shown in FIG. 22 may be performed by system 1200 and/or by any implementation thereof.

In operation 2202, a virtual reality provider system may access surface data representative of a virtual 3D space of a virtual scene. For example, the surface data may include color and depth data for surfaces included within the virtual 3D space. Operation 2202 may be performed in any of the ways described herein.

In operation 2204, the virtual reality provider system may orthographically project a respective plurality of adjacent surface data slices of the virtual 3D space along each of three orthogonal axes in a coordinate system associated with the virtual 3D space. For example, the virtual reality provider system may orthographically project the pluralities of adjacent surface data slices based on the surface data accessed in operation 2202. Operation 2204 may be performed in any of the ways described herein.

In operation 2206, the virtual reality provider system may generate virtual reality data that represents the virtual 3D space and accounts for level of detail of the surfaces included within the virtual 3D space with respect to a particular vantage point. In some examples, operation 2206 may include applying an image transform operation to a surface data slice in one of the respective pluralities of adjacent surface data slices orthographically projected in operation 2204. Operation 2206 may be performed in any of the ways described herein.

In operation 2208, the virtual reality provider system may provide the virtual reality data that represents the virtual 3D space and that was generated in operation 2206 to a media player device associated with the particular vantage point. For example, the virtual reality provider system may provide the virtual reality data for processing by the media player device to present, to a user of the media player device, virtual reality content that is based on the virtual 3D space and is tailored to the particular vantage point. Operation 2208 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 23:
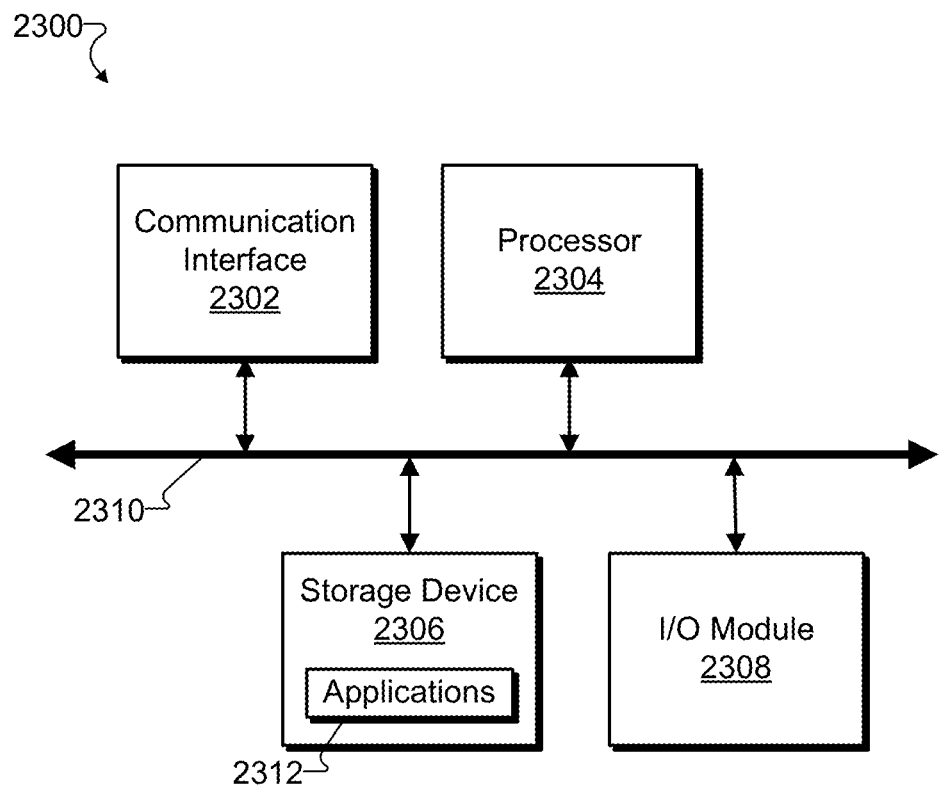
FIG. 23 illustrates an exemplary computing device according to principles described herein.

FIG. 23 illustrates an exemplary computing device 2300 that may be specifically configured to perform one or more of the processes described herein. As shown in FIG. 23, computing device 2300 may include a communication interface 2302, a processor 2304, a storage device 2306, and an input/output ("I/O") module 2308 communicatively connected via a communication infrastructure 2310. While an exemplary computing device 2300 is shown in FIG. 23, the components illustrated in FIG. 23 are not intended to be limiting. Additional or alternative components may be used in other embodiments. Components of computing device 2300 shown in FIG. 23 will now be described in additional detail.

Communication interface 2302 may be configured to communicate with one or more computing devices. Examples of communication interface 2302 include, without limitation, a wired network interface (such as a network interface card), a wireless network interface (such as a wireless network interface card), a modem, an audio/video connection, and any other suitable interface.

Processor 2304 generally represents any type or form of processing unit (e.g., a central processing unit and/or a graphics processing unit) capable of processing data or interpreting, executing, and/or directing execution of one or more of the instructions, processes, and/or operations described herein. Processor 2304 may direct execution of operations in accordance with one or more applications 2312 or other computer-executable instructions such as may be stored in storage device 2306 or another computer-readable medium.

Storage device 2306 may include one or more data storage media, devices, or configurations and may employ any type, form, and combination of data storage media and/or device. For example, storage device 2306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 2306. For example, data representative of one or more executable applications 2312 configured to direct processor 2304 to perform any of the operations described herein may be stored within storage device 2306. In some examples, data may be arranged in one or more databases residing within storage device 2306.

I/O module 2308 may include one or more I/O modules configured to receive user input and provide user output. One or more I/O modules may be used to receive input for a single virtual reality experience. I/O module 2308 may include any hardware, firmware, software, or combination thereof supportive of input and output capabilities. For example, I/O module 2308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 2300. For example, one or more applications 2312 residing within storage device 2306 may be configured to direct processor 2304 to perform one or more operations or functions associated with facilities 102 or 104 of system 100 (see FIG. 1) and/or facilities 1202, 1204, or 1206 of system 1200 (see FIG. 12). Likewise, either or both of storage facilities 106 (of system 100) and 1208 (of system 1200) may be implemented by or within storage device 2306.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   generating, by a virtual reality provider system based on surface data representative of at least one of color characteristics or depth characteristics of surfaces within a three-dimensional (3D) space, a surface data projection of a portion of the 3D space; and
   applying, by the virtual reality provider system, an image transform operation to the surface data projection to transform the surface data projection to account for a level of detail of the surfaces within the 3D space with respect to a particular vantage point within the 3D space.

2. The method of claim 1, further comprising:
   determining, by the virtual reality provider system, a target level of detail for the surface data projection based on a proximity of the surface data projection to the particular vantage point; and
   determining, by the virtual reality provider system based on the target level of detail, that the surface data projection is to be transformed to account for the level of detail with respect to the particular vantage point;
   wherein the applying of the image transform operation to the surface data projection is performed based on the determining that the surface data projection is to be transformed to account for the level of detail with respect to the particular vantage point.

3. The method of claim 2, further comprising selecting, by the virtual reality provider system from a plurality of available image transform operations, the image transform operation that is applied to the surface data projection to transform the surface data projection to account for the level of detail with respect to the particular vantage point;
   wherein the selecting is performed based on the determination that the surface data projection is to be transformed and based on the target level of detail.

4. The method of claim 3, wherein the selected image transform operation that is applied to the surface data projection comprises a cropping image transform operation in which two areas of the surface data projection are differentiated so as to be processed separately.

5. The method of claim 3, wherein the selected image transform operation that is applied to the surface data projection comprises a down-sampling image transform operation in which a quality level of the surface data projection is reduced so that the surface data projection is represented using less data than an amount of data used to represent the surface data projection at an original quality level.

6. The method of claim 3, wherein the selected image transform operation that is applied to the surface data projection comprises a layering image transform operation in which the surface data projection is combined with an additional surface data projection such that the surface data projection and the additional surface data projection are represented using less data than an amount of data used to represent the surface data projection and the additional surface data projection separately.

7. The method of claim 3, wherein the selected image transform operation that is applied to the surface data projection comprises a combination of a cropping image transform operation and a down-sampling image transform operation in which a first area and a second area of the surface data projection are differentiated and a quality level of only the first area is reduced so that the first area is represented using less data than an amount of data used to represent the second area.

8. The method of claim 1, wherein the surface data projection comprises a surface data slice included in a plurality of adjacent surface data slices of the 3D space arranged along an axis in a coordinate system associated with the 3D space.

9. The method of claim 8, further comprising:
   determining, by the virtual reality provider system, that the surface data slice is to be transformed to account for the level of detail with respect to the particular vantage point, wherein the applying of the image transform operation to the surface data projection is performed based on the determining that the surface data slice is to be transformed;
   determining, by the virtual reality provider system, that an additional surface data slice of the plurality of adjacent surface data slices is not to be transformed to account for the level of detail with respect to the particular vantage point; and
   abstaining from applying, by the virtual reality provider system in response to the determining that the additional surface data slice is not to be transformed, any image transform operation to the additional surface data projection.

10. The method of claim 1, wherein the surface data projection is implemented as an orthographic projection of the 3D space or a perspective projection of the 3D space.

11. The method of claim 1, wherein the surface data includes both:

color data representative of the color characteristics of the surfaces within the 3D space; and depth data representative of the depth characteristics of the surfaces within the 3D space.

12. The method of claim 1, further comprising:

generating, by the virtual reality provider system based on the surface data projection to which the image transform operation is applied, virtual reality data that represents the 3D space and accounts for the level of detail of the surfaces within the 3D space with respect to the particular vantage point; and providing, by the virtual reality provider system to a media player device associated with the particular vantage point, the virtual reality data for processing by the media player device to present, to a user of the media player device, virtual reality content that is based on the 3D space and is tailored to the particular vantage point.

13. A system comprising:

a memory storing instructions; and a processor communicatively coupled to the memory and configured to execute the instructions to:

generate, based on surface data representative of at least one of color characteristics or depth characteristics of surfaces within a three-dimensional (3D) space, a surface data projection of a portion of the 3D space; and apply an image transform operation to the surface data projection to transform the surface data projection to account for a level of detail of the surfaces within the 3D space with respect to a particular vantage point within the 3D space.

14. The system of claim 13, wherein the processor is further configured to execute the instructions to:

determine a target level of detail for the surface data projection based on a proximity of the surface data projection to the particular vantage point; and determine, based on the target level of detail, that the surface data projection is to be transformed to account for the level of detail with respect to the particular vantage point; and wherein the applying of the image transform operation to the surface data projection is performed based on the determining that the surface data projection is to be transformed to account for the level of detail with respect to the particular vantage point.

15. The system of claim 14, wherein the processor is further configured to execute the instructions to select, from a plurality of available image transform operations, the image transform operation that is applied to the surface data projection to transform the surface data projection to account for the level of detail with respect to the particular vantage point;

wherein the selecting is performed based on the determination that the surface data projection is to be transformed and based on the target level of detail.

16. The system of claim 15, wherein the selected image transform operation that is applied to the surface data projection comprises one of:

a cropping image transform operation in which two areas of the surface data projection are differentiated so as to be processed separately;

a down-sampling image transform operation in which a quality level of the surface data projection is reduced so that the surface data projection is represented using less data than an amount of data used to represent the surface data projection at an original quality level; and a layering image transform operation in which the surface data projection is combined with an additional surface data projection such that the surface data projection and the additional surface data projection are represented using less data than an amount of data used to represent the surface data projection and the additional surface data projection separately.

17. The system of claim 15, wherein the selected image transform operation that is applied to the surface data projection comprises a combination of a cropping image transform operation and a down-sampling image transform operation in which a first area and a second area of the surface data projection are differentiated and a quality level of only the first area is reduced so that the first area is represented using less data than an amount of data used to represent the second area.

18. The system of claim 13, wherein the surface data projection comprises a surface data slice included in a plurality of adjacent surface data slices of the 3D space arranged along an axis in a coordinate system associated with the 3D space, and the processor is further configured to execute the instructions to:

determine that the surface data slice is to be transformed to account for the level of detail with respect to the particular vantage point, wherein the applying of the image transform operation is performed based on the determining that the surface data slice is to be transformed;

determine that an additional surface data slice of the plurality of adjacent surface data slices is not to be transformed to account for the level of detail with respect to the particular vantage point; and abstain from applying, by the virtual reality provider system in response to the determining that the additional surface data slice is not to be transformed, any image transform operation to the additional surface data projection.

19. The system of claim 13, wherein the processor is further configured to execute the instructions to:

generate, based on the surface data projection to which the image transform operation is applied, virtual reality data that represents the 3D space and accounts for the level of detail of the surfaces within the 3D space with respect to the particular vantage point; and provide, to a media player device associated with the particular vantage point, the virtual reality data for processing by the media player device to present, to a user of the media player device, virtual reality content that is based on the 3D space and is tailored to the particular vantage point.

20. A non-transitory computer-readable medium storing instructions that, when executed, direct a processor of a computing device to:

generate, based on surface data representative of at least one of color characteristics or depth characteristics of surfaces within a three-dimensional (3D) space, a surface data projection of a portion of the 3D space; and apply an image transform operation to the surface data projection to transform the surface data projection to account for a level of detail of the surfaces within the 3D space with respect to a particular vantage point within the 3D space.

* * * * *